United States Patent
Dobroth

(10) Patent No.: US 11,692,613 B2
(45) Date of Patent: Jul. 4, 2023

(54) ROLLING-CONTACT BEARINGS

(71) Applicant: 21GEO CORP., Sunnyvale, CA (US)

(72) Inventor: Thomas J. Dobroth, Sunnyvale, CA (US)

(73) Assignee: 21GEO Corp., Sunnyvale, CA (US)

( * ) Notice: Subject to any disclaimer, the term of this patent is extended or adjusted under 35 U.S.C. 154(b) by 189 days.

(21) Appl. No.: 16/535,048

(22) Filed: Aug. 7, 2019

(65) Prior Publication Data
US 2020/0173491 A1    Jun. 4, 2020

Related U.S. Application Data

(60) Provisional application No. 62/742,431, filed on Oct. 7, 2018, provisional application No. 62/715,274, filed on Aug. 7, 2018.

(51) Int. Cl.
*F16H 1/32* (2006.01)
*F16C 19/26* (2006.01)
*F16C 33/58* (2006.01)
*B67B 7/04* (2006.01)

(52) U.S. Cl.
CPC .............. *F16H 1/32* (2013.01); *F16C 19/26* (2013.01); *F16C 33/585* (2013.01); *B67B 7/0417* (2013.01)

(58) Field of Classification Search
CPC ................. F16H 1/32; F16H 2001/327; F16H 2001/322–2001/328; F16H 25/06–2025/066; F16C 33/585; F16C 33/36
See application file for complete search history.

(56) References Cited

U.S. PATENT DOCUMENTS

| | | | | |
|---|---|---|---|---|
| 4,023,440 A | * | 5/1977 | Kennington | F16H 1/32 475/159 |
| 4,552,037 A | * | 11/1985 | Distin, Jr. | F16H 25/06 475/159 |
| 4,584,904 A | * | 4/1986 | Distin, Jr. | F16H 1/32 475/168 |
| 4,604,916 A | * | 8/1986 | Distin, Jr. | F16H 1/32 475/168 |
| 8,162,790 B2 | * | 4/2012 | Imase | F16H 25/06 475/168 |
| 9,206,881 B2 | * | 12/2015 | Kong | F16H 1/32 |
| 2018/0306285 A1 | * | 10/2018 | Noguchi | F16H 48/14 |

FOREIGN PATENT DOCUMENTS

| | | | |
|---|---|---|---|
| CN | 110185747 A | * | 8/2019 |
| CN | 110285198 A | * | 9/2019 |
| KR | 20090091609 A | * | 8/2009 |

* cited by examiner

Primary Examiner — Sherry L Estremsky
(74) Attorney, Agent, or Firm — Witkowski Law

(57) ABSTRACT

A mechanism including a first pair of races having a first pair of raceways and a first rolling element operable to roll between the first pair of raceways, wherein at least one of the first pair of raceways has a substantially variable curvature along at least a portion of a path of the first rolling element. A program product that determines a solution by adjusting the curvature of a first pair of raceways on opposite sides of a rolling element, at least one of the first pair of raceways having a substantially variable curvature along the contact points in the direction of the corresponding range of motion for the rolling element.

17 Claims, 48 Drawing Sheets

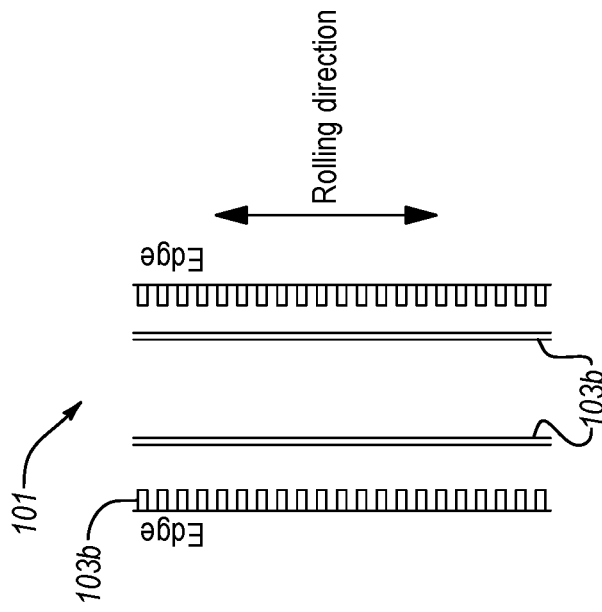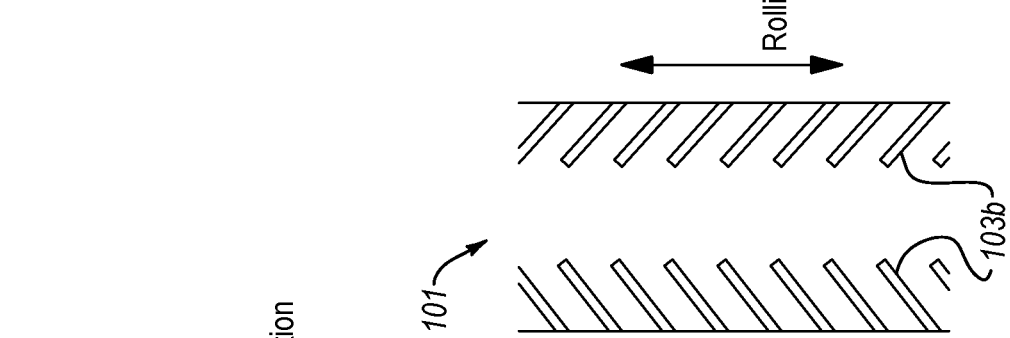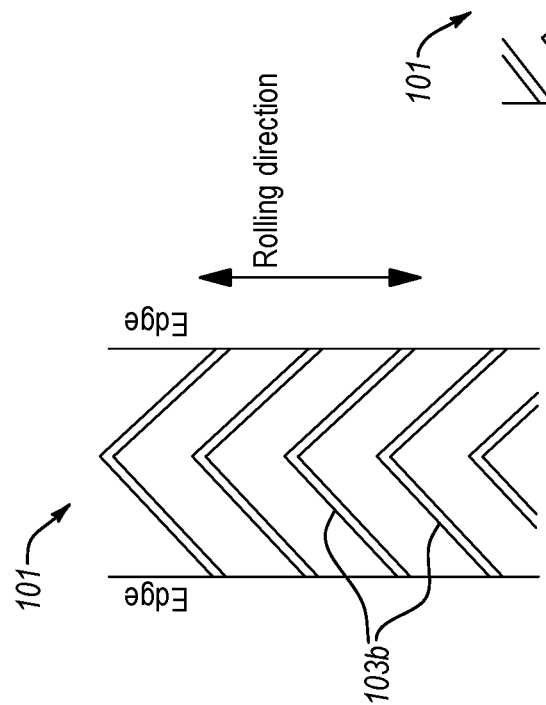

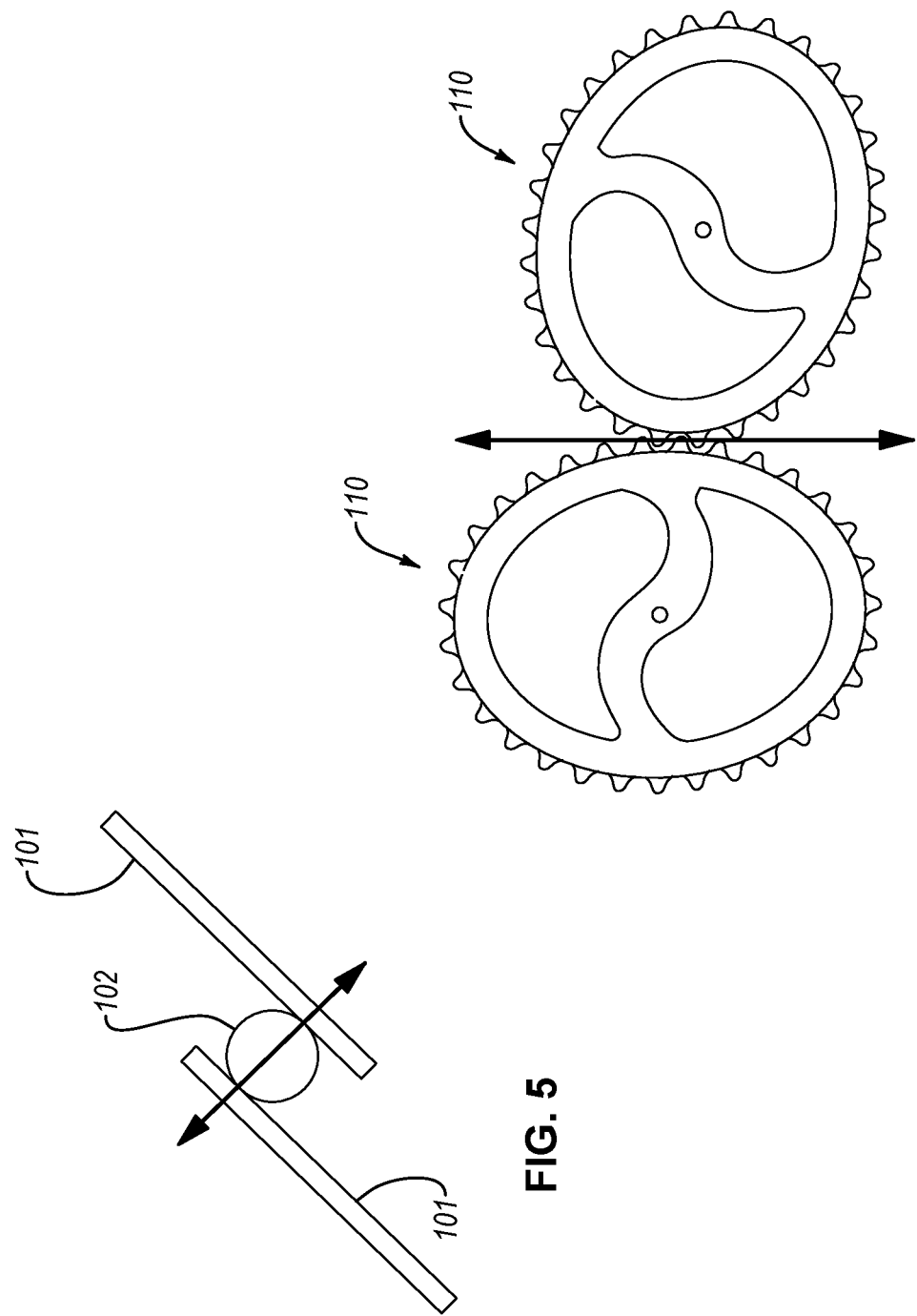

ROLLING-CONTACT BEARINGS

CROSS-REFERENCE TO RELATED APPLICATIONS

This is a U.S. Non-Provisional Application, which claims the benefit of U.S. Provisional Application No. 62/715,274, filed on Aug. 7, 2018, the contents of which are expressly incorporated by reference herein, and claims the benefit of U.S. Provisional Application No. 62/742,431, filed on Oct. 7, 2018, the contents of which are expressly incorporated by reference herein.

BACKGROUND

Technical Field

This disclosure relates generally to the field of machines and mechanisms. More particularly, the disclosure relates to machines and mechanisms that employ rolling-contact bearings.

Background Art

Bearings are among the most useful mechanical devices. They are commonly employed in machines and mechanisms in a wide range of applications. For example, bearings can be found in drawer slides, refrigerators, air conditioners, washing machines and dryers. Automobiles may have dozens of bearings.

Bearings are typically designed to receive a load having certain characteristics, within a space specified, and have a satisfactory life for a particular application, considering issues such as fatigue loading, friction, heat, corrosion resistance, kinematic issues, material properties, lubrication, machine tolerances, assembly, use and cost.

A typical structure of a bearing includes an inner ring and an outer ring enclosing multiple ball bearings. The ball bearings roll between an inner bearing ring and an outer bearing ring. The bearing rings are sometimes referred to as races. The ball bearing rolls between surfaces of the inner and outer races. The surfaces in contact with the bearings as it slides or rolls between the races are sometimes referred to as raceways. Some bearings employ separators that keep the ball bearings spaced apart on the races.

Other bearing elements are roller bearings, sometimes referred to as pins.

A class of bearing in which the main load is transferred from one component to the other through the bearing elements in rolling contact rather than sliding contact is generally referred to as a rolling-contact bearing, an anti-friction bearing, or a rolling bearing. Rolling typically has less friction than sliding and therefore rolling bearings tend to be more energy efficient than bearings that slide.

SUMMARY

Embodiments include a mechanism that has at least one rolling element operable to roll on a corresponding path between the pair of raceways, wherein at least one of the pair of raceways has a substantially variable curvature along a plurality of contact points with at least one of the rolling elements along at least a portion of the corresponding path.

Mechanisms as used herein is meant to include basic bearings including those claimed herein, such as the bearing element described in the preceding paragraph, to complex machines including numerous bearing elements working in conjunction with gears, cams, and multi-bar linkages.

Embodiments include a mechanism having a the pair of raceways operable to substantially oppose each other at the plurality of contact points with the rolling element along at least a portion of the path.

Embodiments include a mechanism wherein the rolling element does not substantially slide on either of the pair of raceways.

Embodiments include a mechanism wherein the first rolling element is constrained to roll between two endpoints between the pair of raceways.

Embodiments include a mechanism wherein the first pair of raceways form a closed loop, the rolling element operable to roll along the path around the closed loop.

Embodiments include a mechanism wherein the first pair of raceways have a repeating pattern along the first path of the first rolling element.

Embodiments include a mechanism wherein the repeating pattern comprises a plurality of regularly spaced lobes.

Embodiments include a mechanism wherein at least one of the first pair of raceways has an irregular shape.

Embodiments include a mechanism wherein at least some of the rolling element are ball bearings.

Embodiments include a mechanism wherein at least some of the rolling element are roller bearings.

Embodiments include a mechanism wherein the one of the first pair of races is coupled to one end of a linkage bar.

Embodiments include a mechanism wherein the first rolling element is a split pin with at least two shape profiles.

Embodiments include a second mechanism that has at least one rolling element operable to roll on a corresponding path between the pair of raceways, wherein at least one of the pair of raceways has a substantially variable curvature along a plurality of contact points with at least one of the rolling elements along at least a portion of the corresponding path.

Embodiments include a mechanism wherein the raceways comprise a first plurality of guide structures and the first rolling element comprise a second plurality of guide structures, the first plurality of guide structures being positioned to interface with the second plurality of guide structures as each of the first rolling element rolls through the path.

Embodiments include a mechanism that has a first rolling element operable to roll on a corresponding path between a first pair of raceways, a first rolling element operable to roll on a corresponding path between a first pair of raceways, wherein at least one of the two pairs of raceways has a substantially variable curvature along a plurality of contact points with at least one of the rolling elements along at least a portion of the corresponding path.

Embodiments include a mechanism wherein one of the first pair of races is coupled to one of the second pair of races so that they move in concert.

Embodiments include a mechanism wherein the first rolling element operable to roll between a first rotor and a first stator and the second rolling element operable to roll between a second rotor and a second stator, the first rotor being coupled to the second rotor.

Embodiments include a program product wherein a designer specifies design parameters that are stored in a computer-aided-design (CAD) system. The design process determines physical parameters of a mechanism 100 consistent with the design parameters. These design parameters may be determined based on an overall machine level design process. The overall machine level design process employs well-known techniques to consider the goals and constraints of the application for the mechanism.

Reference in this specification to "one embodiment," "an embodiment," and "embodiments" means that a feature, structure, characteristic, advantage or benefit described in connection with the embodiment or embodiments are included in at least one embodiment of the disclosure, but may not be exhibited by other embodiments. The appearances of the phrase "in one embodiment" or the like in various places in the specification are not necessarily all referring to the same embodiment or embodiments, nor are separate or alternative embodiments mutually exclusive of other embodiments. Similarly, various requirements are described which may be requirements for some embodiments but not for other embodiments. The specification and drawings are to be regarded in an illustrative sense rather than a restrictive sense. Various modifications may be made thereto without departing from the spirit and scope as set forth in the claims.

DESCRIPTION OF THE DRAWINGS

FIG. 2 illustrates an embodiment of guide structures on a segment of a raceway.

FIG. 3 illustrates a second embodiment of guide structures on a segment of a raceway.

FIG. 4 illustrates a third embodiment of guide structures on a segment of a raceway.

FIG. 5 illustrates an embodiment of a rolling bearing between two linear races.

FIG. 6 illustrates an embodiment of two interlocking gears.

DETAILED DESCRIPTION

Figure 1:
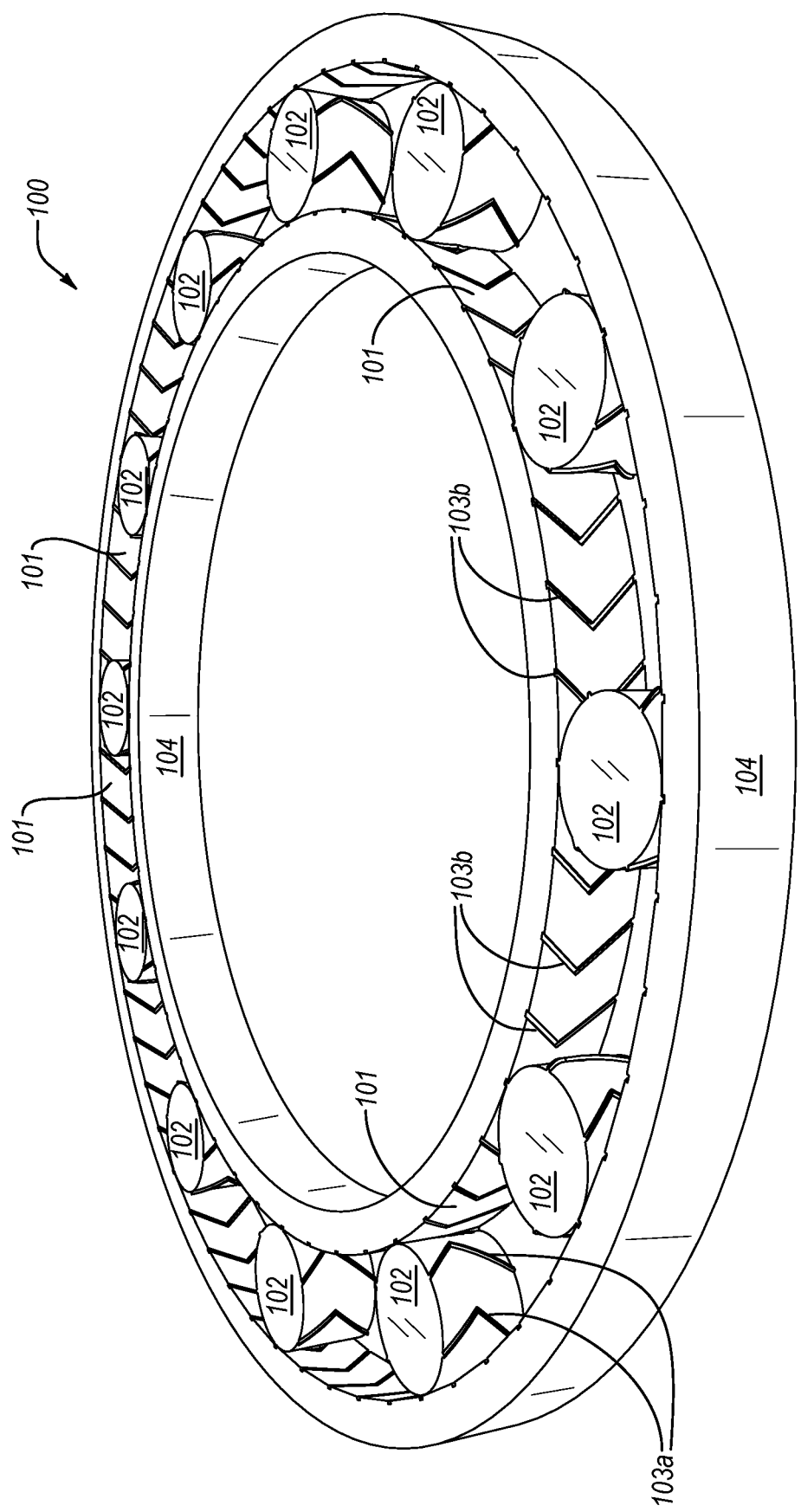
FIG. 1 illustrates one embodiment of a mechanism including rolling bearings between a pair of races.

FIG. 1 illustrates one embodiment of a mechanism 100 including a pair of races 104. The races 104 have raceways 101 that make contact with twelve rolling elements 102 as they roll through a range of motion. Most of the embodiments are described with reference to rolling elements 102, also referred to as pins. In other embodiments, the rolling elements 102 are ball bearings. In other embodiments, the rolling elements 102 may be tapered roller elements, spherical roller elements, or needle roller elements, for example.

In the illustrated embodiment, the raceways 101 form concentric circles each having a constant curvature. For perfectly circular raceways, the curvature is constant at the reciprocal of the radius of the respective implied circles. Substantially circular raceways may have some variations in the constant curvature. Such variations would have a magnitude associated with imperfections attributable to manufacturing tolerances and ordinary wear and tear, for example.

In preferred embodiments, one or both raceways 101 have substantially variable curvature over at least a portion of the path of one or more rolling elements 102. In a preferred embodiment, each raceway 101 makes contact with each rolling element 102 so that the raceways 101 on either side of a rolling element 102 substantially oppose each other at the corresponding contact points on either side of the rolling element 102 as the rolling element 102 rolls through each position around the closed loop.

The raceways 101 substantially oppose each other when the normal vectors at a corresponding pair of contact points are aligned to directly oppose each other within an accepted level of tolerance throughout the range of motion. The substantial opposition of the raceways 101 at the corresponding pair of contact points with each rolling element as it rolls through the range of motion tends to keep that rolling element 102 stable between the raceways 101.

In some embodiments, the raceways 101 have repeating guide structures 103b on the surface positioned to interface with a guide structure 103a on each rolling element 102 as it rolls throughout its range of motion. The guide structures 103a and the guide structures 103b interface with each other to maintain the rolling element 102 even when exposed to disturbances such as vibrations, debris, warping, and thermal strains, for example. The guide structures 103a and the guide structures 103b are structured so that they constrain the motion of each rolling element 102 to keep it on the path along the raceways 101. In some embodiments, the guide structures 103a and the guide structures 103b do not transmit torque between each raceway 101 and each rolling element 102.

The guide structures 103a on the rolling elements 102 interface with a corresponding repeating pattern of the guide structures 103b on the raceways 101 as the rolling elements 102 roll through the range of motion. The guide structures 103a on the rolling elements 102 may be protrusions positioned to be received by corresponding guide structures 103b that are formed as receptacles on the raceways 101.

In a preferred embodiment, the protrusions of the guide structures on one surface are fully received by the receptacles of the guide structures on the other surface throughout the range of motion of each of the rolling elements 102. The surface of each rolling element 102 adjacent to the guide structures makes contact with a portion of the surface of each raceway 101 adjacent to the guide structures throughout the range of motion of each of the rolling elements 102. Thus, in a preferred embodiment, at least some portion of the surfaces of each rolling element 102 makes contact with both raceways 101 continuously throughout the range of motion.

In some embodiments, some or all of the guide structures 103a on the rolling elements 102 may be protrusions positioned to be received by corresponding receptacles of the guide structures 103b on the raceways 101. In some embodiments, some or all of the guide structures 103a on the rolling elements 102 may be receptacles positioned to receive corresponding protrusions of the guide structures 103b on the raceways 101.

In preferred embodiments, the pattern of the guide structures 103a on the rolling elements 102 are repeated an integer number of times as the guide structures 103 on the raceways 101 so that the rolling elements 102 can roll through multiple cycles around the closed loop without a discontinuity in the pattern on the raceways 101. The pattern will repeat more times on the outer raceway 101 than the inner raceway 101 because the outer raceway 101 has a longer path length along the surface in contact with the rolling elements 102 through each rolling elements 102 range of motion—in this case a cycle of the closed loop.

FIGS. 2, 3 and 4 illustrate exemplary guide structures 103b on a portion of a raceway 101.

In some embodiments, the guide structures 103a on the rolling element 102 fit into a tongue and groove arrangement with the guide structures 103b on the raceway 101. This tends to keep the rolling element 102 from sliding along the axis of the rolling direction of the rolling element 102 and it tends to keep the rolling element 102 from sliding laterally with respect to the rolling direction.

FIG. 2 shows one embodiment of guide structures 103b along a portion of a raceway 101. Each instance of this pattern shown is known as a chevron. The chevrons are spaced so that there is no portion of the rotation of a rolling element 102 on that raceway 101 that does not have at least a portion of the guide structures 103b interfacing with at least a portion of the guide structures 103a on the rolling element 102 as it rolls throughout its range of motion.

FIG. 3 shows another embodiment guide structures 103b along a segment of a raceway 101. This pattern repeats more frequently than the fully formed chevron of FIG. 1. No portion of the rotation does not have at least a portion of the guide structures 103b. In this way, the guide structures 103b are constantly engaged with the guide structures 103a of the rolling element 102 so that the rolling element 102 is constrained from sliding at each point in the rotation of the rolling element 102 on the raceway 101.

The guide structures 103b in FIG. 4 have two types of repeating patterns. The guide structures 103b include two linear tracks along the rolling direction of the rolling element 102. The guide structures 103b also includes short linear segments on lateral sides of the raceway 101 oriented perpendicular to the rolling direction.

These guide structures tend to keep the rolling elements 102 from sliding backward or forward along rolling direction and it tends to keep the rolling element from sliding laterally with respect the rolling direction.

FIG. 5 includes a double headed arrow to show the direction of the forces on substantially co-opposing raceways 101 on a rolling element 102 at one position along the range of motion. In the illustrated embodiment, the raceways 101 are linear.

FIG. 6 includes a double headed arrow to show the primary direction of the forces on two interlocking gears 110. The gear teeth transmit torque between the gears.

Figure 7:
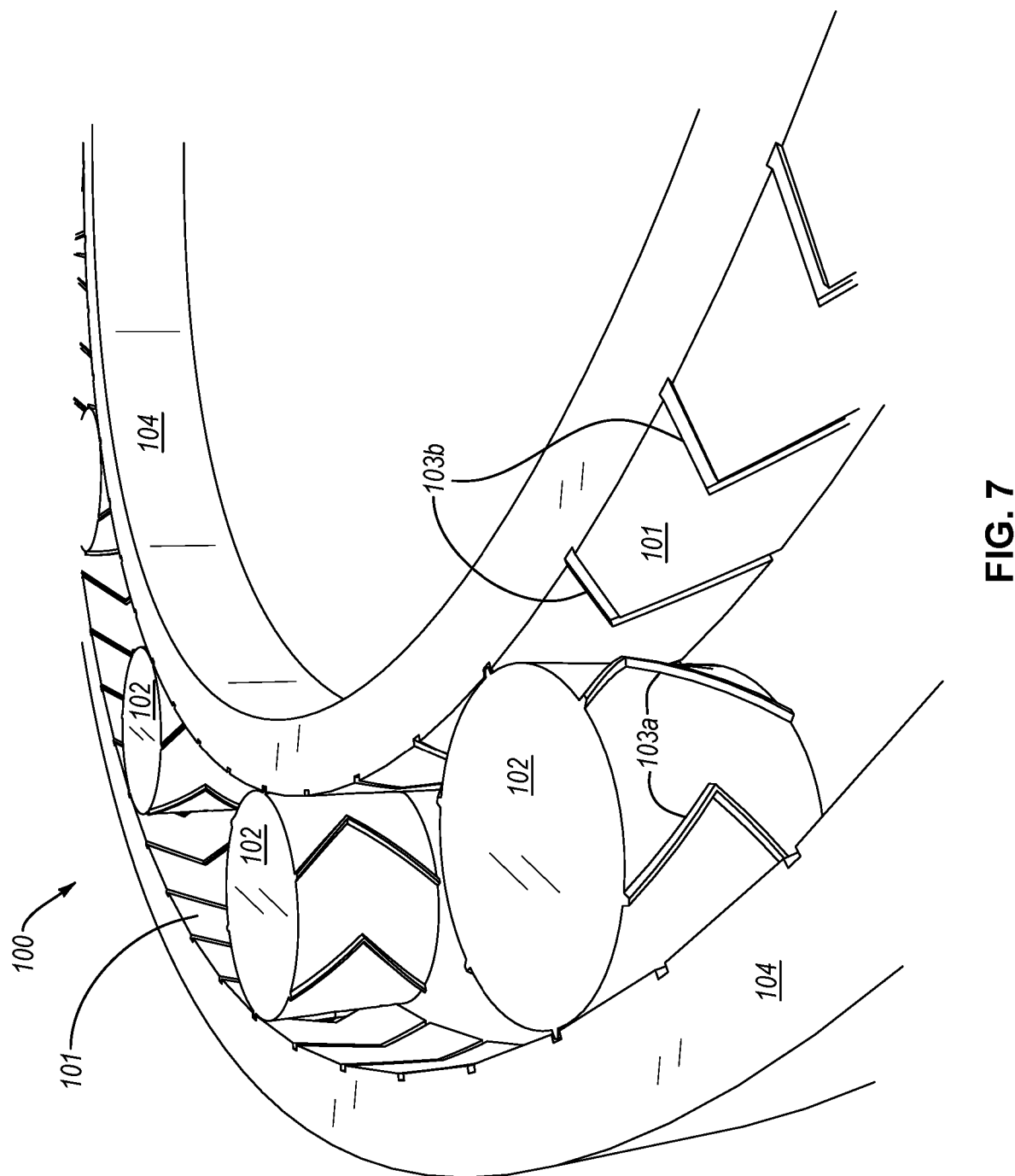
FIG. 7 illustrates a close-up view of the mechanism of FIG. 1.

FIG. 7 shows a close-up view of a portion of the mechanism 100 of FIG. 1.

The races 104 have raceways 101 on either side of the rolling elements 102.

The guide structures 103a are protrusions on the rolling elements 102 and the guide structures 103b are receptacles on the raceways 101 configured to receive the protrusions.

The raceways 101 shown in FIGS. 1 and 7 are circular. The curvature at a particular contact point on each raceway 101 may be numerically represented as the reciprocal of the implied radius of a circle having that curvature. The inner raceway 101 has a higher curvature than the outer raceway 101.

For perfectly circular raceways, the curvature would be constant at the reciprocal of the radius of the implied circle. Substantially circular raceways may have some variations in the constant curvature. Such variations would typically have a magnitude associated with imperfections attributable to manufacturing tolerances and ordinary wear and tear, for example.

A mechanism has two or more components coupled to the races 104 at least two of which are designed to move with respect to each other, and one or more rolling elements each comprising at least two raceways and at least one rolling element 102, that form an interface between components.

Embodiments include a mechanism that has at least one rolling element operable to roll on a corresponding path between the pair of raceways, wherein at least one of the pair of raceways has a substantially variable curvature along a plurality of contact points with at least one of the rolling elements along at least a portion of the corresponding path.

Embodiments include raceways that form closed loops which allow the rolling elements to have a range of motion around the closed loop. In other embodiments, these raceways form open segments to allow for a back and forth range of motion.

Mechanisms as used herein is meant to include basic bearings including those claimed herein to complex machines including numerous bearing elements working in conjunction with gears, cams, and multi-bar linkages, for example.

The shape of the raceways are determined by a process described herein whereby a designer or someone skilled in the art, for example, can specify the desired motion of the components according to the application of the mechanism. In a preferred embodiment, the process determines the raceway 101 shapes based at least in part on the specified motion of the races 104 with constraints such as that the pin-raceway contact points substantially oppose each other throughout the range of motion of the rolling elements 102.

For perfectly straight raceways 101, the curvature is zero. Substantially straight raceways 101 may have some variations from perfectly straight. Such variations would result in a curvature with a magnitude associated with imperfections attributed to manufacturing tolerances and ordinary wear and tear, for example.

In preferred embodiments, the mechanism includes raceways 101 with substantially variable curvature along at least a portion of the path of one or more rolling elements 102 rolling along the raceways 101. A substantially variable curvature varies by design, to a greater degree than that due to manufacturing imperfections or ordinary wear and tear, from that of a nominally zero curvature (straight) or that of a nominally constant curvature (circular). In some embodiments, portions of the raceways 101 have a substantially variable curvature along at least a portion of the path of one or more rolling elements 102, as well as a nominally zero or constant curvature along at least a portion of the path of the rolling elements 102.

In the embodiment shown in FIGS. 1 and 7, the raceways 101 are closed loops. A closed loop has no end point so that the rolling elements 102 can roll in one direction or the other through multiple passes around the closed-loop raceways 101.

In some embodiments, the raceways 101 are one or more open loops. An open loop has endpoints on either side of the raceway along the path of one or more rolling elements 102 so that each rolling element 102 can roll back and forth between the endpoints.

In some embodiments, the mechanism 100 includes raceways 101 with periodic pattern of variable curvature along at least a portion of the path of the rolling elements 102. For example, the pattern may include regularly-spaced lobes such as shown with respect to the forward and backward rotary mechanism described below. In some embodiments, the mechanism 100 includes raceways 101 with periodic pattern of substantially variable curvature along at least a portion of the path of the rolling elements 102.

In some embodiments, the mechanism 100 includes raceways 101 with an irregular shape having substantially variable curvature along at least a portion of the path of the rolling elements 102. An irregular shape is one that is not even or balanced.

In a preferred embodiment, the substantially variable curvature of the raceways 101 are designed to accommodate the motion of the components as specified by a designer, while minimizing sliding of the rolling elements 102 as they move along the raceways 101 and maintain opposing contact points at the raceways 101 on either side of the rolling elements 102 throughout the range of motion.

The direct opposition of the raceways 101 at the contact points with each rolling element 102 tends to keep that rolling element 102 stable between the raceways. A raceway 101 on one side of a rolling element 102 is positioned to substantially oppose a raceway 101 on the other side of the rolling element 102 when the raceways are aligned to directly oppose each other throughout the range of motion within an accepted level of error tolerance.

In some embodiments, the rolling elements 102 are cylindrical. A cylindrical rolling element has a diameter and length.

In other embodiments, the rolling elements 102 are split pins. In a preferred embodiment, split pins 102 have multiple segments defined by slices perpendicular to the axis of rotation. Each slice has a shape profile defined by the shape of the cross section of the segment. The different shape profiles can provide more flexibility to facilitate finding a solution or finding a better solution in the design process described herein.

Figure 8:
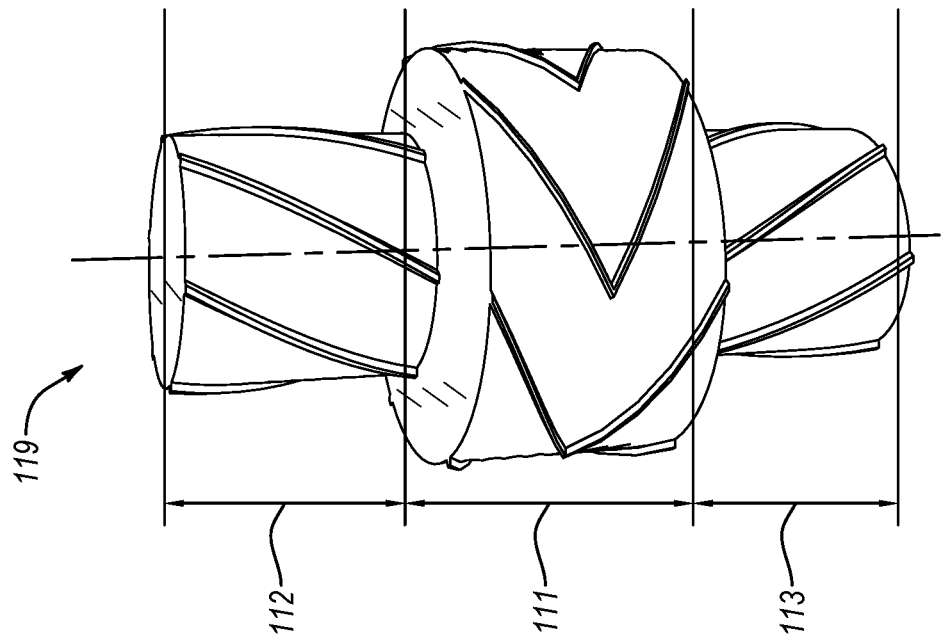
FIG. 8 illustrates a first embodiment of a split pin.

FIG. 8 illustrates one embodiment of a split pin.

The first split pin 105 has a first segment 111, a second segment 112, and a third segment 113. The first segment 111 has a first shape profile. The second segment 112 and the third segment 113 have a second shape profile. The first and second shapes are cylindrical so that the shape profiles—a cross section of each segment perpendicular to the axis of rotation 117—are circular. The first shape profile is a circle having a larger diameter than the circle of the second shape profile.

The first segment 111 is configured to interface with a first raceway, the second segment 112 is configured to interface with a second raceway and the third segment 113 is configured to interface with a third raceway. In a preferred embodiment, the first and third raceways are shaped identically. In the illustrated embodiment, the guide structures 103b are identical for each segment. In other embodiments, the patterns of the guide structures 103b may differ for each segment. The raceways are not shown.

Figure 9:
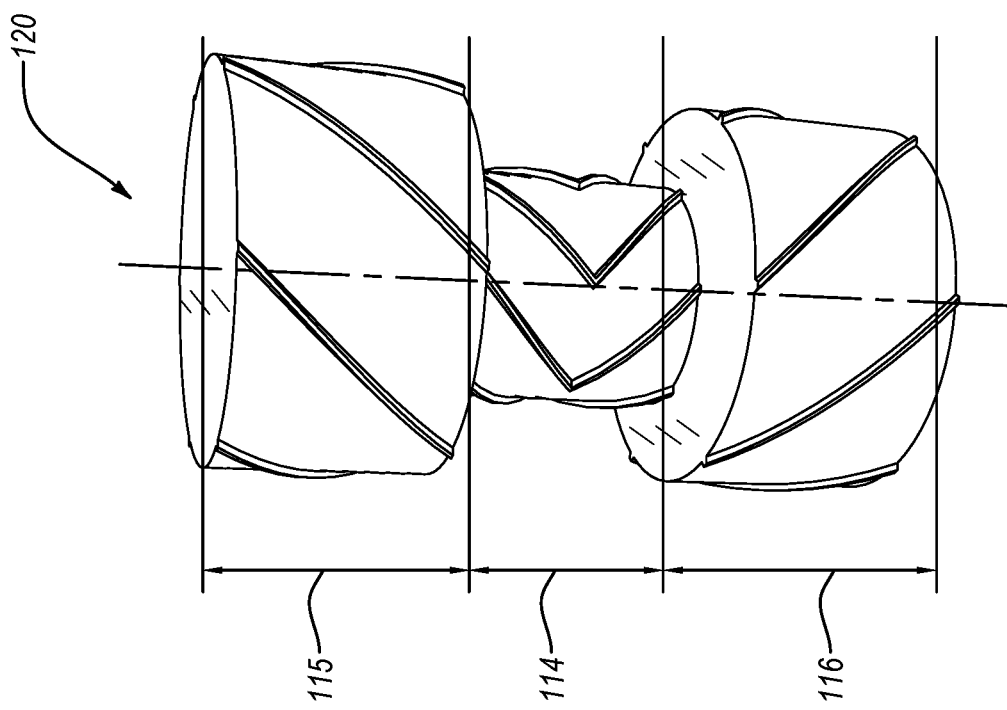
FIG. 9 illustrates a second embodiment of a split pin.

FIG. 9 illustrates another embodiment of a split pin.

The second split pin 106 has a first segment 114, a second segment 115, and a third segment 116. The first segment 114 has a first shape profile. The second segment 115 and the third segment 116 has a second shape profile. The first and second shapes are cylindrical so that the shape profiles are circular. The first shape profile is a circle having a smaller diameter than the circle of the second shape profile.

The first segment 114 is configured to interface with a first raceway, the second segment 112 is configured to interface with a second raceway and the third segment 113 is configured to interface with a third raceway. The first and third raceways are shaped identically. The raceways are not shown.

Figure 10:
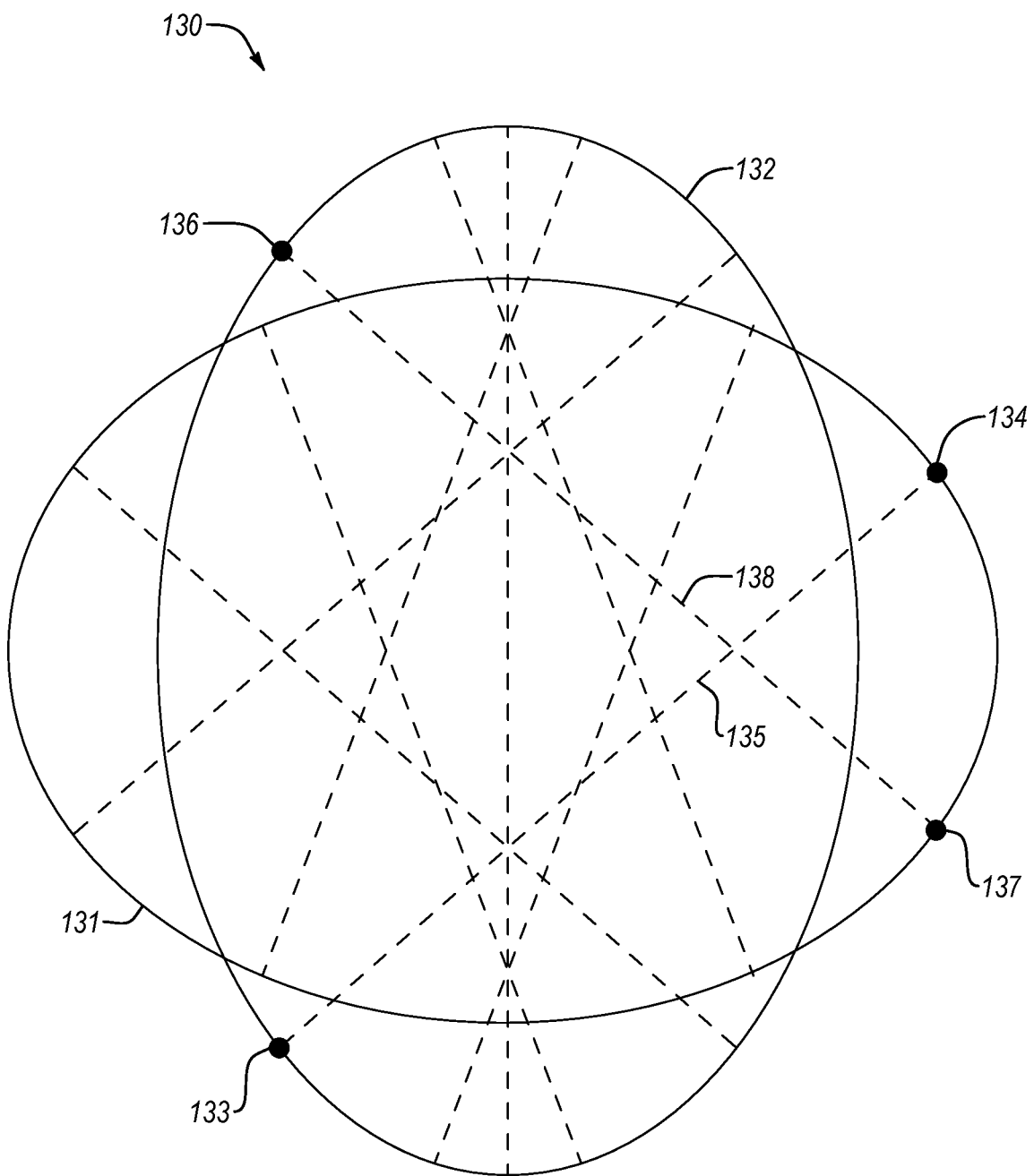
FIG. 10 illustrates a top view of one embodiment of a split pin.

FIG. 10 illustrates a top view of one embodiment of a split pin 130 having first shape profile and a second shape profile. In the illustrated embodiment, the first shape profile is elongated in a first direction and the second shape profile is elongated in a second direction that is at a right angle to the first direction.

A first segment 131 has a first shape profile that is at the middle of a split pin 130. A second segment 132 has a second shape profile that is at the top of the split pin 130 as shown. A third segment is not shown but is at the bottom of the split pin 130 directly beneath the first segment 131 with the same shape profile as the second segment 132. The first shape profile interfaces with a first raceway (not shown) and each of the two second shape profiles interface with a corresponding one of a second raceway (not shown) and a third raceway (not shown).

In the illustrated embodiment, the first shape profile and the second shape profile are co-opposing in that the first raceway can be positioned to substantially oppose the second and third raceways at contact points with each co-opposing shape profile as the co-opposing split pin rolls throughout the range of motion. The direct opposition of the raceways at the contact points with each split pin 130 tends to keep that split 130 stable between the raceways.

The co-opposing nature of the first and second shape profiles is illustrated using the dotted lines. Each dotted line runs from the perimeter of the first segment 131, perpendicular to the edge of the first segment 131 at that point, to the perimeter of the second segment 132, perpendicular to the edge of the second segment 132 at that point.

A first raceway (not shown) contacts a point 134 and a point 137, for example, as the segment 131 of the split pin 130 rolls through the range of motion. A second raceway (not shown) contacts a point 133 and a point 136, for example, as the segment 132 of the split pin 130 rolls through the range of motion.

The endpoints of each dotted line are exemplary points where the raceways can simultaneously make contact to substantially oppose each other as the split pin 130 rolls through its range of motion. When the points are co-opposing, the normal vector extending from the contact point at one endpoint of the dotted line is parallel to the normal vector extending from the contact point at the other endpoint of the dotted line. When the shapes are substantially co-opposing, the normal vector extending from one endpoint is parallel to the normal vector extending from the other endpoint within an accepted tolerance for error, for all points throughout the range of motion.

The dotted line between point 136 and point 137 is a normal to the surface at point 136 and normal to the surface at point 137. The dotted line between point 133 and point 134 is a normal to the surface at point 133 and normal to the surface at point 134. Each dotted line represents the relationship between co-opposing points on the split pin as the rolling elements rotates along the raceways (not shown) through its range of motion.

In some embodiments, both the first and second shapes are cylindrical and the first and second shape profiles are circular but have different diameters. Examples of cylindrical segments are shown in the split pins of FIGS. 8 and 9. In other embodiments, the shapes are elongated as shown in FIGS. 10 and 7. Alternatively, shapes can be more generally described with a set of frequencies each with associated constants:

$$ShapeX(\theta) = \sum_{n=1}^{NX} (a_n \cos(n\theta))$$

-continued $$ShapeY(\theta) = \sum_{n=1}^{NY}(b_n \sin(n\theta))$$

ShapeA(θ)=(ShapeX(θ), ShapeY(θ)) $f$ or $\vec{as}$ and $\vec{bs}$ specific to ShapeA ShapeB(θ)=(ShapeX(θ), ShapeY(θ)) $f$ or $\vec{as}$ and $\vec{bs}$ specific to ShapeB where θ is the parametric edge value that varies from 0 to 2π. NX is the number of frequencies in the X direction and NY is the number of frequencies in the Y direction, and $a_n$ and $b_n$ are constants for the specific shape. $\vec{as}=a_0 \ldots a_n$ are constants. $\vec{bs}=b_0 \ldots b_n$ are constants.

In a preferred embodiment, the co-opposing shapes are determined by specifying one of the shapes and running an optimization process to find the other. Not all shapes have a co-opposing pair. In a preferred embodiment, the shapes are smooth and regular.

The initial condition for the constants are set as a 1 followed by all zeroes:

$a_0 \ldots a_n = 1,0 \ldots 0$ $b_0 \ldots b_n = 1,0 \ldots 0$

An error function is evaluated using a number of test points dispersed around the edge of the shapes. An array of error values for each test point can be collected to form an error vector for an optimization algorithm. The number of test points is generally at least as many as the number of constants in $\vec{as}$ and $\vec{bs}$. Given ShapeA, the optimization algorithm adjusts $\vec{as}$ and $\vec{bs}$ of ShapeB so as to minimize the error vector.

Figure 11:
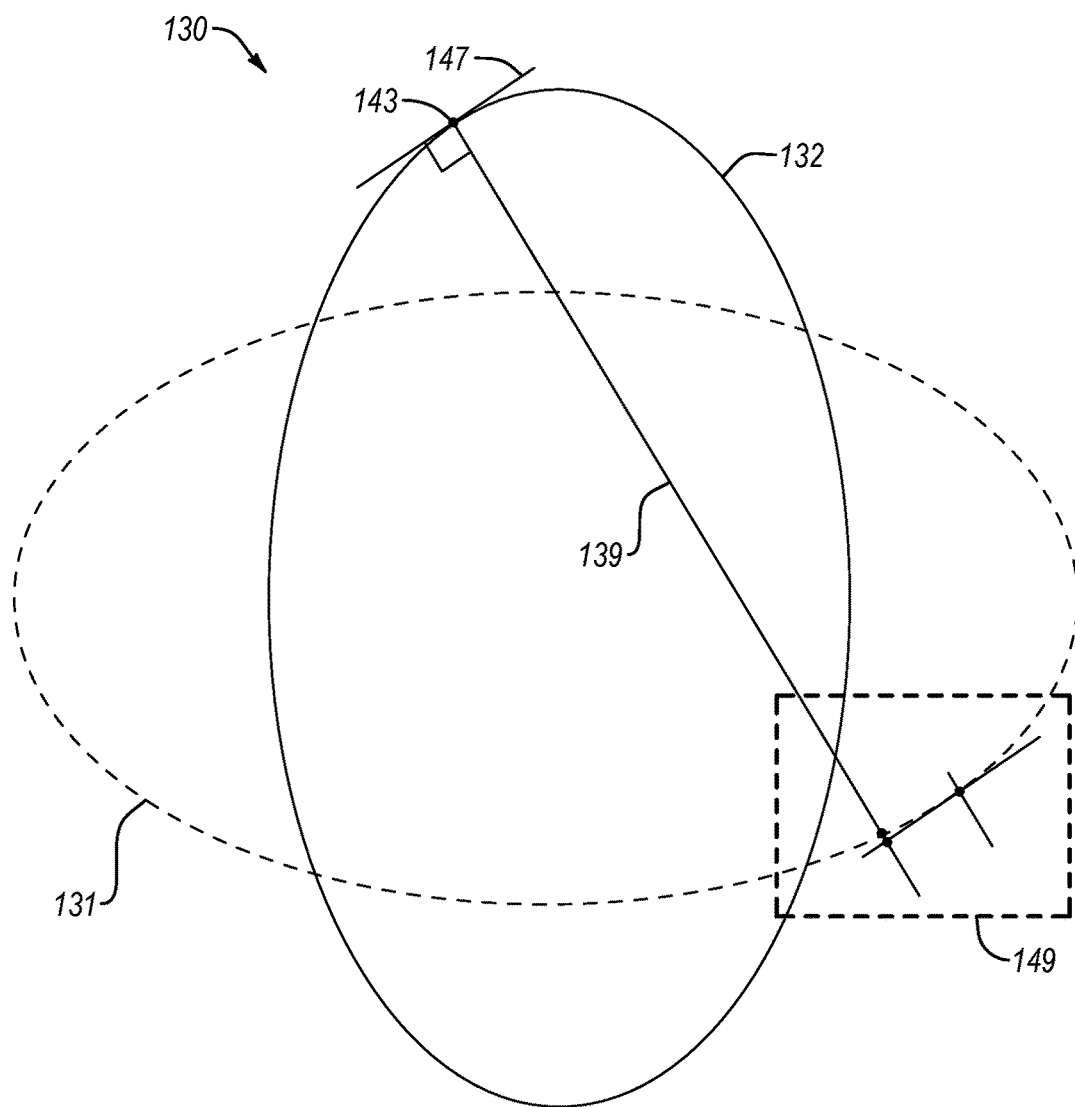
FIG. 11 illustrates one embodiment of an error calculation for a test point for co-opposing shape profiles for a split pin.
Figure 12:
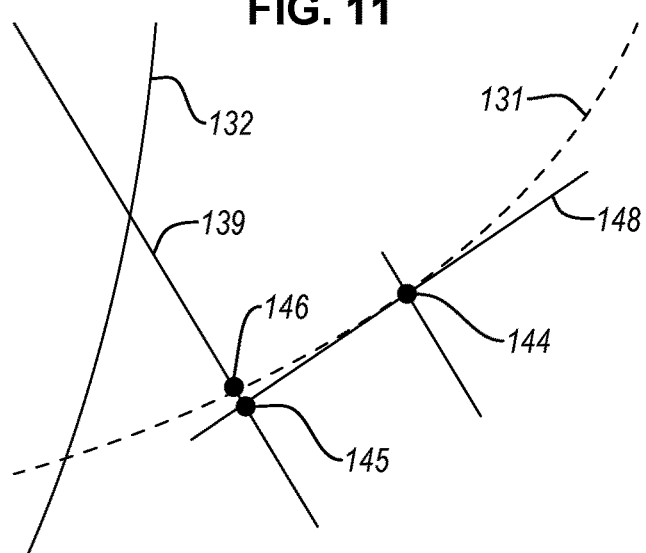
FIG. 12 illustrates a close-up view of the error diagram of FIG. 11.

FIG. 11 illustrates a diagram showing the basis for one embodiment of an error calculation for a test point in an iteration of an optimization process for co-opposing shape profiles for a split pin 130. FIG. 12 shows a close-up view of the region where the exemplary error measurements are made to show the relationship between the points in that region.

The first segment 131 has a first shape profile. The second segment 132 has a second shape profile. The first shape profile is referred to as ShapeA and the second shape profile is referred to as ShapeB in formulas described herein.

A normal vector 139 extends out from a tangent 143 at a test point 143 on the second segment 132. The normal vector 147 crosses the surface of the first segment 131 at a point 146.

A tangent 148 at a tangent point 144 on the first segment 131 is a tangent line that is parallel to the tangent 147 and closest to the point 146. In a preferred embodiment, the point 144 is found using a search algorithm.

A point 145 is where the normal vector 147 intersects with the tangent 148.

In a preferred embodiment, the error distance is the distance from the tangent point 144 and the point 145. The sign of the error distance is different depending on which side of the tangent point 148 that the point 145 is located. The error distance is zero when the point 145 and the tangent point 144 are at the same location. When the error distance is zero, the point 146 is also at the tangent point 144.

In a preferred embodiment, the error function returns a zero when the surfaces are co-opposing at the test point 146, is positive when the error distance is on one side of the tangent point 144 and is negative when the error distance is on the other side of the tangent point 144.

As the optimization algorithm iterates, the shape is adjusted to converge on a solution. In a preferred embodiment, the solution determined by the optimization process has an error vector containing all zeros, but results having non-zero errors is contemplated. Substantially co-opposing shapes includes co-opposing shapes with some errors within an accepted level of tolerance at various points through the range of motion. Some shapes do not have co-opposing shapes. When those shapes are encountered, they must be flagged for review by the overall design process.

Mechanism Design

In some embodiments, a designer specifies design parameters that are stored in a computer-aided-design (CAD) system. The design process determines physical parameters of a mechanism 100 consistent with the design parameters. These design parameters may be determined based on an overall machine level design process. The overall machine level design process employs well-known techniques to consider the goals and constraints of the application for the mechanism.

Some of the components in the mechanism may be prior art mechanisms such as gears, cams, and multi-bar linkages. In some embodiments, the prior art mechanisms are optimized together with the raceway-based components as part of an overall machine level design. In other embodiments, the design parameters for the raceway-based components are determined at least in part by the prior art mechanisms.

One typical goal of a design is to maintain forces and stresses within accepted tolerance levels and ensure that the components do not interfere with each other. In some embodiments, this may require trial and error, changing input and output motions and rolling element start positions if the previously identified solution does not meet these or other requirements.

In some embodiments the physical parameters are stored in a standard CAD design format that specifies the physical design of a mechanism so that it can be used directly or indirectly by manufacturing systems and devices to manufacture the mechanism.

In a preferred embodiment, a designer specifies the motion of two or more components of a mechanism. In some embodiments, one component is configured to receive an external force that is an input to the mechanism and another component is configured to drive an output motion. In some embodiments, multiple components can receive input motions and multiple components can drive output motions. In some embodiments, one or more components can either accept an input motion or drive an output motion depending on how the mechanism is used. In some embodiments, the mechanism includes one or more ground components that do not move relative to the reference co-ordinate system, but which interact with the moving components. Such components are typically referred to as a "ground", "chassis" or "frame".

At least two of the components have at least one raceway. The raceway comprises just one edge of the component. The rest of the component is specified by the designer to meet other requirements for the application of the device.

The motion of each component is specified in terms of x-position, y-position, and rotation angle, for a range of motion having a specified number of intervals (n points). The position information for the components are stored as floating-point numbers in X, Y, and rotation arrays each having n points where the ith element of the array represents the position of the component at the with interval. The number of intervals is selected to sufficiently represent features of the specified movement. In a preferred embodiment, the movement is sufficiently represented when the movement is smooth.

The initial rolling element path includes the starting position of the rolling element and the second and subsequent positions of the rolling element throughout the range of motion. The initial rolling element path and the direction of rotation, clockwise or counterclockwise, must be specified. The rotations of the rolling element are computed.

If the motion of the components are reciprocating or back-and-forth motion, only the forward motion may be optimized in some embodiments under the assumption that the optimization in the reverse direction is redundant.

Given the design parameters such as the input motion of a first component, the output motion of a second component, the initial paths for the pins, and the direction of rotation of the pins, a search algorithm may be used to find an optimal or satisfactory solution. In a preferred embodiment, the goal of the search algorithm is to find second and subsequent positions of the rolling element path which minimizes the rolling element sliding on the raceway and maintains substantially opposing pin-raceways contact points throughout the range of motion.

Figure 13:
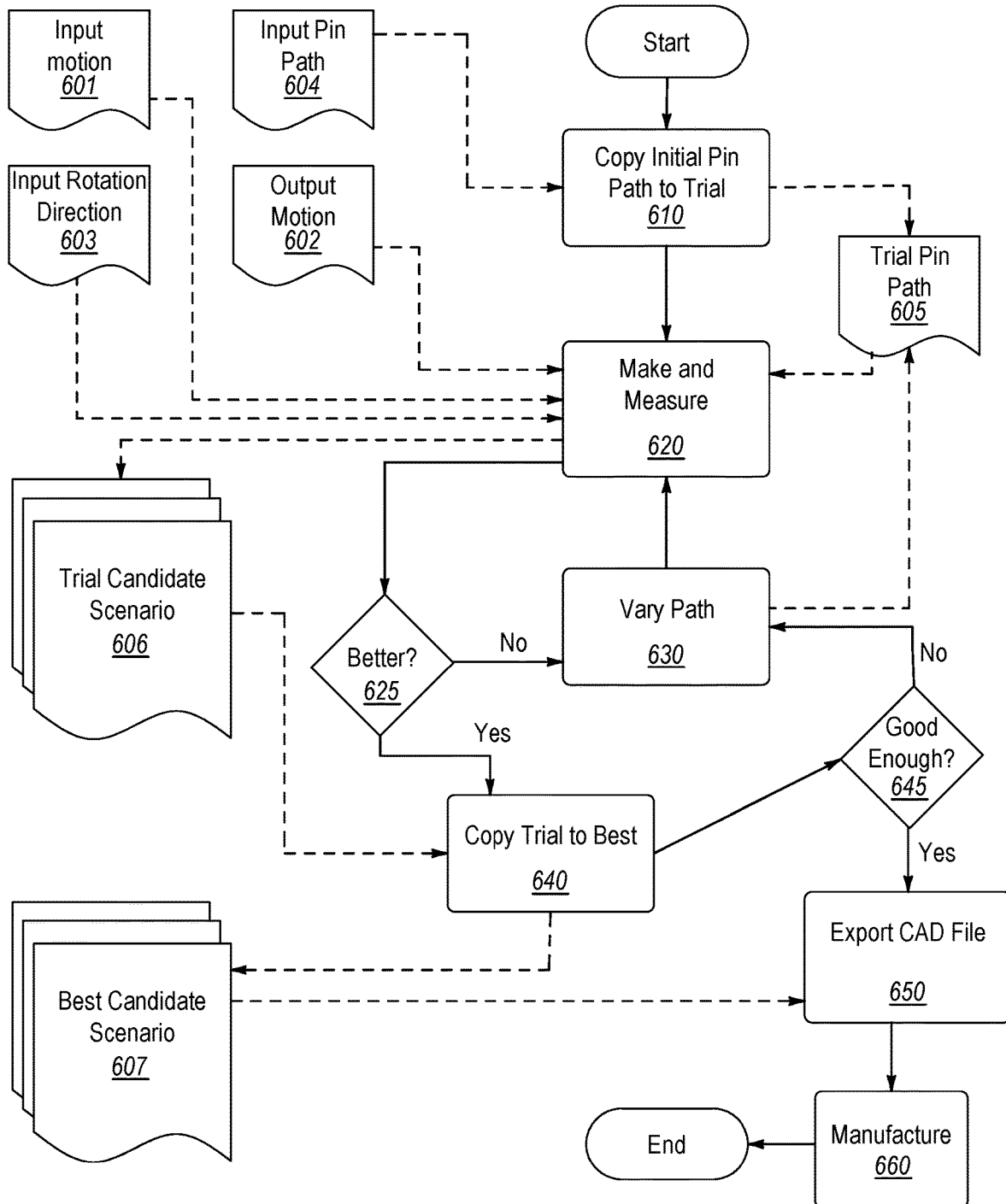
FIG. 13 is a top view of one embodiment of a mechanism prior to optimization.

FIG. 13 depicts a flow chart for one embodiment of a search algorithm for each bearing element. The bearing elements comprise a pair of raceways on either side of one or more rolling elements. Each bearing element forms an interface between two components of a mechanism. Multiple bearing elements may define multiple interfaces between the same pair of components. Multiple bearing elements may each define interfaces between different pairs of components.

An input motion store 601, an output motion store 602, a pin-rotation-direction store 603 and initial rolling element path store 604 are computer-readable medium that stores respective data structures for each design parameter.

In a preferred embodiment, the path of the rolling element is iteratively determined, along with the shape of the raceways, to converge on a solution using a multivariable search algorithm (MVSA). Alternatively, other optimization or solution search algorithms may be used to find a satisfactory solution. The process may use alternative directed algorithms designed to efficiently search for a solution.

The process may be an algorithm that evaluates randomly selected scenarios, tests each against the best-known solution, and updates the best-known solution if the currently evaluated scenario is better.

In other embodiments, the scenarios are determined based upon results from prior scenarios. An example of such search is described below.

In some embodiments, the process is directed at finding the best solution according to evaluation criteria. In other embodiments, the process is directed at finding a satisfactory solution according to evaluation criteria.

In step 610, the initial rolling element path store 604 is accessed from a computer readable medium to retrieve the initial rolling element path for the rolling element 102 and store the rolling element path in a trial rolling element path store 605. The initial rolling element path 610 may be specified by the designer or determined based on an automated initial rolling element path estimator algorithm, or from an overall machine level design, for example.

The trial rolling element path store 605 stores the rolling element paths representing the scenario currently being evaluated by the search algorithm. The first trial rolling element path is the initial rolling element path from the initial rolling element path store 604.

In a preferred embodiment, the MVSA process will iteratively generate candidate scenarios having various parameters including shapes of the two raceway surfaces separated by the rolling elements. The combination of the design parameters controlled and modified during the MVSA, as well as other relevant characteristics of the design, is referred to as a candidate scenario or candidate solution. In some embodiments, the candidate scenarios include rolling element configuration(s), including whether each rolling element is a split pin or a single-shape pin, the initial rolling element position(s) and the shape(s) of the pin(s), including the diameter of the rolling elements 102.

The MVSA process is constrained based on requirements that a solution must satisfy. The specified motion of the components, such as the input motion and the output motion, are constraints on the MVSA process.

For a closed-loop raceway, another constraint on the MVSA process is the requirement that the shape of the raceway surfaces results in a closed loop.

In a preferred embodiment, the shape of the closed-loop raceways are continuous and smooth over the whole loop. At the point where the ends of the raceways are joined, the ends are aligned and the slope is continuous. In some embodiments, a spline function is used to smooth the motion of the components and to insure a continuous and smooth motions across the beginning and the end.

Another constraint on the MVSA process is that the guide structure pattern defined by the pattern of one rotation of the guide rolling element is repeated an integer number of times on the surface of each closed loop raceway so that the rolling element can rotate through multiple loops of the closed loop raceway without a discontinuity in the rolling-element/raceway interface. In some embodiments, the use of split pins may be required to satisfy these constraints, or to achieve a better solution according to evaluation criteria.

In a preferred embodiment, the candidate solution is evaluated based on a predetermined evaluation criterion sometimes referred to as an objective function. The objective function may be a sum of various characteristics of a candidate design that are calculated or estimated based on the candidate scenario.

In step 620, a virtual make and measure process is performed. Since the mechanism 100 is virtually made based on a computer-based model rather than physically manufactured, it is referred to as a virtual make and measure process. Generally, this process includes three steps. First, find the raceways edges using a 2D sweep surface algorithm. Each sweep will generate two surfaces for each component, one on either side of the pin. One corresponds to a clockwise rolling element rotation and the other a counterclockwise rolling element rotation. The specification from the designer determines the surface to use. The next step is to measure the opposition of the pin-raceway contact positions. Third, the rotation of the rolling element against each raceway is calculated and the rotation difference at any interval is the sliding of the pin.

In a preferred embodiment, a particular shape for each of the raceway surfaces is determined based on the candidate scenario. After the key physical characteristics such as raceway surfaces are determined for the candidate design, various characteristics of the candidate design are computed or estimated for evaluation of that candidate design. The path and rotation of the rolling element between the raceway surfaces can be calculated at multiple test points through a plurality of intervals within the range of motion.

The amount of sliding during any interval can be calculated by first calculating the rotation of the rolling element against each candidate raceway. The difference in rotation along any interval is the degree of sliding. Sliding is undesirable and used a part of the error vector for the search algorithm. The sliding tends to increase friction and energy loss during operation of the mechanism 100.

The sliding error is the sum of the absolute value of difference in rolling element rotation computed for each raceway, for each point on the rolling element path.

When the sliding error for a rolling element is zero, sliding is avoided for that pin. When the sliding error is non-zero, the rolling element slides to some extent, but the rolling element is substantially rolling if the rotation error is within a predetermined tolerance level.

A contact normal vector can be determined for each contact point between the rolling element and the raceway surfaces at each interval. An opposing-angles error measures the cross product of the contact normal vectors at the contact points between the raceways coupled to the pin. When the cross product is zero the contact normal vectors directly oppose each other. When the dot product is non-zero, the contact normal vectors are not perfectly aligned. The contact points are substantially opposing if the cross product of the normal vectors are within an predetermined tolerance level.

The sliding error is the sum of the absolute value of difference in rolling element rotation computed between each raceway, for each interval, summed across all intervals. The opposing angle error is the absolute value of each opposing angle summed across all points of the rolling element path.

When the opposing-angles error for a rolling element is zero, the raceways directly oppose each other over all intervals throughout the range of motion. When the opposing-angles error is non-zero, the raceways do not perfectly oppose each other at the respective contact points for at least some intervals, but the raceways are substantially opposing if the opposing-angles error is within a predetermined tolerance level.

Mechanical stress can also be determined for each contact point between the rolling element and the raceway surfaces at each interval, according to various methods including finite element analysis.

In a preferred embodiment, the goal of the MVSA is to find a candidate scenario that minimizes sliding error and contact normal alignment error. When specifying an objective function for the MVSA algorithm, the sliding error and contact normal alignment error may be weighted to compensate for the different numerical scales and the relative importance of the errors in evaluating a candidate scenario.

Once the error vectors are defined, different scenarios can be objectively compared to determine which scenario is better according to the error vector. A solution is found when the error vector is minimized or determined to be satisfactory (within a specified tolerance level).

In some embodiments, the diameter of the rolling elements are evaluated and modified during the MVSA process.

In some embodiments, split pins are used, and the shape of the co-opposing split pins are evaluated and modified during the MVSA process. In such cases, the co-opposing angle error may be incorporated into the objective function for evaluation of the candidate scenarios. In some embodiments where a closed-loop solution is desired, the difference in the first and last rolling element path X values and Y values are included in the error vector. To enable the closure of the path, the two radiuses of the split pin are included in the candidate scenario. To get the loop to close with an integer number of guides, a target guide number is set for either the input or output raceways. The target guide error is the difference between the target guide number and the perimeter of the raceway divided by the perimeter between two guides on the corresponding pin. To enable the process to reduce target guide error, the radial distance of the rolling element start position is added to the candidate scenario.

In step 625, it is determined whether the candidate scenario stored in the trial candidate store 606 is better than that stored in the best candidate store 607. In some embodiments, this determination is made by comparing the error vector for the candidate scenario and the best candidate scenario.

Various objective functions can be used to compare scenarios. In some embodiments, the better error vector is one that has a lower maximum of the absolute value of the errors in the error vector. In other embodiments, the better error vector is one that has a lower sum of the absolute values of the errors in the error vector. Other methods of comparing error vectors may be used.

For the initial rolling element path, the best candidate store 607 is initialized to the first candidate scenario for comparison with future candidate scenarios.

If the candidate scenario is not better than the best scenario in the best candidate store 607 as determined by comparing the error vectors, step 630 is executed to vary the rolling element path and other variables included in the optimization. Otherwise the trial scenario is copied to the best scenario in step 640.

If the candidate scenario is better than the best scenario in the best candidate store 607 according to the objective function, step 640 is performed to copy the information for the candidate scenario into the best candidate store 607. In some embodiments, the information includes the raceway shapes, the rolling element path, the error vectors for the objective function and the value of the objective function.

In step 645, it is determined whether the candidate scenario is good enough. In some embodiments, the candidate scenario may be good enough if the associated objective function is maximized or minimized. In some embodiments, the candidate scenario may be good enough if the associated objective function is zero (e.g., no rolling element sliding, no opposing-angles error or other error characteristics) or within a predetermined error tolerance from the optimal objective function. In other embodiments, the best candidate scenario found at some point might be considered good enough after a predetermined number of scenarios have been evaluated in the optimization process.

If the candidate scenario is not good enough according to the objective function, step 630 is executed to vary the rolling element path according to the MVSA and copy the new rolling element path into the trial rolling element path store 605. Step 620 is then performed to make and measure as described herein according to the new trial rolling element path.

When the candidate scenario is good enough, a solution is determined.

In step 650, the raceway edges are exported. The pair of two-dimensional (2D) lines (representing the edges of a raceway) are extruded to a 3D surface to represent the raceway for each raceway in the solution. The patterns associated with guides are then imposed onto the three-dimensional (3D) surface.

In a preferred embodiment, the result of the design process is saved in a computer aided design (CAD) file according to any number of standard formats. The CAD file can be converted to a format accepted by a Computer Numeric Control (CNC) machine, 3D printer, or other manufacturing device or system to generate physical embodiments of the mechanism. The CAD format can also be used to generate a mold for the component, whereby the component can be made of plastic. The mechanism may be made in various materials such as steel, alloys, and plastics. Alloys with various proportions of molybdenum, tungsten, chromium, vanadium, aluminum, and silicon are often used for bearing elements to maintain hardness at high temperatures.

In step 660, the mechanism 100 is manufactured directly or indirectly from the CAD file.

Figure 14:
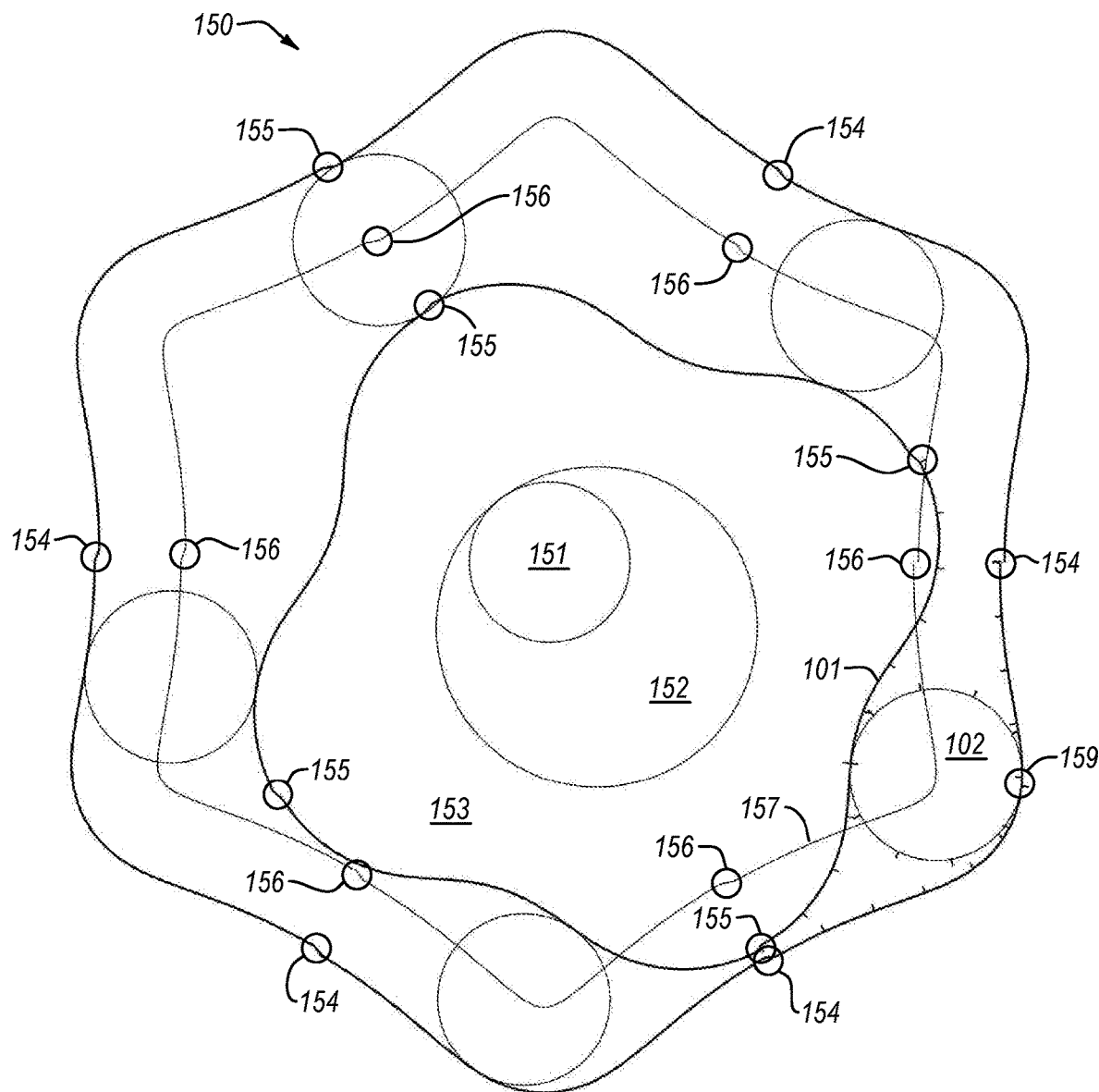
FIG. 14 illustrates a mechanism prior to optimization, the rolling element at the midpoint of an interval.
Figure 15:
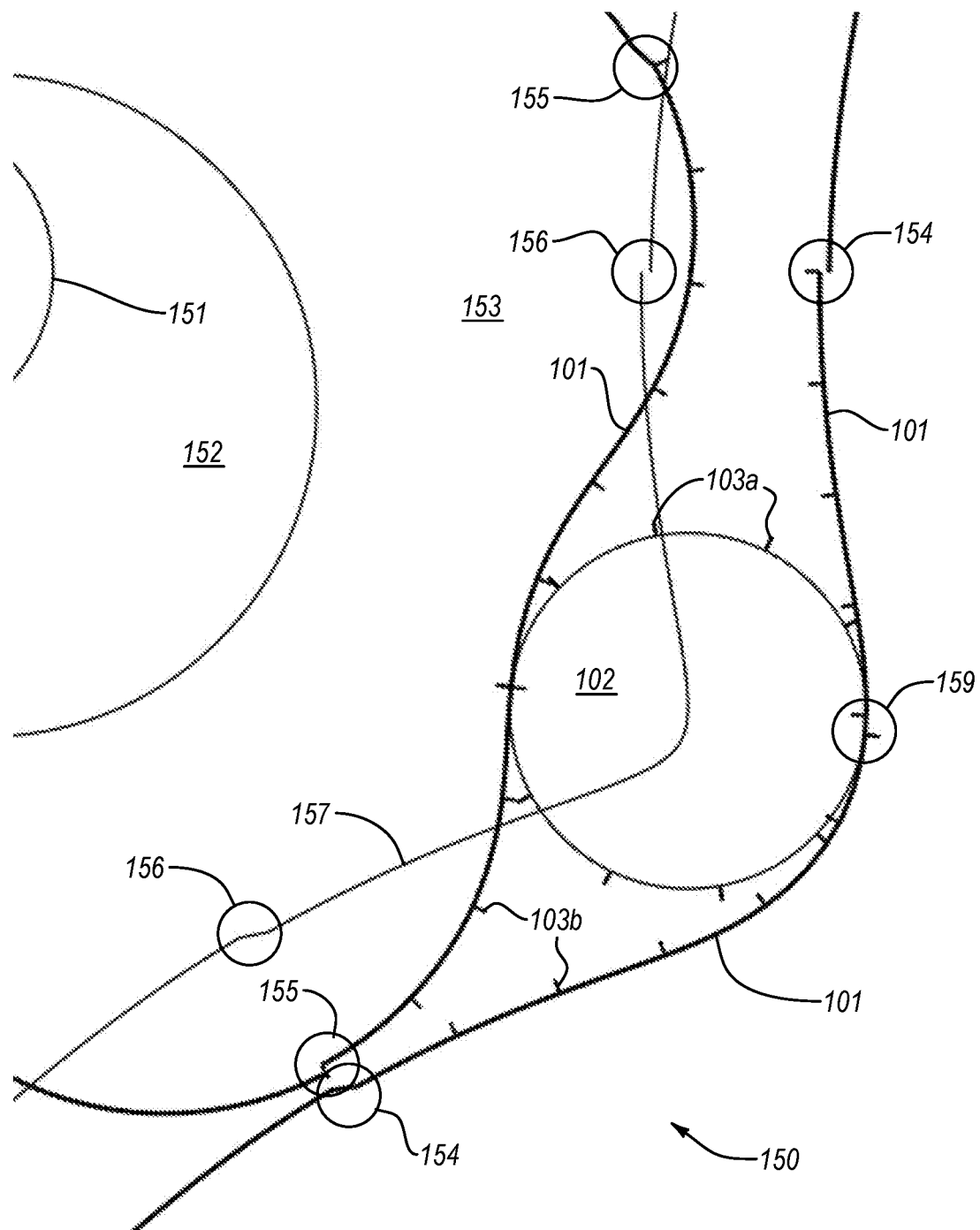
FIG. 15 illustrates a close-up of the mechanism of FIG. 14.

FIGS. 14 and 15 illustrate one embodiment of the optimization process applied to a mechanism 150. It includes a shaft 151 on a circular mechanism 152 coupled to a rotor 153. The preferred embodiment, the motion of the rotor 153 is part of the input specification to the optimization process.

In some embodiments the number of rotating elements 102 are determined by the application. For example, the number of rotating elements 102 may be dictated by design considerations for a speed reducer as explained below. In other embodiments, the number of rotating elements 102 may be suggested by physical stability considerations as the mechanism 150 moves through its range of motion.

In some embodiments the number of rotating elements 102 is one of the parameters in the candidate scenarios in order to find the best solution. In some cases, there may not be a solution for a particular number of rotating elements 102. In other cases, a particular result may be rejected for physical stability reasons.

In the illustrated example, the raceway 101 for the rotor 153 has 4 repeating intervals. There are 5 rolling elements 102. The raceway 101 on the other side of the rolling elements 102 has 6 repeating intervals. The rolling element 102 is shown in the mid-point of the interval.

The overview of the mechanism 150 on FIG. 14 shows 6 discontinuities 154 in the outer raceway 101 and 4 discontinuities 155 in the inner raceway 101. These discontinuities are a result of the intervals interface with each other. Similarly, a path 157 illustrates the path of the center of the rolling elements 102 as they roll around the mechanism 150. The path 157 seems to move into the rotor 153 and various positions, but one must remember that the position of the rotor 153 is moving as the rotating elements 102 move. There are discontinuities in the path 157 between each of the six intervals. There is a misalignment of the guide structures 103a with the guide structure 103b, at point 159, for example. In some embodiments, the misalignment of the guide structures 103a to guide structures 103b is a result of sliding instead of rolling of the rolling elements 102 as it rolls through the range of motion.

When the optimization is completed, there should not be any discontinuity in the raceways 101, the path 157, or alignment of the guide structures 103a and 103b, as the rolling elements 102 should smoothly roll over these sections of the raceways 101.

FIG. 15 shows a close-up of one of the intervals prior to optimization. The rolling element 102 is shown in the mid-point of the interval. It shows the discontinuities 154, discontinuities 155, and misalignment 159.

Figure 16:
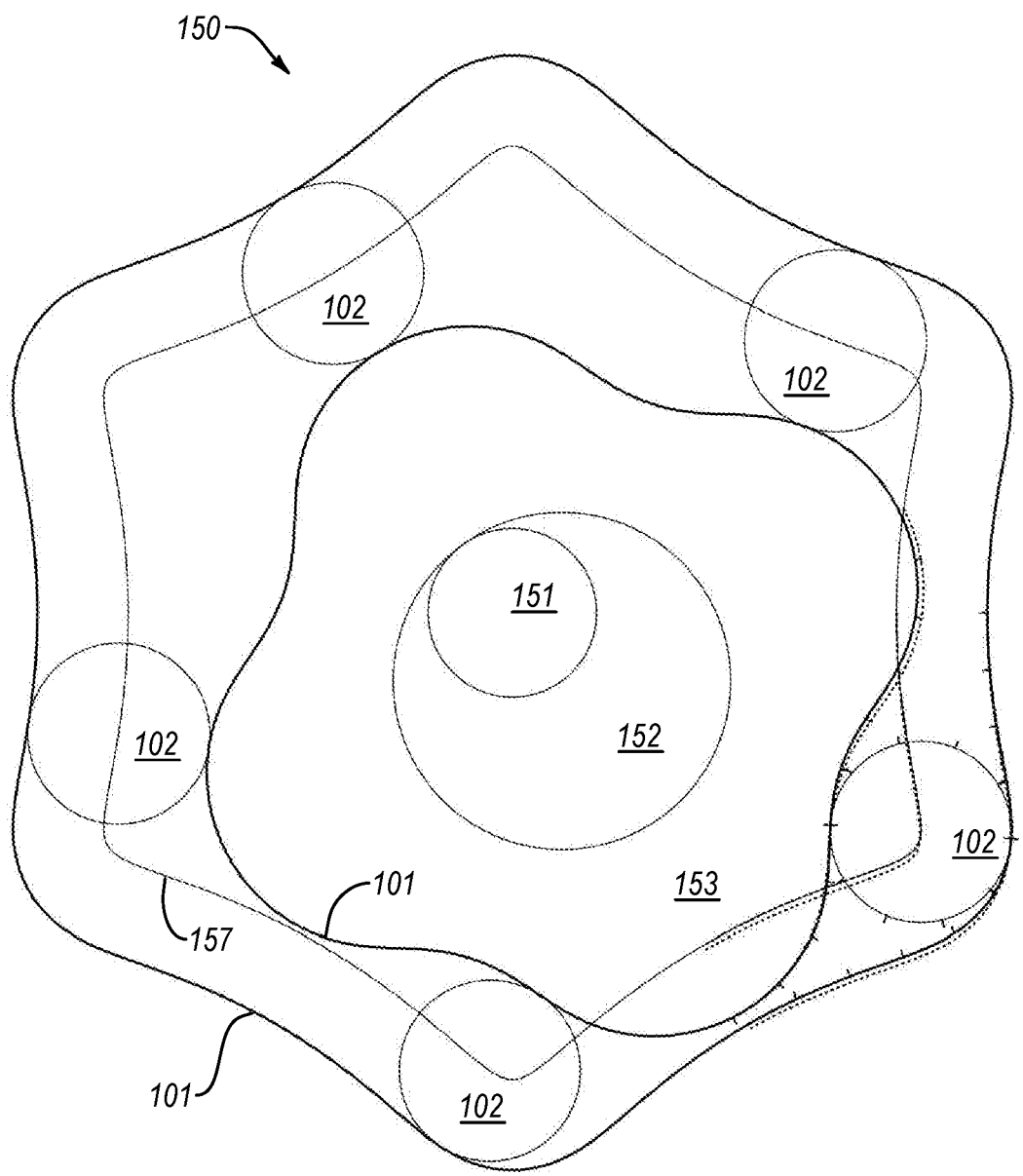
FIG. 16 illustrates a mechanism after optimization, the rolling element at the midpoint of an interval.

The discontinuities occur because the path of the rolling elements do not precisely end the point needed for the repeating pattern. The raceway shapes FIG. 16 shows the mechanism 150 of FIG. 14 after the optimization is completed.

The rolling element 102 is shown in the mid-point of the interval. The discontinuities 154, discontinuities 155, and misalignment 159 have been resolved so that the raceways 101 are continuous and smooth.

Figure 17:
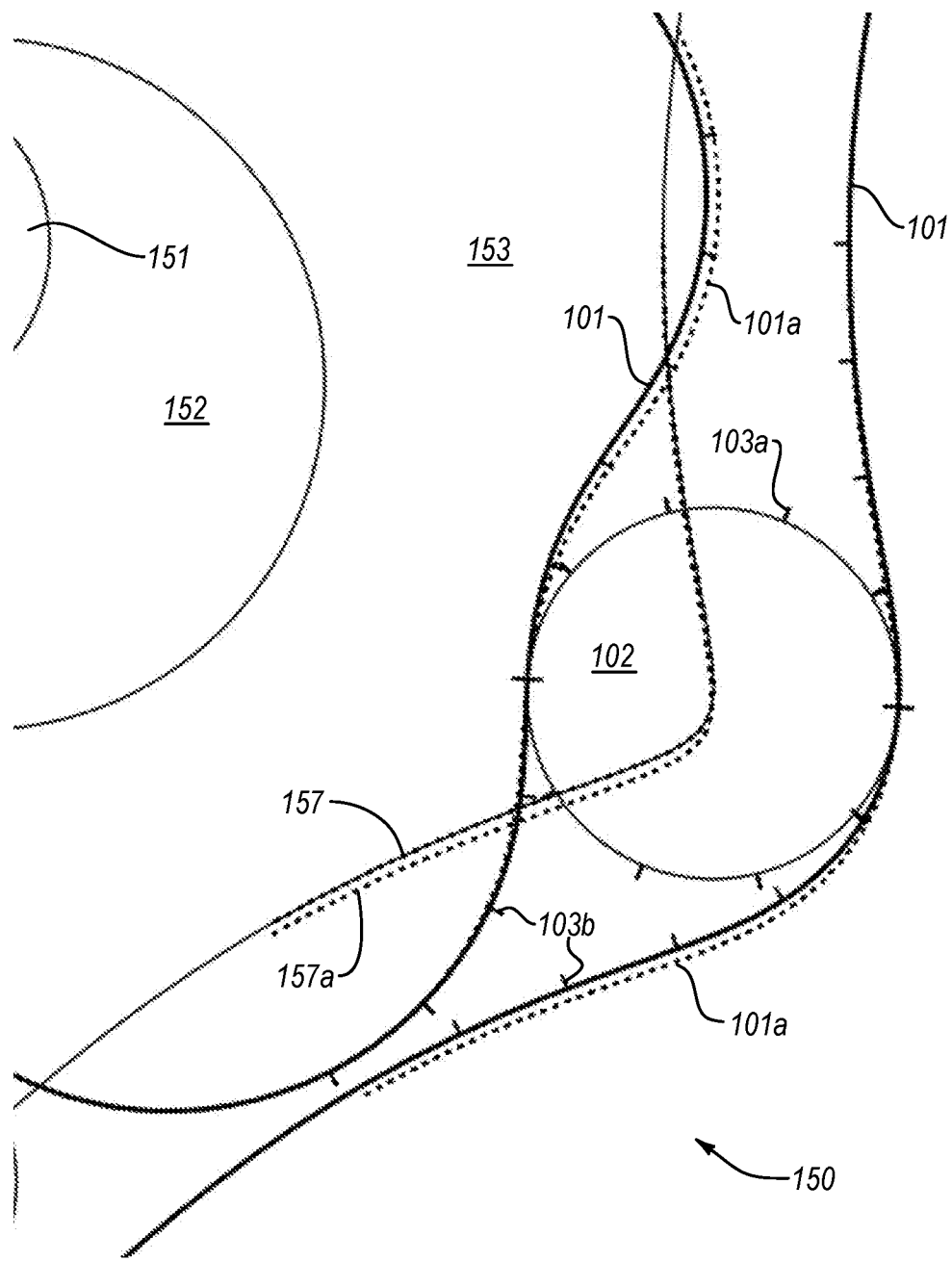
FIG. 17 illustrates a close-up of the mechanism of FIG. 16.

FIG. 17 shows a close-up view of the mechanism 150 of FIG. 14 after the optimization is completed.

The raceways 101a is the initial raceway path and the raceway 101 is the solution to the optimization. The discontinuities 154, discontinuities 155, and misalignment 159 have been resolved so that the raceways 101 are continuous and smooth. The path 157 is continuous and smooth.

Figure 18:
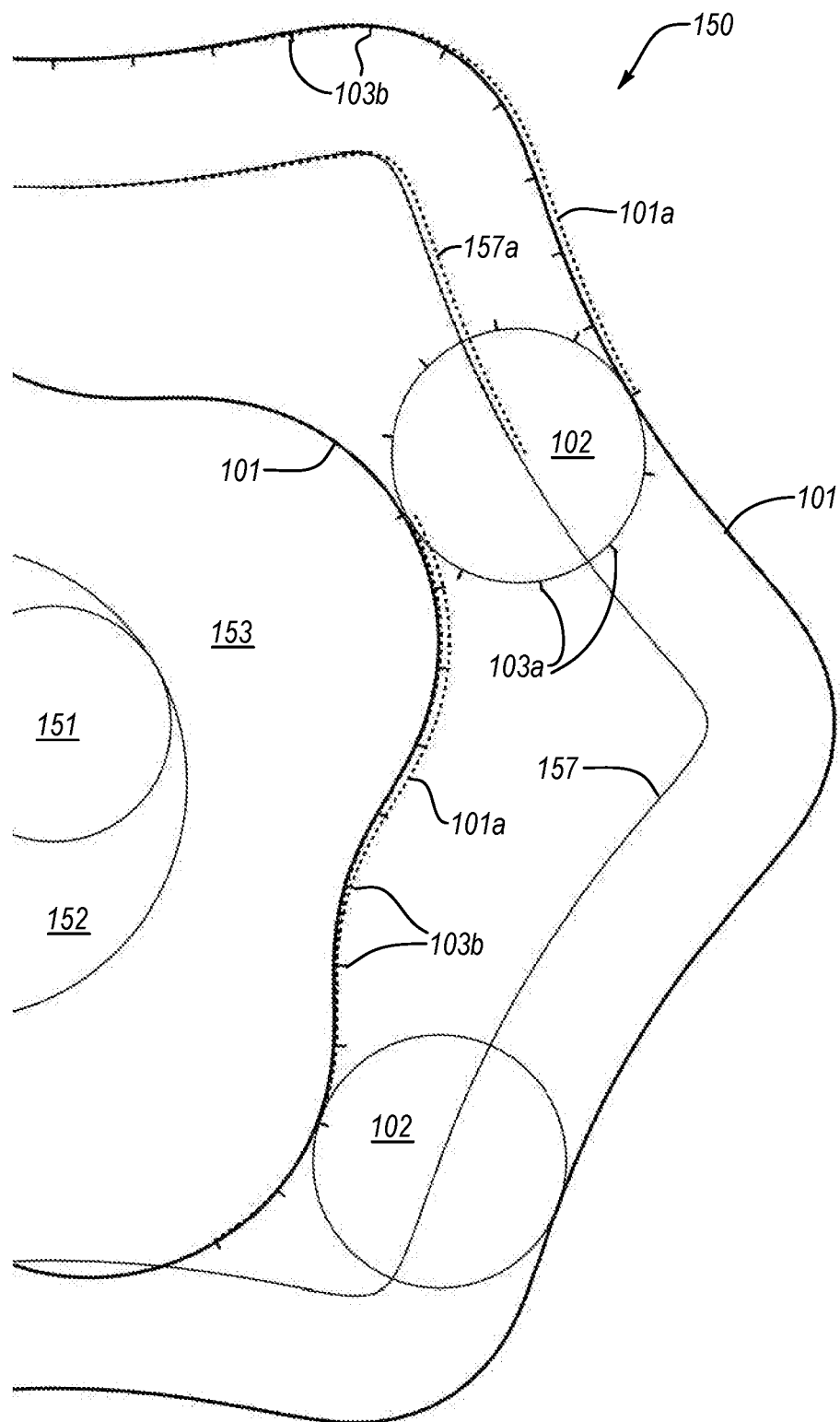
FIG. 18 is a close-up view of a portion of the mechanism after optimization, the rolling element at an endpoint of an interval.

FIG. 18 shows a close-up view of the mechanism 150 of FIG. 14 after the optimization is completed. The rolling element 102 is shown at an end of an interval rather than at the mid-point.

The raceways 101a is the initial raceway path and the raceway 101 is the solution to the optimization. The discontinuities 154, discontinuities 155, and misalignment 159 have been resolved so that the raceways 101 are continuous and smooth. The path 157 is continuous and smooth.

FIG. 12 shows an image of two embodiments of corkscrew devices for removing corks from a wine bottle (not shown).

A corkscrew 170 has a worm 173 that is screwed into a cork, and a handle 171 for pulling the cork with the inserted worm 173 out of the wine bottle using a fulcrum 172 resting on the neck of the wine bottle. The mechanical advantage of the corkscrew is the ratio of movement of the handle 171 to the movement of the worm 173. The mechanical advantage of the fulcrum 172 increases during the removal process. This causes two problems, first the low initial mechanical advantage makes it difficult to start removing the cork, since this is where the required force is highest. Second, the rapidly increasing mechanical advantage prevents complete removal of the cork without having to pull the cork out of the wine bottle as the last step of the process.

A corkscrew 160 has a handle 161 for securing the corkscrew 160 around the neck of the wine bottle, a worm 163 that is screwed into the cork as the lever 162 is lowered and pulls the cork out as the lever 162 is raised. A worm cap 164, upper ratchet mechanism 165 and lower ratchet mechanism 166 is positioned above the worm 163. Control of the rotation of the worm 163 during the cork removal process is controlled by the upper ratchet mechanism 165 and the lower ratchet mechanism 166 according to well-known processes. However, the mechanical advantage of the lever 162 has a constant mechanical advantage throughout the removal process. This typically makes cork removal easier than with the corkscrew 150. This device uses a rack-and-pinion mechanism that has significant friction and does not work well if without lubrication.

Figure 21:
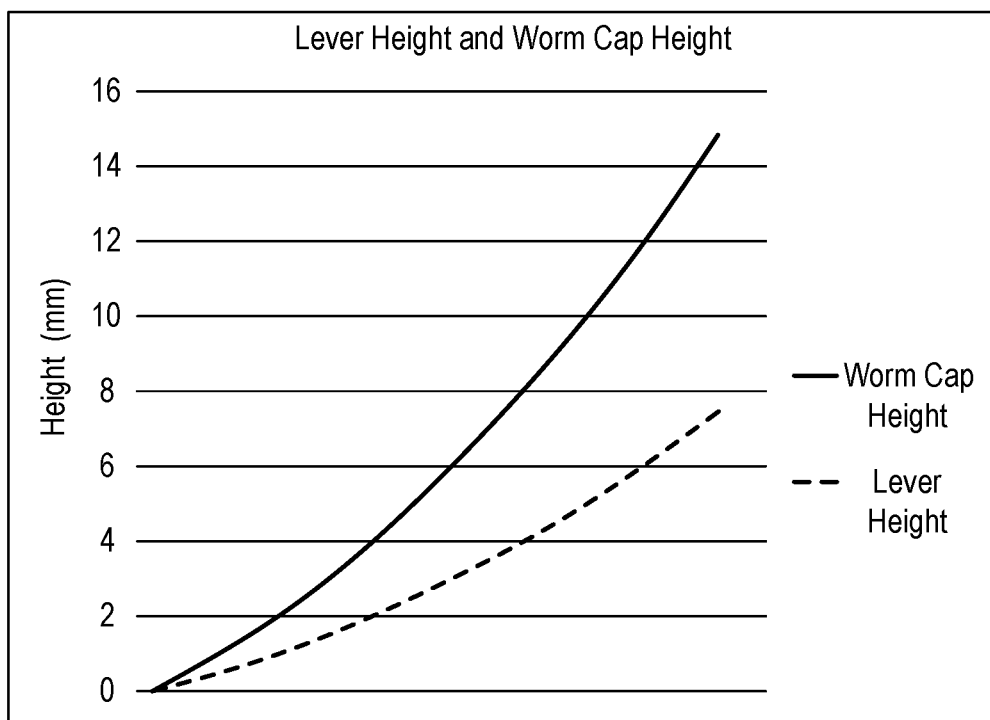
FIG. 21 is a graph of a lever height specification for a corkscrew.
Figure 22:
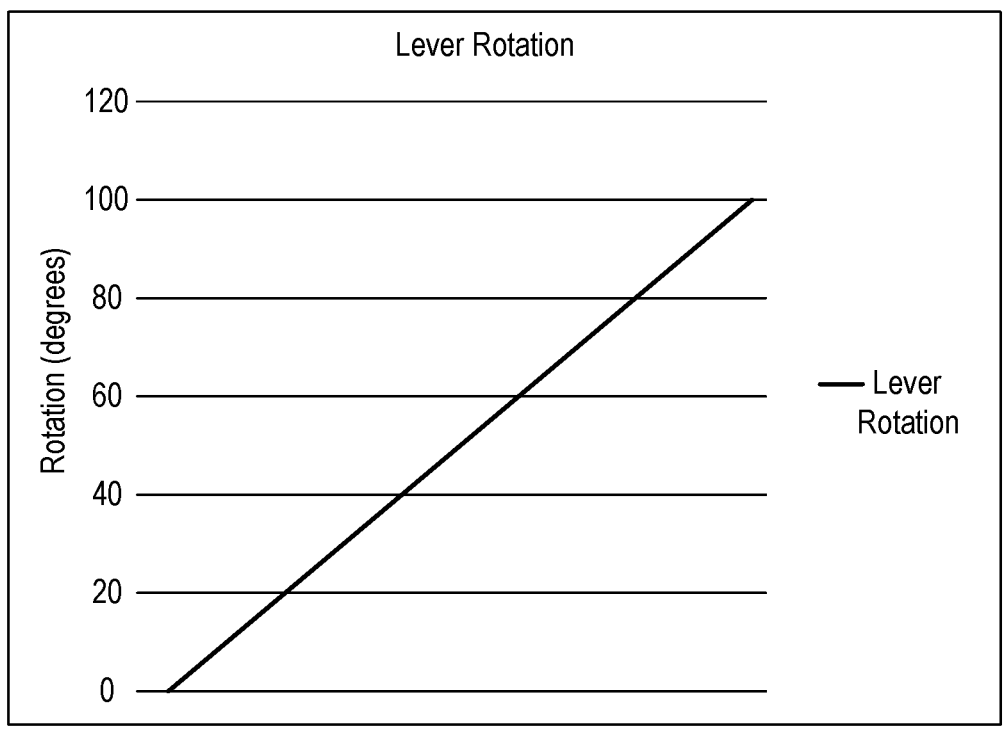
FIG. 22 is a graph of a lever rotation specification for a corkscrew.

FIGS. 21 and 22 shows a motion specification for a corkscrew.

FIG. 21 shows the worm drive height as a function of the lever arm height. The chart showing the relationship between the lever arm height and the screw pull height. One can see the worm drive height rises at about three times as quickly at the end of the removal process than at the beginning, thus increasing the mechanical advantage at the beginning. The forces for removing the cork are highest at the beginning where there is more cork in contact with the bottle. With this device, the mechanical advantage follows the force and hence the force on the lever is more constant.

FIG. 22 shows the rotation of the lever as it relates to the lever height and worm cap height shown in FIG. 21.

Figure 23:
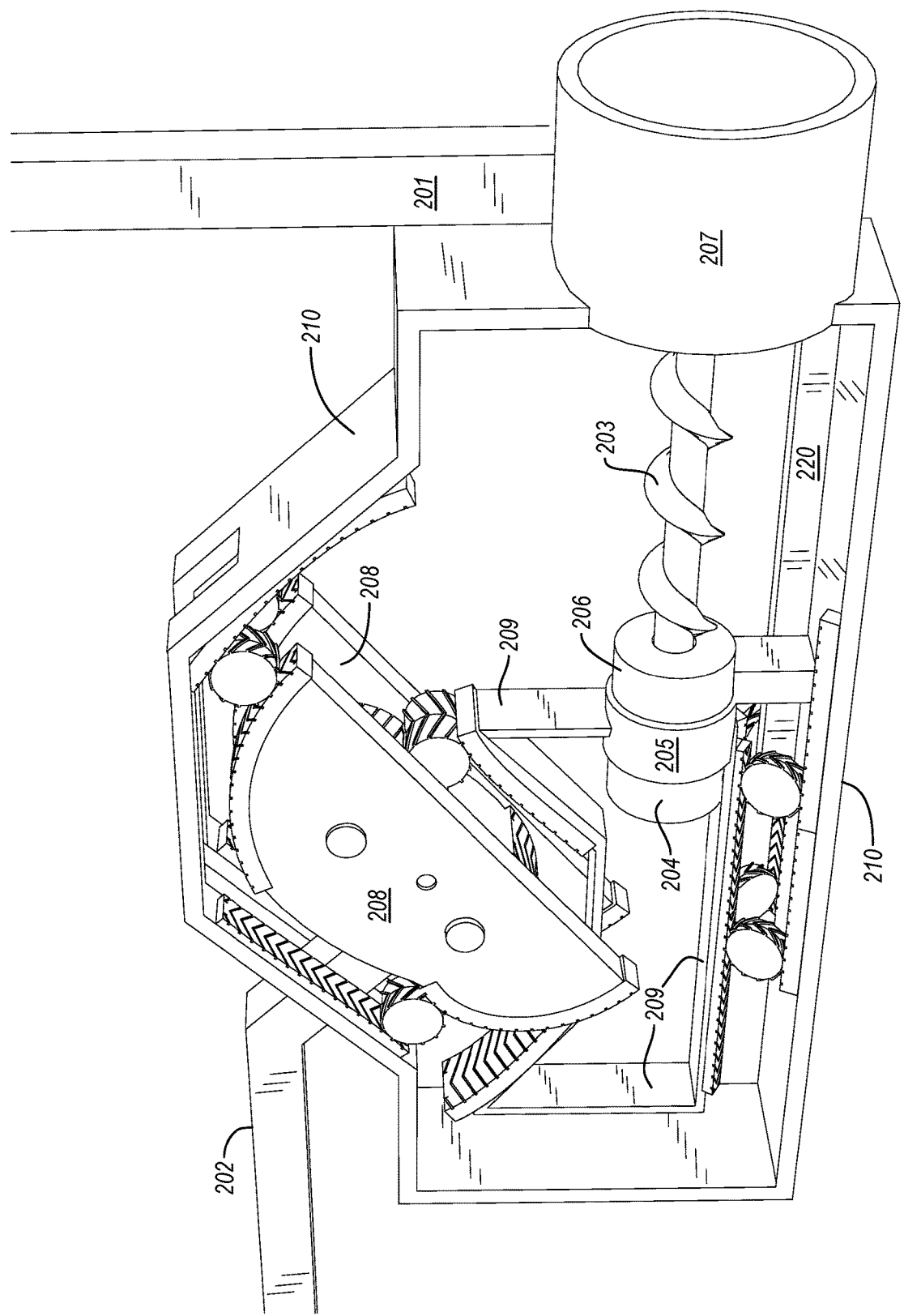
FIG. 23 is an embodiment of a corkscrew shown with the lever at a first end of the range of motion with the worm raised into the frame.
Figure 24:
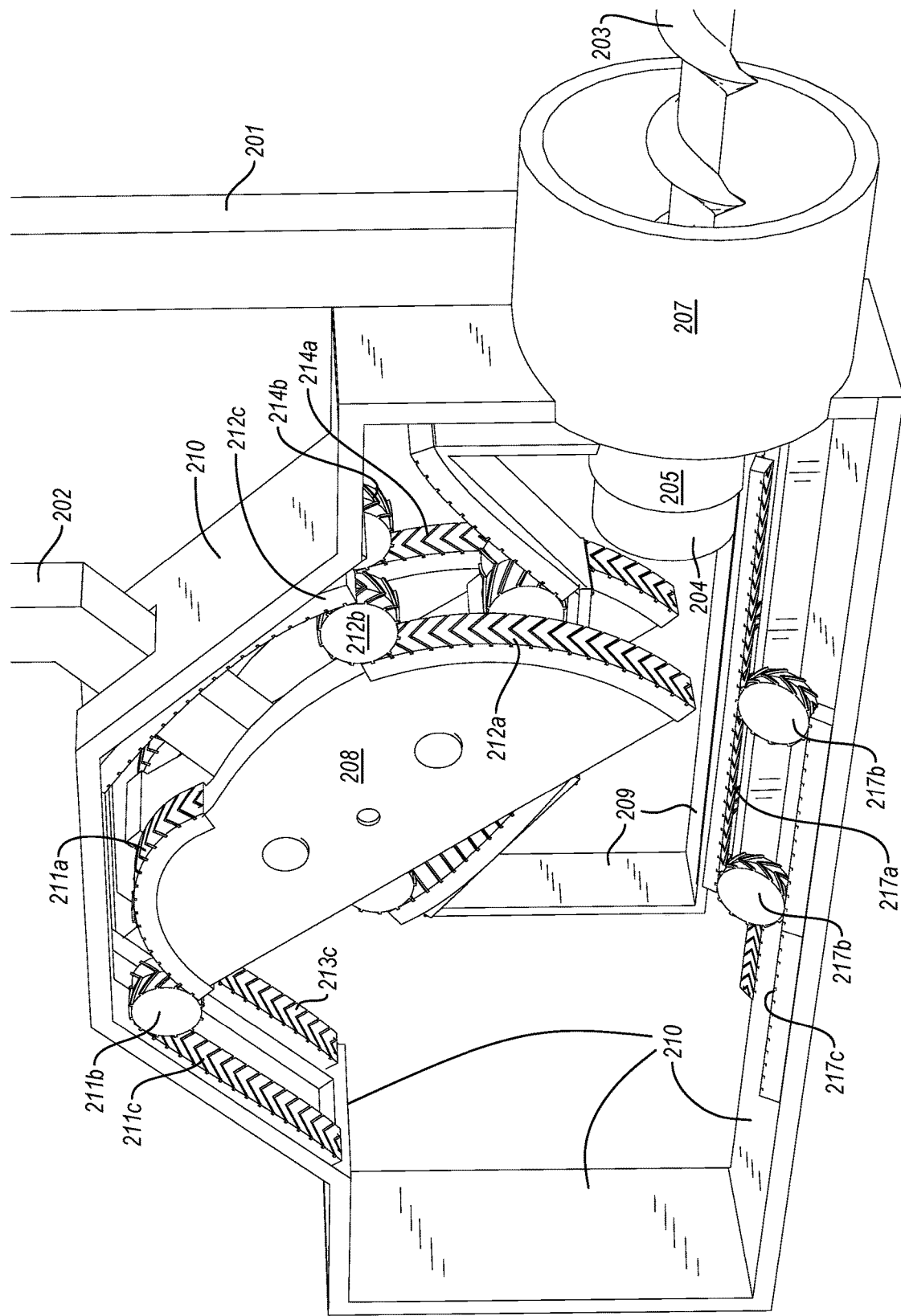
FIG. 24 is an embodiment of a corkscrew shown with the lever at a second end of the range of motion with the worm fully extended out of the frame.

FIGS. 23 and 24 illustrates one embodiment of a corkscrew 200, derived from the motion specifications of FIGS.

Figure 20:
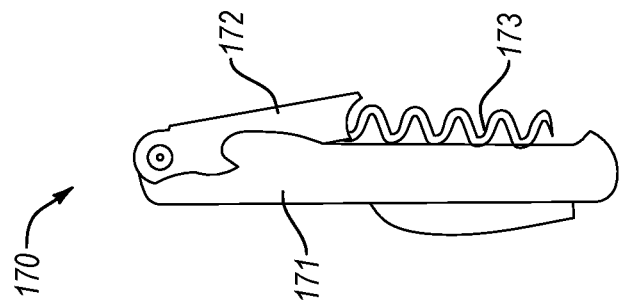
FIG. 20 is a second embodiment of a corkscrew device.
Figure 19:
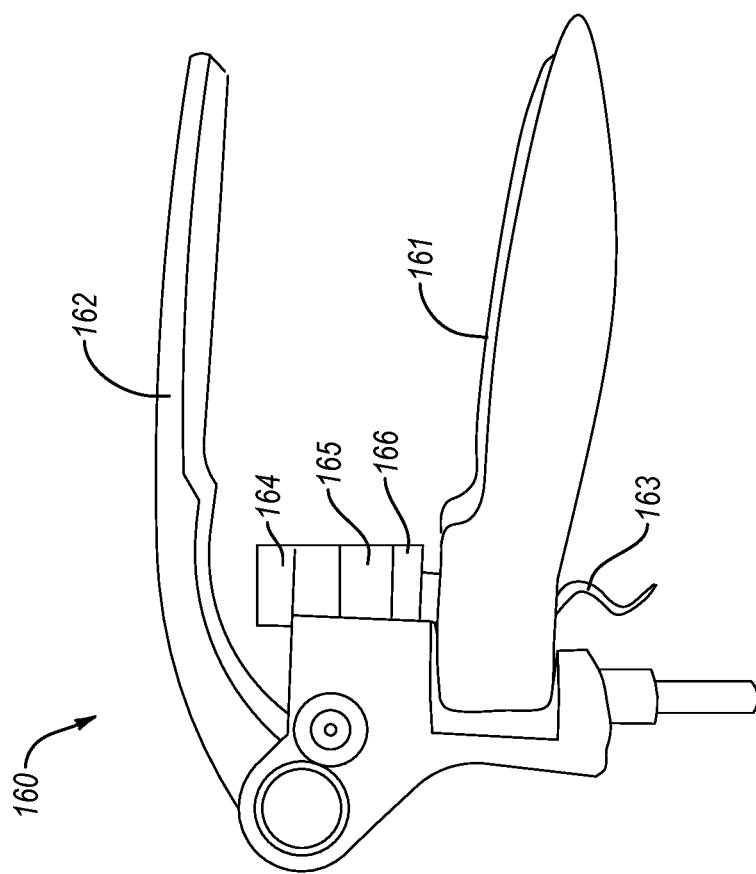
FIG. 19 is a first embodiment of a corkscrew device.

21 and 22, at both ends of its range of motion. FIG. 23 shows the lever 202 at the top of a range of motion and FIG. 20 shows the lever 202 at the bottom of the range of motion.

The corkscrew 200 includes a handle 201 coupled to a clamp 207 that is configured to receive the neck of a bottle of wine. The clamp 207 is also coupled to a frame component 210 that positions the worm drive component 209 to drive a worm cap 204 of a worm 203 into and out of the neck of the wine bottle in response to the motion of the lever 202 that drives a lever component 208. The lever component 208 includes a plate referenced in the following figures.

The corkscrew includes three components that interact with each other through bearing elements each comprising a pair of raceways and a rolling element as described herein. The components include the lever component 208, the worm drive component 209 and the frame component 210.

The worm cap 204 is connected to the worm 203 through an upper ratcheting mechanism 205 and a lower ratcheting mechanism 206. The details of the ratcheting mechanism are not shown. The ratcheting mechanisms controls the rotation of the worm 203 during operation of the corkscrew 200. The ratcheting mechanisms rotate the worm 203 into the cork, stop rotation of the worm while the worm is pulled up to remove the cork from the bottle and while the removed cork is brought down through the clamp 207, and rotates the worm 203 as the user holds the cork to remove the cork from the worm 203.

Figure 25:
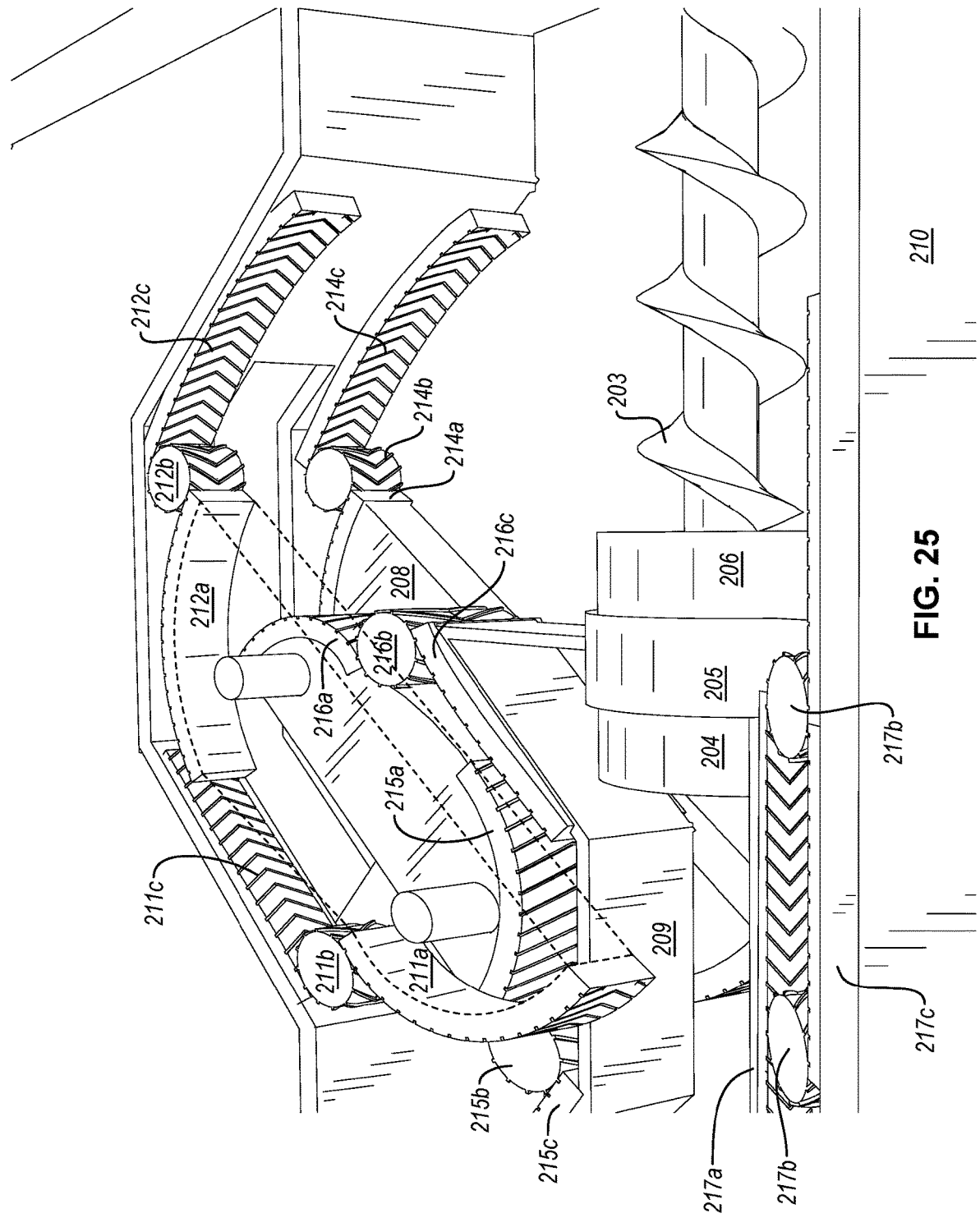
FIG. 25 is a close-up view of an embodiment of a corkscrew shown with the lever at a first end of the range of motion with the worm raised into the frame.
Figure 26:
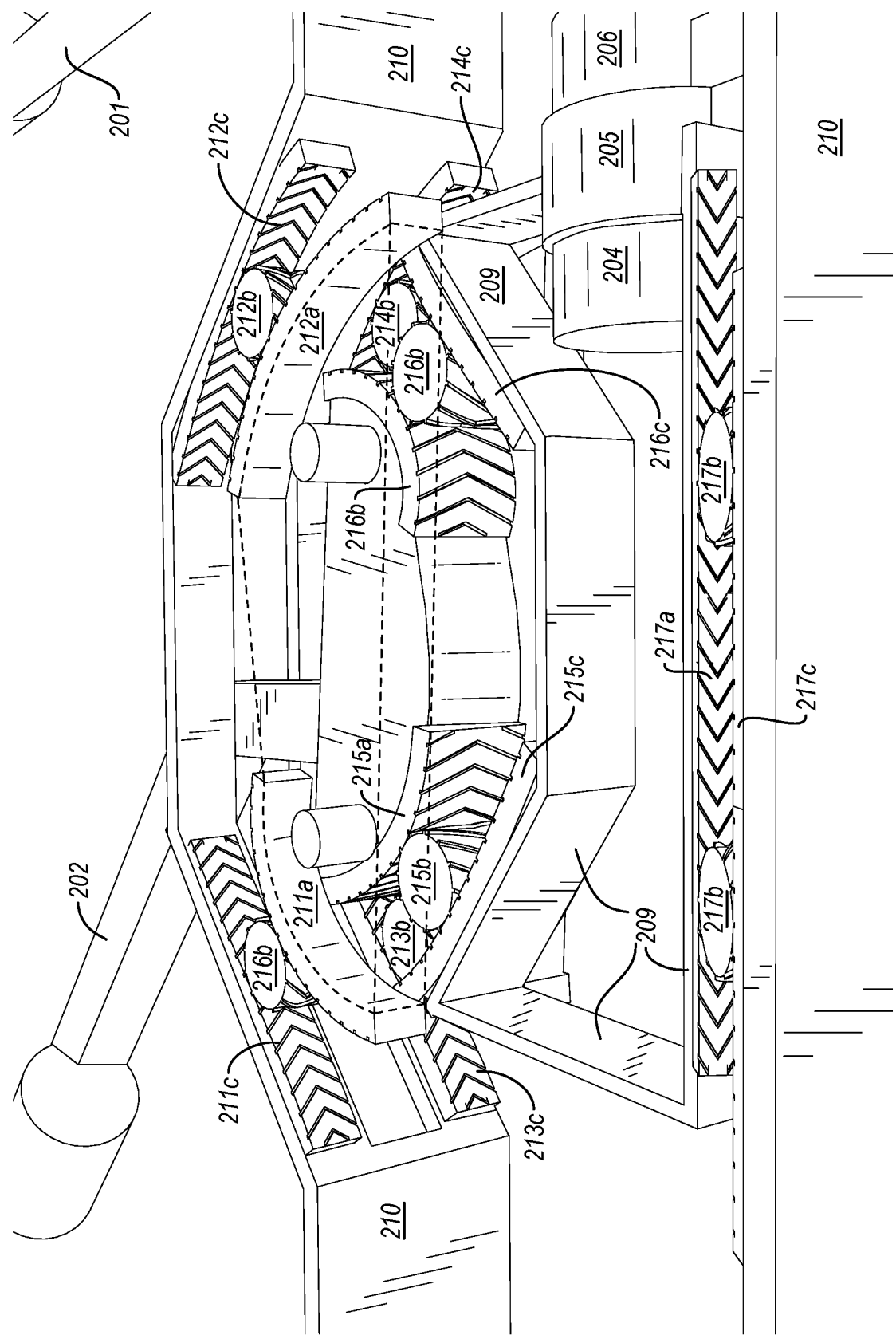
FIG. 26 is a close-up view of an embodiment of a corkscrew shown with the lever in the middle of the range of motion with the worm partially extended out of the frame.
Figure 27:
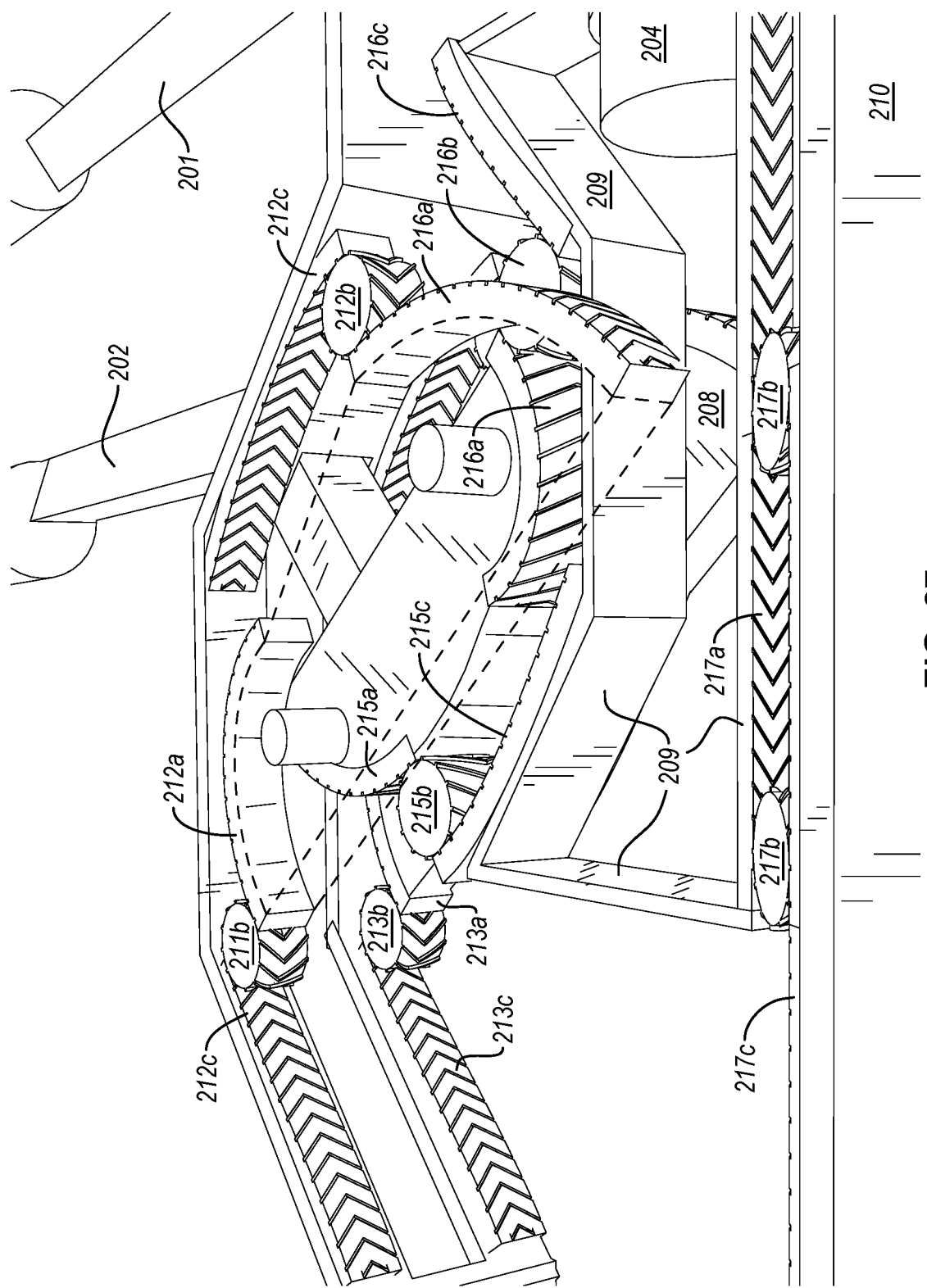
FIG. 27 is a close-up view of an embodiment of a corkscrew shown with the lever at a second end of the range of motion with the worm fully extended out of the frame.

FIGS. 25, 26 and 27 illustrate a close-up view of the lever mechanism for one embodiment of a corkscrew 200. The lever mechanism includes the lever component 208 and the attached rolling elements 211, 212, 213 (not shown), 214, 215 and 216, used to interface with the frame component 210 and the worm drive component 209. FIG. 16 shows the corkscrew 200 with the lever 202 in the top position. FIG. 17 shows the corkscrew 200 with the lever 202 in an intermediate position. FIG. 10C shows the corkscrew 200 with the lever 202 in the bottom position.

FIG. 25 illustrates a perspective view of the mechanism for a corkscrew 200 where the lever 202 is at the top of the range of motion. The top plate of the lever component 208 is not shown so as to avoid obscuring the underlying portion of the lever component 208 and the attached bearing elements. The raceway 211a and the raceway 211a are coupled to edges of the top plate (not shown) of the lever component 208. The raceway 211a and the raceway 212a seem to float in the drawing without the top plate, but the top plate is not shown to illustrate how the those and other raceways interface with the rest of the mechanism as the lever 202 moves through the range of motion. The raceways 211a and 212a of the top plate are coupled together through the omitted top plate of the lever component 208.

The range of motion of the lever 202 is restricted by the slot in the frame component 210. This restricted range of motion in the lever 202 is important for also limiting the range of motion of the lever component 208. The slot in the frame component 210 also restricts the lateral motion of the lever 202 to prevent the bearing element 211, bearing element 212, bearing element 213, bearing element 214, bearing element 215 and bearing element 216 from going out of alignment with the planar range of motion.

The bearing element 211 includes the raceway 211a coupled to the lever component 208, the raceway 211c coupled to the frame component 210, and the rolling element 211b rolling between the raceway 211a and the raceway 211c throughout the range of motion.

The bearing element 212 includes the raceway 212a coupled to the lever component 208, the raceway 212c coupled to the frame component 210, and the rolling element 212b rolling between the raceway 212a and the raceway 212c throughout the range of motion.

The bearing element 213 includes the raceway 213a coupled to the lever component 208, the raceway 213c coupled to the frame component 210, and the rolling element 213b rolling between the raceway 213a and the raceway 213c throughout the range of motion. Bearing element 213 is most clearly seen in FIG. 10C.

The bearing element 214 includes the raceway 214a coupled to the lever component 208, the raceway 214c coupled to the frame component 210, and the rolling element 214b rolling between the raceway 214a and the raceway 214c throughout the range of motion.

Together, bearing elements 211, 212, 213 and 214, interface between the lever component 208 and the frame component 210.

The bearing element 215 includes the raceway 215a coupled to the lever component 208, the raceway 215c coupled to the worm drive component 209, and the rolling element 215b rolling between the raceway 215a and the raceway 215c throughout the range of motion.

The bearing element 216 includes the raceway 216a coupled to the lever component 208, the raceway 216c coupled to the worm drive component 209, and the rolling element 216b rolling between the raceway 216a and the raceway 216c throughout the range of motion.

Together, bearing elements 215 and 216, interface between the lever component 208 and the worm drive component 209.

The rolling element paths and the shapes of the raceways for each bearing element are determined according to an optimization process described herein based on specified design parameters such as the motion of the lever component and the worm drive component relative to the frame component. In a preferred embodiment, the optimization results in bearing elements with substantially rolling rolling elements and raceways with substantially opposing contact points on the rolling rolling elements throughout the range of motion.

The bearing element 217 in the foreground is shown in more detail in a subsequent figure. However, one can see that in when the lever 202 is in the top position, the rolling elements 217b are at an end of their range of motion.

FIG. 26 illustrates a perspective view of the mechanism for a corkscrew 200 where the lever 202 is in the middle of the range of motion.

The rolling elements are positioned along the raceways at an intermediate position within their range of motion. The worm cap 204 is at an intermediate position within the range of motion.

When the lever 202 is in this intermediate position, the rolling elements 217b are at an intermediate position in their range of motion.

FIG. 27 illustrates a perspective view of the mechanism for a corkscrew 200 where the lever 202 is at the bottom of the range of motion.

The rolling elements are positioned along the raceways at an endpoint of the range of motion. The worm cap 204 is lowered to the lowest position within the range of motion.

When the lever 202 is in the bottom position, the rolling elements 217b are at an end of their range of motion. One can see the movement of the rolling elements 217b from their location in FIG. 25 to their location in FIG. 26, is greater than the movement of the rolling elements 217b from their location in FIG. 26 to their location in FIG. 27. This is one of the manifestations of the changing mechanical advantage throughout the range of motion.

Figure 28:
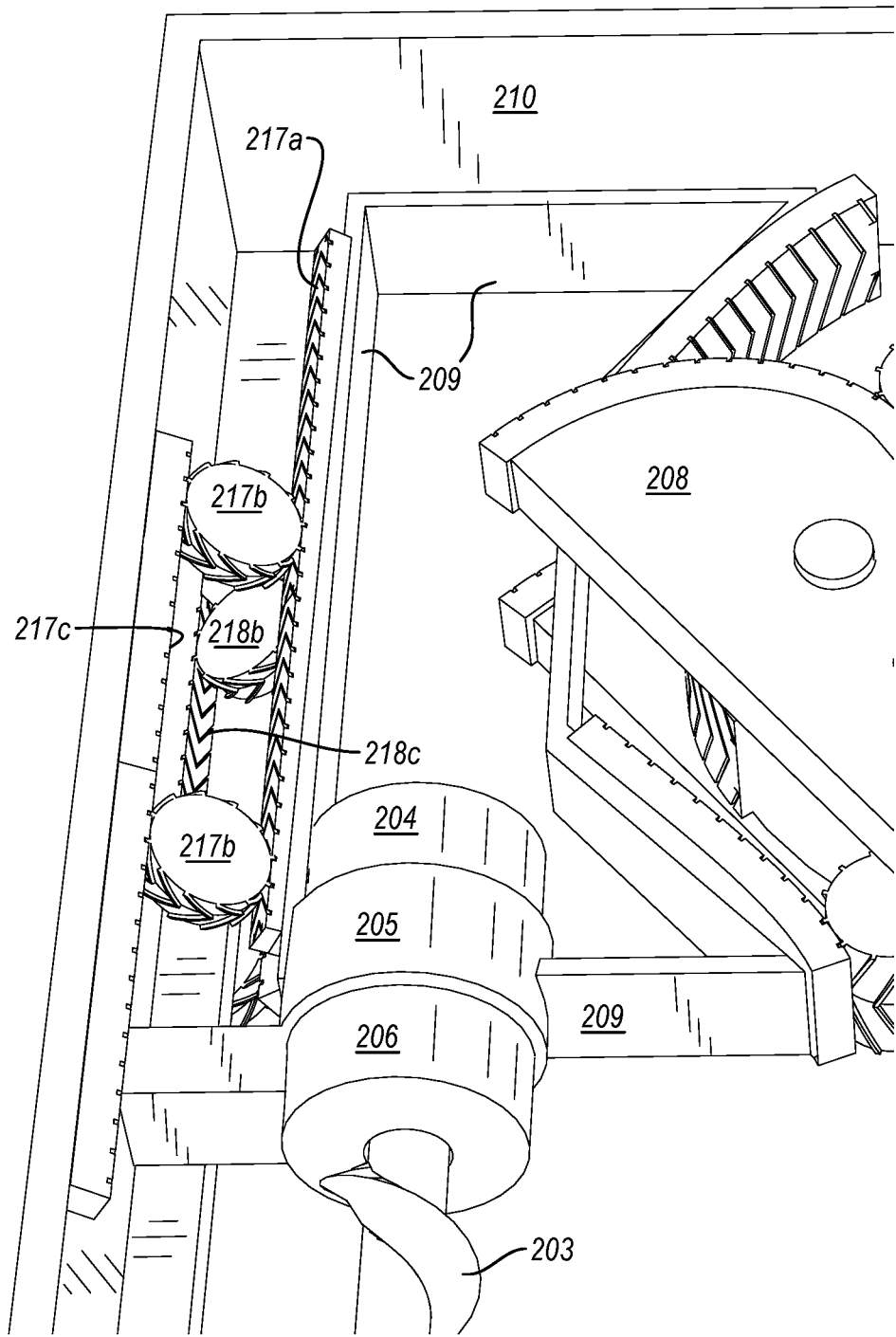
FIG. 28 is a close-up view of an embodiment of corkscrew showing a portion of the bearing element between the worm drive component and the frame.

FIG. 28 is a close-up view of a portion of the bearing element 217 interfacing between the frame component 210 and the worm drive component 209.

The raceways of bearing element 217 and 218 (partially shown) are angled with respect to the plane defined by the motion of the lever 202. The bearing elements 217 and 218 on either side of the plane of the lever 202 are symmetrically angled toward the plane of the lever 202. This arrangement provides rigidity to the worm drive mechanism by stabilizing it to the plane of the lever motion.

A crankcase is the housing for the crankshaft in a reciprocating internal combustion engine. The crankshaft controls the combustion engine through a cycle of four stages: intake, compression, power and exhaust.

Figure 29:
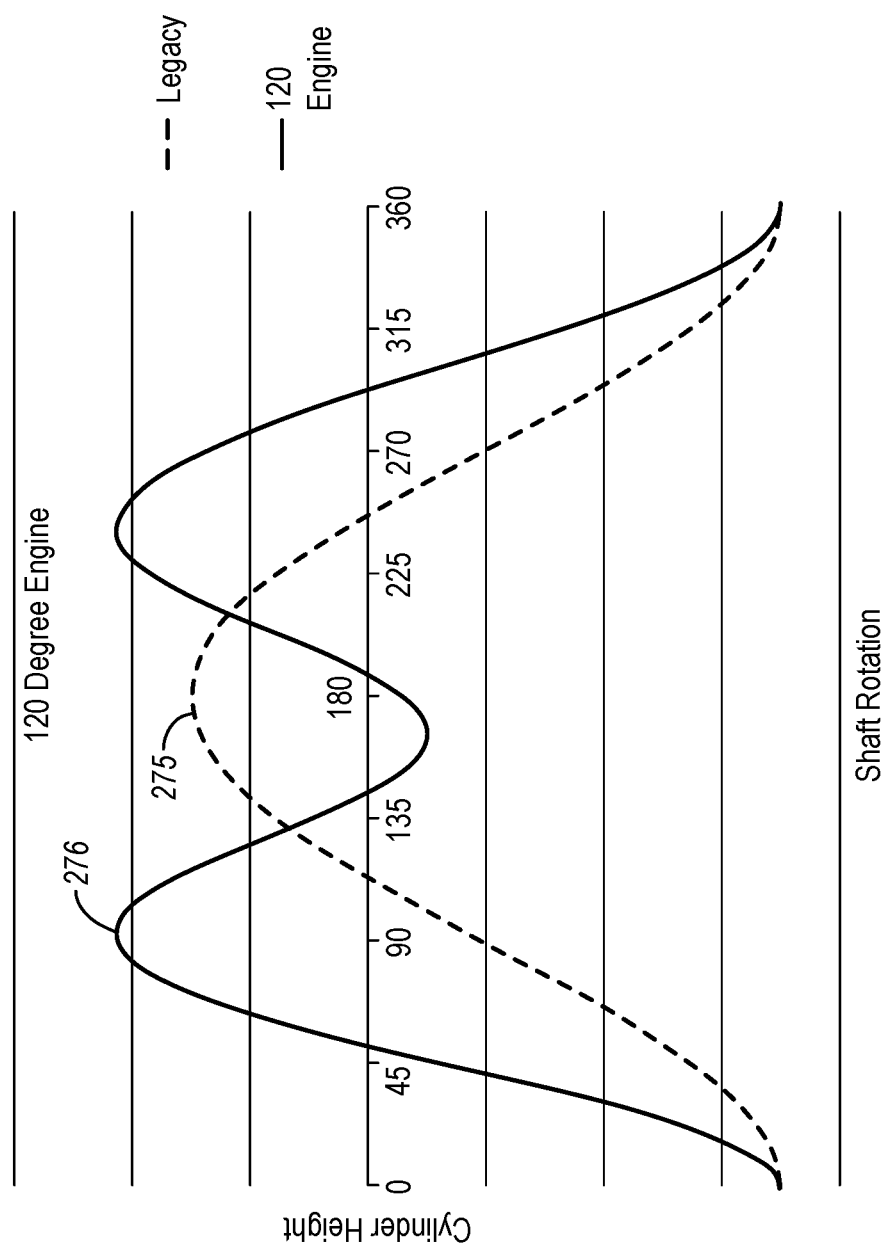
FIG. 29 is a graph of piston height as a function of shaft rotation for a 120-degree engine relative to the same for a prior art engine.

FIG. 29 shows a chart of the height of the piston of an engine as a function of shaft rotation through one cycle for one embodiment of a crankcase for a 120-degree engine.

A cycle 275 shows piston height through one cycle for a typical combustion engine. In a first rotation of the shaft, the rising edge is the exhaust cycle and the falling edge is the intake cycle. In a second rotation of the shaft, the rising edge is the compression cycle and the falling edge is the power cycle. Thus, four strokes can complete in two rotations of the shaft.

A typical engine uses four, six or eight cylinders. In a four-cylinder engine, each cylinder is out of phase by 90 degrees. In a six-cylinder engine, each cylinder is out of phase by 60 degrees. In an eight-cylinder engine, each cylinder is out of phase by 45 degrees. The even distribution of cylinders across the cycle distributes power delivery over the whole cycle. The extra cylinders generally provide smoother operation and more consistent power.

A cycle 276 shows cylinder head height with an additional harmonic to shape the combustion cycle. The first rising edge is the exhaust cycle and the first falling edge is the intake cycle. The second rising edge is the compression cycle and the second falling edge is the power cycle. Thus, four strokes can complete in one rotation of the shaft.

Furthermore, the power stroke can be extended to 120-degrees of shaft rotation. The extended power stroke effectively allows for three cylinders to be used to distribute power over a cycle. This is referred to herein as a 120-degree engine.

Figure 30:
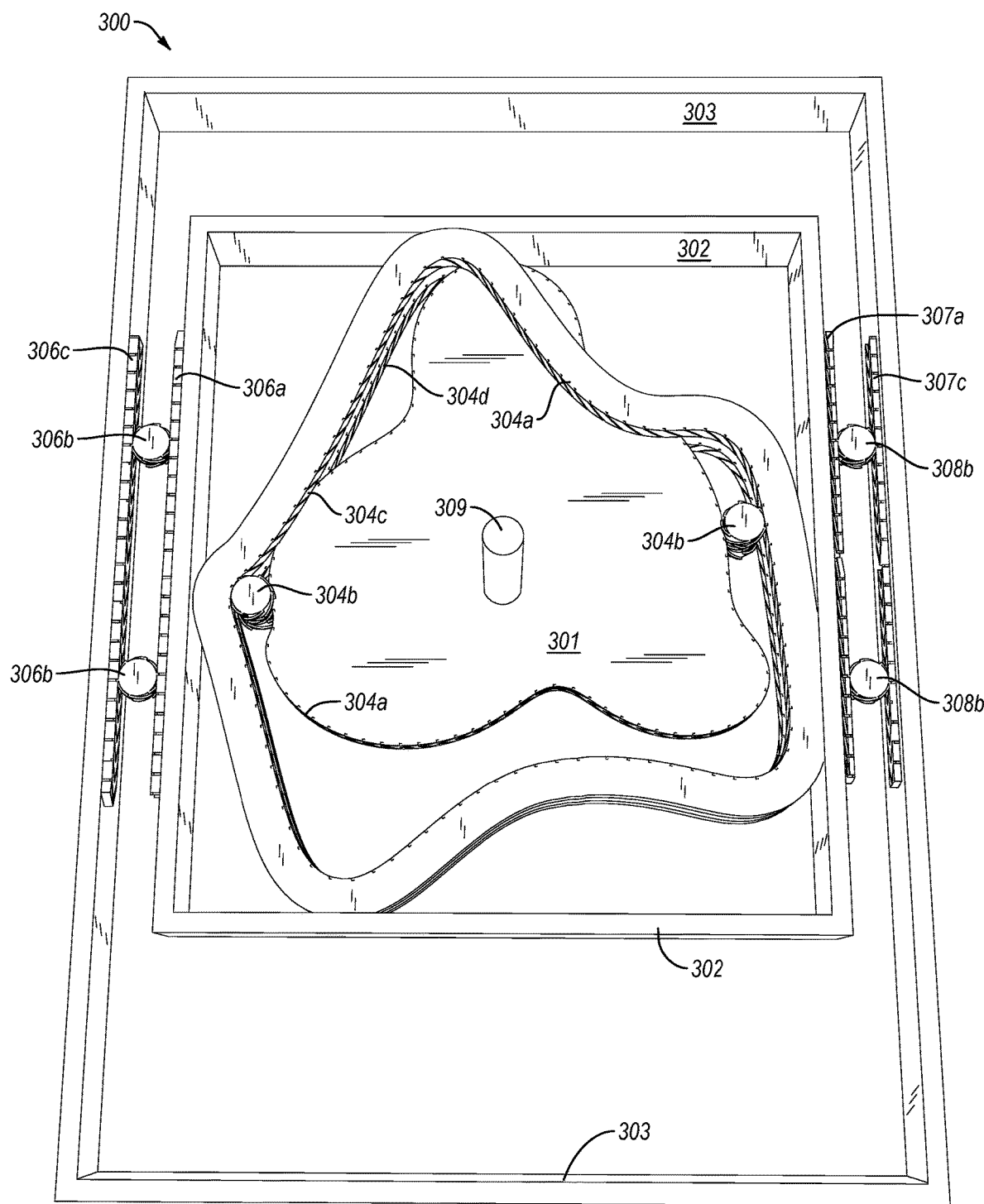
FIG. 30 is one embodiment of a 120-degree engine according to one embodiment of an optimization process.

FIG. 30 shows one embodiment of a mechanism for a 120-degree engine using the cycle 276 as shown in FIG. 28.

A frame component 303 is generally coupled to the frame of the vehicle or the frame of another device employing the engine. A piston component 302 is driven by a piston (not shown). Bearing elements 305, 306, 307 and 308 are disposed between the frame component 303 and the piston component 302 so that the piston component 302 slides linearly back and forth along the range of motion as driven by the piston.

The bearing element 305 includes a raceway 305a coupled to the piston component 302, a raceway 305c coupled to the frame component 303, and the rolling element 305b rolling between the raceway 305a and the raceway 305c throughout the range of motion.

The bearing element 306 includes a raceway 306a coupled to the piston component 302, a raceway 306c coupled to the frame component 303, and the rolling element 306b rolling between the raceway 306a and the raceway 306c throughout the range of motion.

The bearing element 307 includes a raceway 307a coupled to the piston component 302, a raceway 307c coupled to the frame component 303, and the rolling element 307b rolling between the raceway 307a and the raceway 307c throughout the range of motion.

The bearing element 308 includes a raceway 308a coupled to the piston component 302, a raceway 308c coupled to the frame component 303, and the rolling element 308b rolling between the raceway 308a and the raceway 308c throughout the range of motion.

Together, bearing elements 305, 306, 307 and 308, interface between the frame component 303 and the piston component 302.

A raceway 304a runs along the perimeter of the component 301. The raceway 304a forms a closed loop that has a substantially variable curvature.

Two closed-loop raceways 304c and 304d are disposed around the component 301 and coupled to the interior of the piston component 302. Each of the raceways 304c and 304d are identically shaped with a substantially variable curvature. The component 301 drives a shaft 309 forming an axel.

A pair of split pins 304b are positioned between the raceway 304a of the component 301 and the raceways 304c and 304d of the piston component 302. The raceway 304a interfaces with the middle segment of the split pins 304b. The raceways 304c and 304d interface with the segments of the split pins 304b on either side of the middle segment of the split pins 304b.

The shape of the raceways 304a, 304c and 304d are irregular in that they are not even or balanced in shape or arrangement. The paths of the rolling elements 304b are irregular in that they are not even or balanced in shape or arrangement.

The bearing element 304 interfaces between the component 301 and the piston component 302.

The rolling element paths and raceway shapes of the bearing elements 304, 305, 306, 307, and 308 are determined by a design process described herein to produce the motion of the components to drive the head cylinder motion as shown in cycle 701 of FIG. 15.

Figure 31:
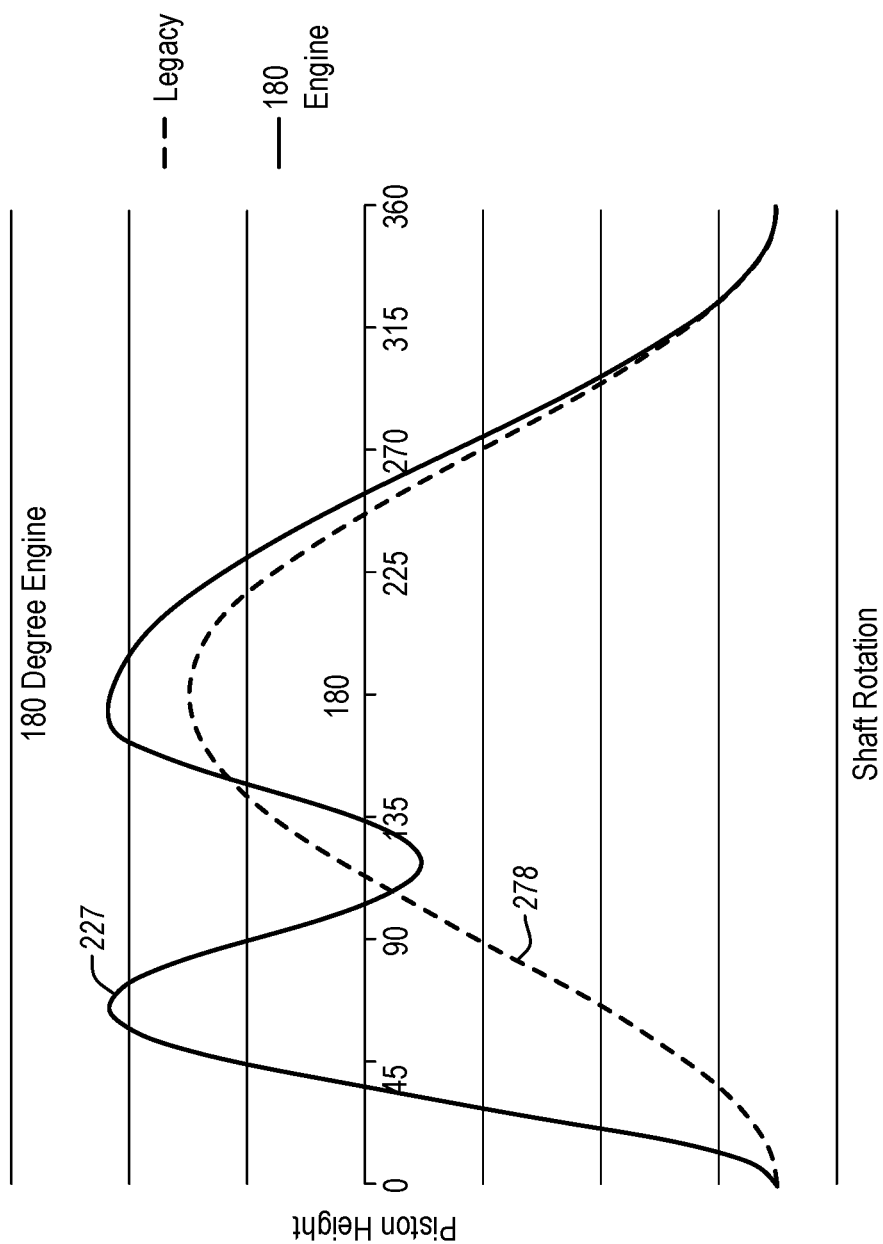
FIG. 31 is a graph of piston height as a function of shaft rotation for a 180-degree engine relative to the same for a prior art engine.

FIG. 31 shows a chart of the height of the cylinder head of an engine as a function of shaft rotation through one cycle for one embodiment of a crankcase for a 180-degree engine.

The cycle 278 shows piston motion through one cycle for a typical combustion engine. In a first rotation of the shaft, the rising edge is the exhaust cycle and the falling edge is the intake cycle. In a second rotation of the shaft, the rising edge is the compression cycle and the falling edge is the power cycle. Thus, four strokes can complete in two rotations of the shaft.

A cycle 277 shows cylinder head motion with an additional harmonic to shape the combustion cycle. The first rising edge is the exhaust cycle and the first falling edge is the intake cycle. The second rising edge is the compression cycle and the second falling edge is the power cycle. Thus, four strokes can complete in one rotation of the shaft.

However, the cycle 277 is distinguished from the cycle 276 shown in FIG. 15, in that the first three edges of the cycle 277 are compressed in the first 180 degrees of the shaft rotation and the fourth edge—the power stroke—is expanded into the second 180 degrees of the shaft rotation. Also, the head cylinders rise higher through a greater range of motion, producing a more energy efficient cycle.

Furthermore, the power stroke can be extended to 180-degrees of shaft rotation. The extended power stroke effectively allows for two cylinders to be used to distribute power over a cycle. This is referred to herein as a 180-degree engine.

Since the power stroke is extended to 180-degrees of shaft rotation two cylinders can be used to distribute power over a cycle. This is referred to herein as a 180-degree engine.

In another embodiment, the shape of the power stroke is modified so that the power ratio will follow the force on the cylinder head. This will provide more consistent torque.

Figure 32:
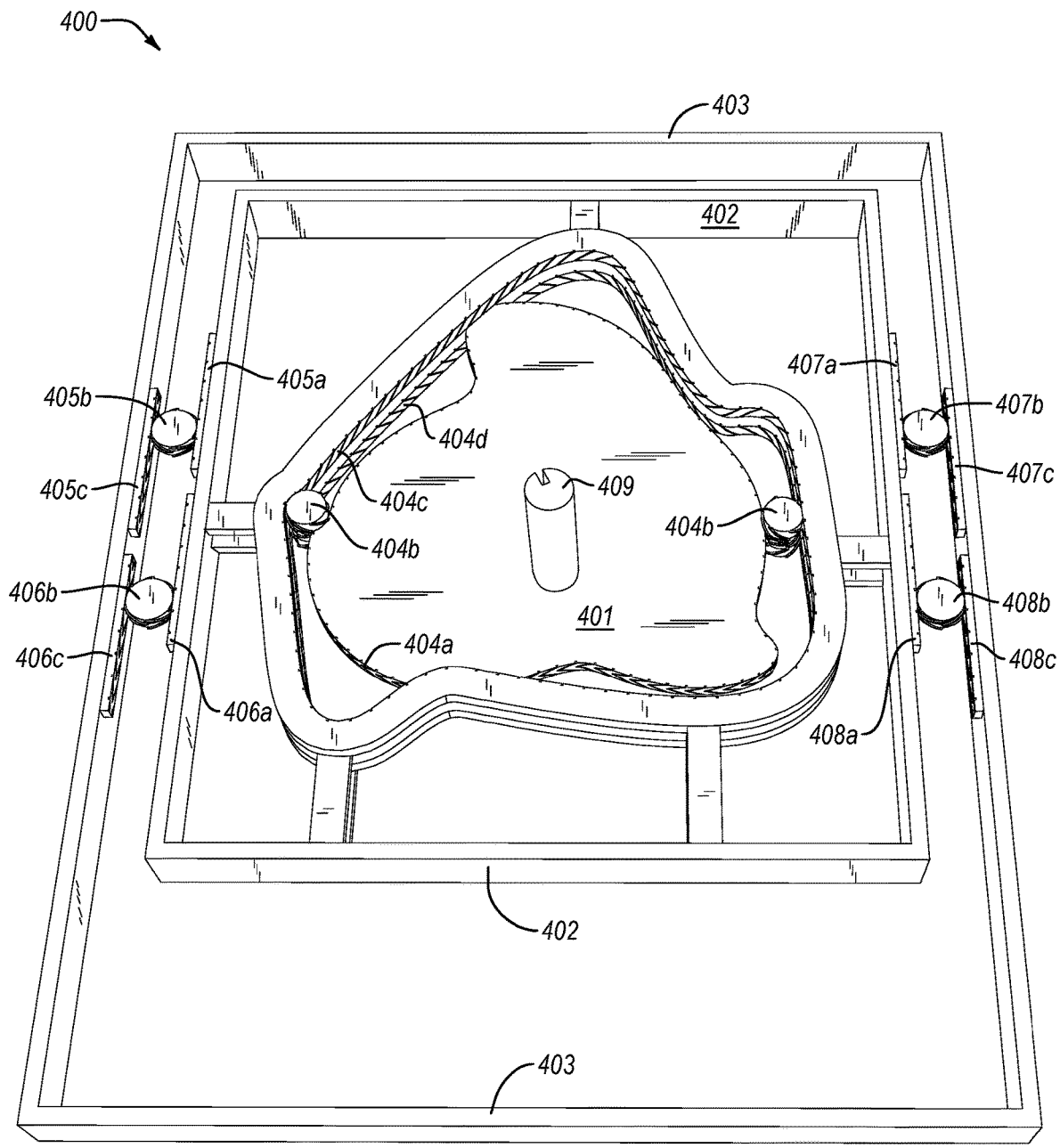
FIG. 32 is one embodiment of a 180-degree engine according to one embodiment of an optimization process.

FIG. 32 shows one embodiment of a mechanism for a 180-degree engine using the cycle 277 as shown in FIG. 31.

A frame component 403 is generally coupled to the frame of the vehicle or the frame of another device employing the engine. A component 402 is driven by a piston (not shown). Bearing elements 405, 406, 407 and 408 are disposed between the frame component 403 and the component 402 so that the component 402 slides linearly back and forth along the range of motion as driven by the piston.

The bearing element 405 includes a raceway 405a coupled to the component 402, a raceway 405c coupled to the frame component 403, and the rolling element 405b rolling between the raceway 405a and the raceway 405c throughout the range of motion.

The bearing element 406 includes a raceway 406a coupled to the component 402, a raceway 406c coupled to the frame component 403, and the rolling element 406b rolling between the raceway 406a and the raceway 406c throughout the range of motion.

The bearing element 407 includes a raceway 407a coupled to the component 402, a raceway 407c coupled to the frame component 403, and the rolling element 407b rolling between the raceway 407a and the raceway 407c throughout the range of motion.

The bearing element 408 includes a raceway 408a coupled to the component 402, a raceway 408c coupled to the frame component 403, and the rolling element 408b rolling between the raceway 408a and the raceway 408c throughout the range of motion.

Together, bearing elements 405, 406, 407 and 408, interface between the frame component 403 and the frame component 403.

A raceway 404a runs along the perimeter of the component 401. The raceway 404a forms a closed loop that has a substantially variable curvature.

Two closed-loop raceways 404c and 404d are disposed around the component 401 and coupled to the interior of the component 402. Each of the raceways 404c and 404d are identically shaped with a substantially variable curvature. The component 401 drives a shaft 409 forming an axel.

A pair of split pins 404b are positioned between the raceway 404a of the component 401 and the raceways 404c and 404d of the component 402. The raceway 404a interfaces with the middle segment of the split pins 404b. The raceways 404c and 404d interface with the segments of the split pins 404b on either side of the middle segment of the split pins 404b.

The shape of the raceways 404a, 404c and 404d are irregular in that they are not even or balanced in shape or arrangement. The paths of the rolling elements 405b are irregular in that they are not even or balanced in shape or arrangement. The rolling element paths and raceway shapes of the bearing elements 404, 405, 406, 407, and 408 are determined by a design process described herein to produce the motion of the components to drive the piston motion as shown in cycle 701 of FIG. 15.

Figure 33:
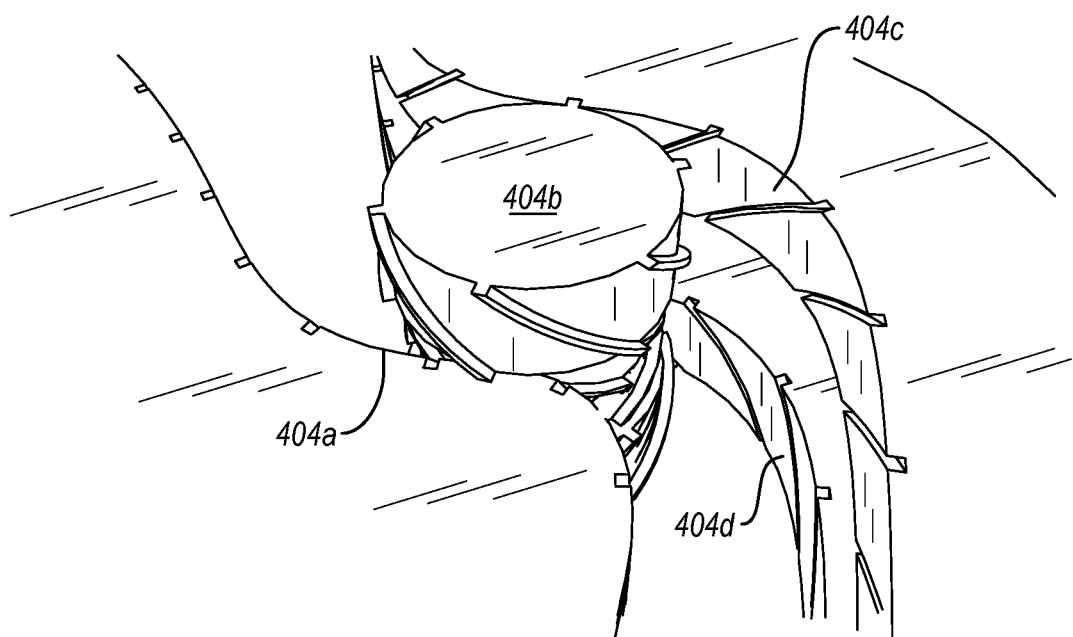
FIG. 33 is one embodiment of a close up view of a split pin interfacing with three raceways.

FIG. 33 shows one embodiment of a close up of a split pin assembly of the mechanism shown in FIG. 32.

Figure 34:
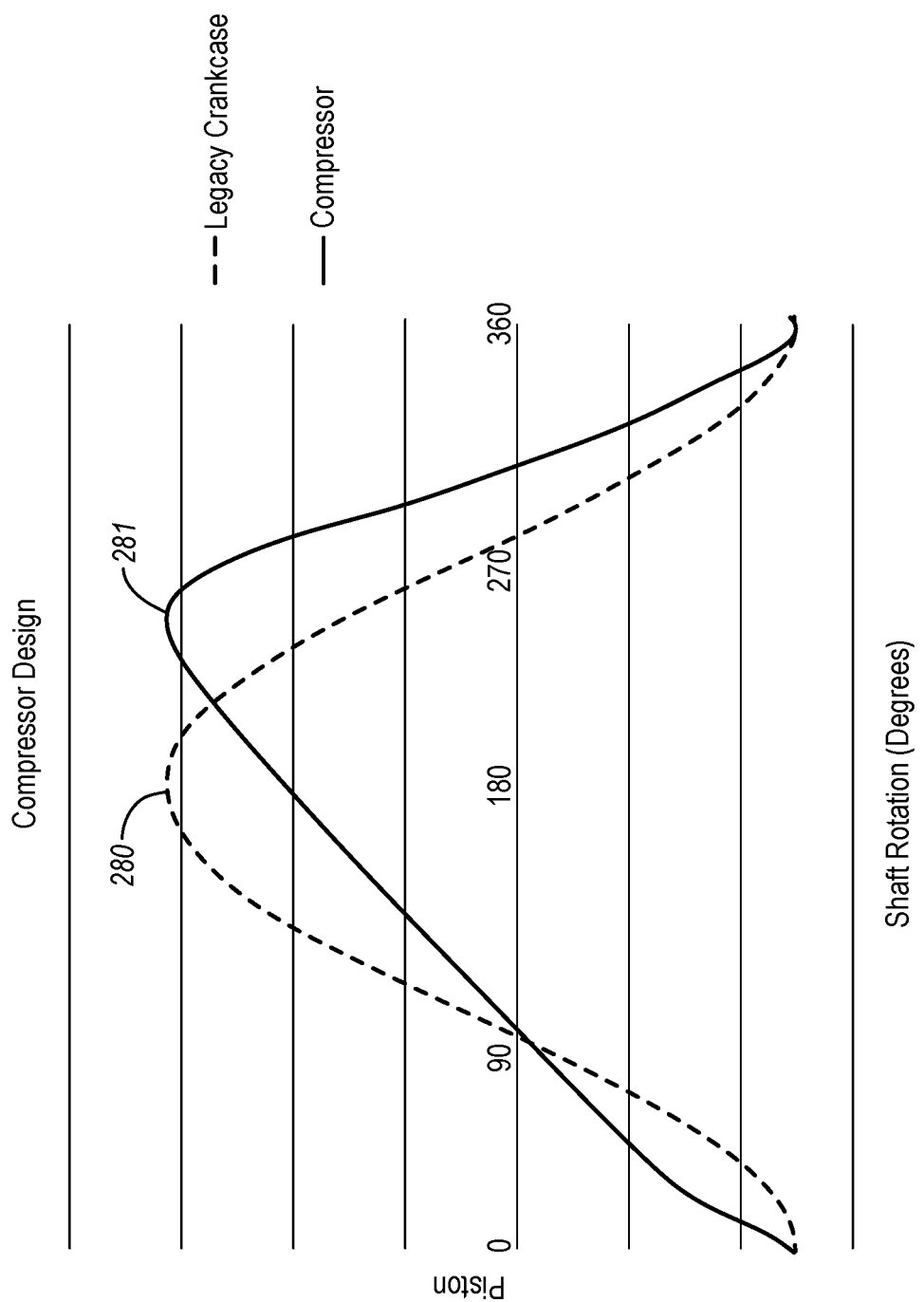
FIG. 34 is a graph of piston height as a function of shaft rotation for a crankcase for a compressor relative to the same for a prior art crankcase.

FIG. 34 shows a chart of the height of the piston of a compressor as a function of shaft rotation through one cycle for one embodiment of a crankcase for a compressor.

The cycle 280 shows piston motion through one cycle for a typical legacy crankcase.

A cycle 281 has a modified cycle starting with a rapid compression, followed by 180 degrees of steady injection, and the balance of the cycle for intake. The steady injection reduces pressure spikes and lost energy.

Figure 35:
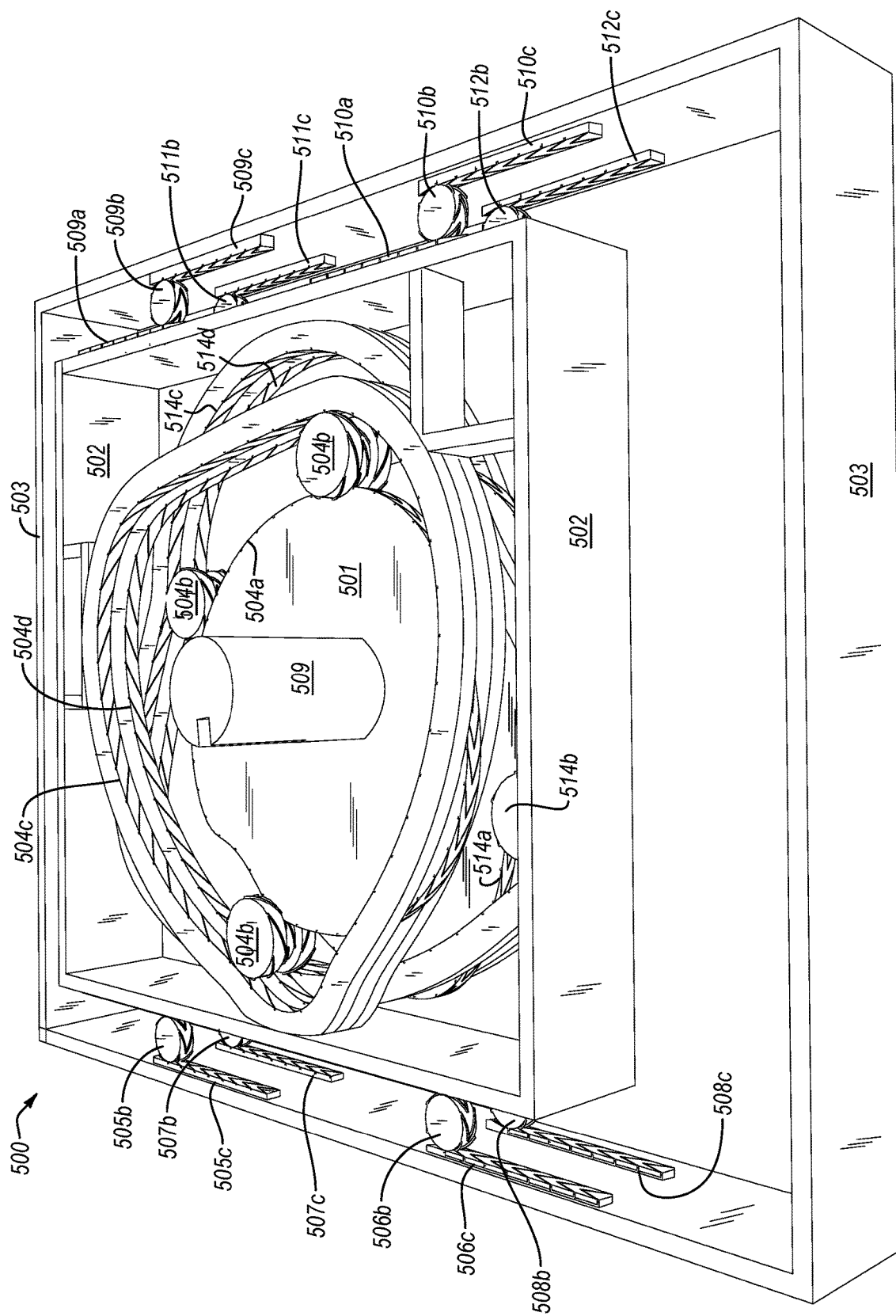
FIG. 35 is a first perspective view of one embodiment of a crankcase for a compressor according to one embodiment of an optimization process.
Figure 36:
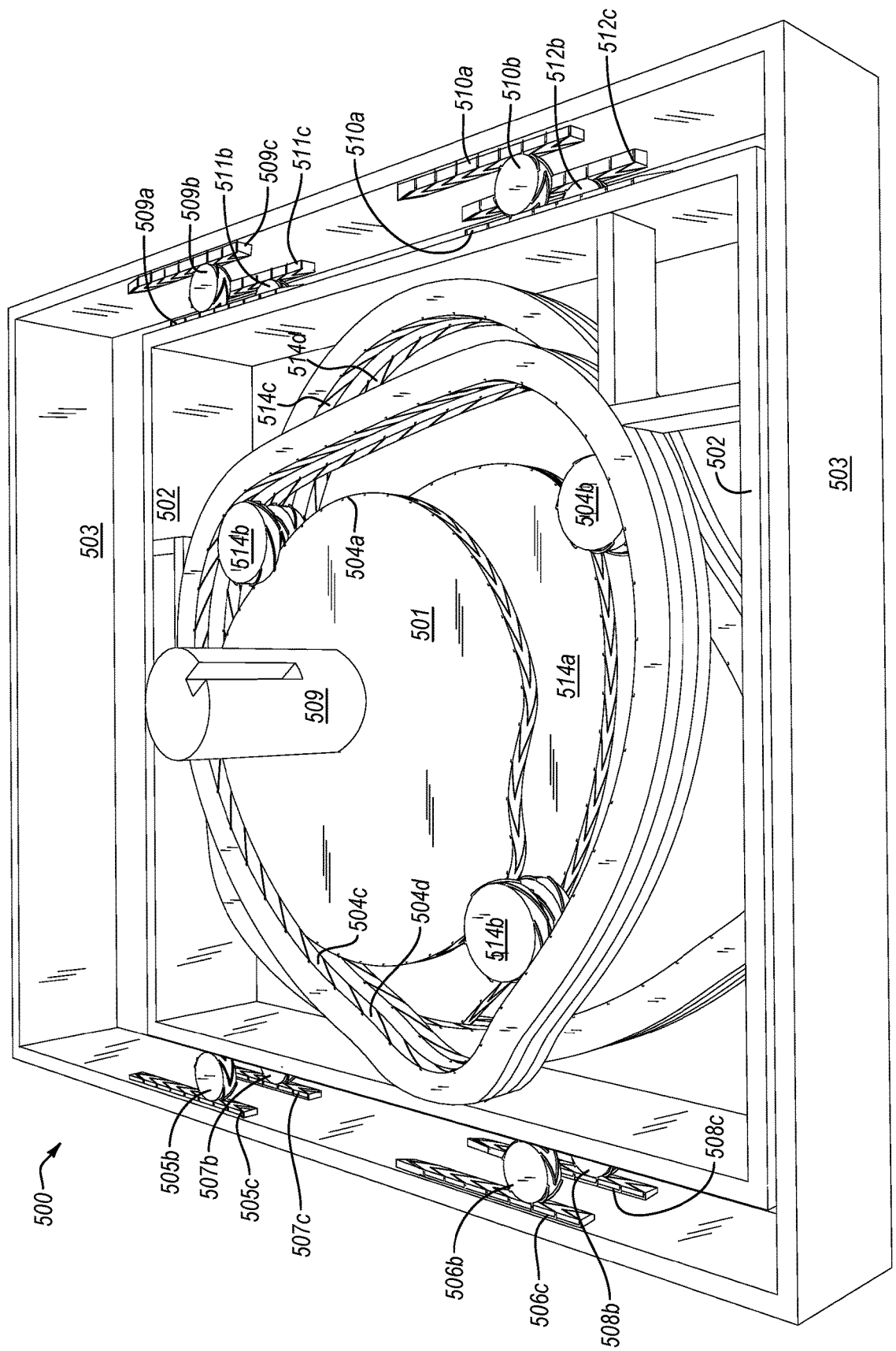
FIG. 36 is a second perspective view of one embodiment of a crankcase for a compressor according to one embodiment of an optimization process.
Figure 37:
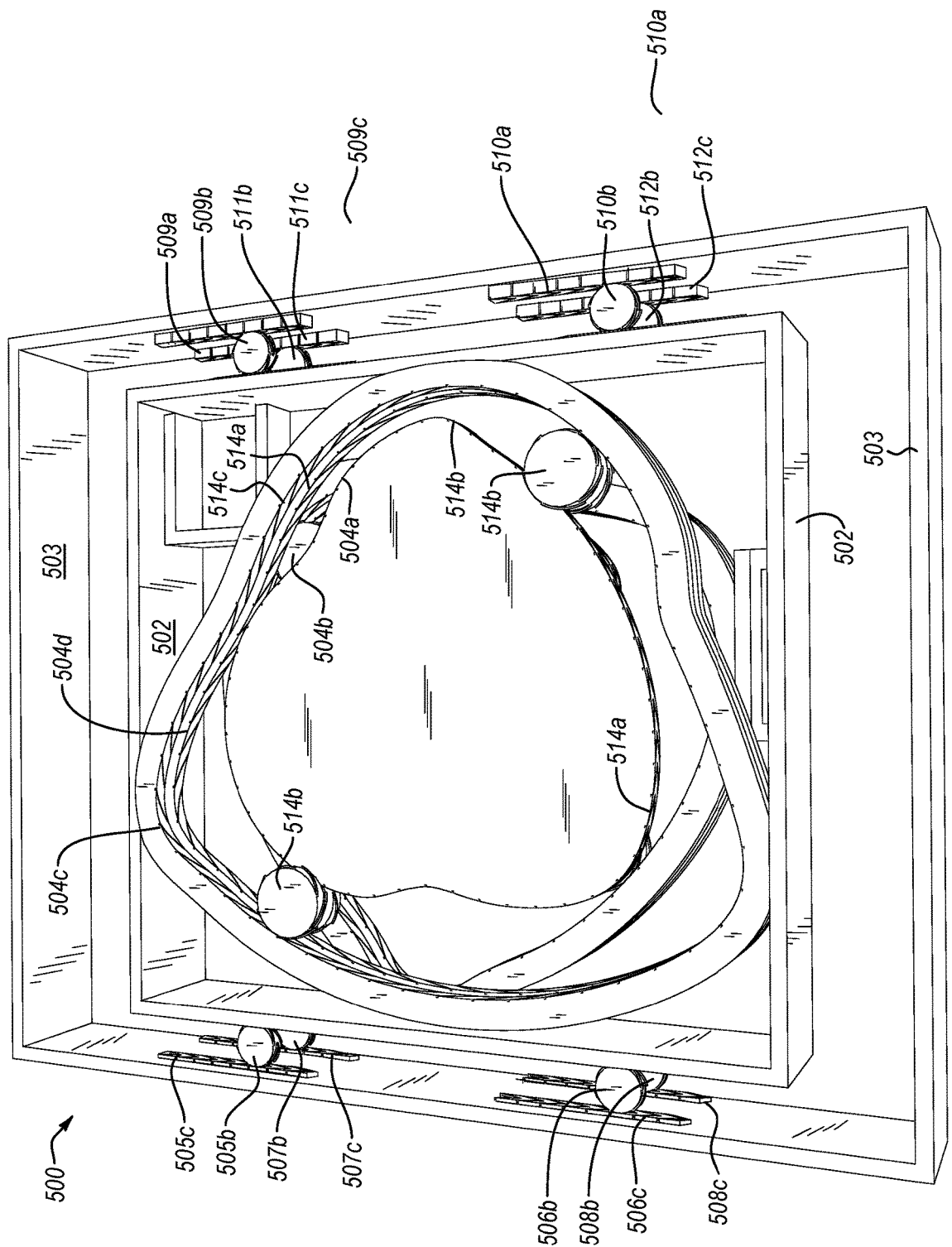
FIG. 37 is a bottom view of one embodiment of a crankcase for a compressor according to one embodiment of an optimization process.

FIG. 35 shows a perspective view of one embodiment of a crankcase mechanism for a compressor producing the cycle 281 as shown in FIG. 34. FIG. 36 shows a more vertical perspective view of the top of the crankcase mechanism for the compressor. FIG. 37 shows a more vertical perspective view of the bottom of the crankcase mechanism for the compressor. Certain features of the compressor described below may be visible in some of the FIGS. 35, 36 and 37.

A component 503 is a frame. The frame component 303 is generally coupled to the frame of the frame of a device employing the compressor. A component 502 is driven by a piston (not shown). Bearing elements 505, 506, 505, 508, 515, 516, 517 and 518 are disposed between the component 503 and the component 502 so that the component 502 slides linearly back and forth along the range of motion as driven by the piston.

The bearing element 505 includes a raceway 505a coupled to the component 502, a raceway 505c coupled to the frame component 503, and the rolling element 505b rolling between the raceway 505a and the raceway 505c throughout the range of motion.

The bearing element 506 includes a raceway 506a coupled to the component 502, a raceway 506c coupled to the frame component 503, and the rolling element 506b rolling between the raceway 506a and the raceway 506c throughout the range of motion.

The bearing element 507 includes a raceway 507a coupled to the component 502, a raceway 507c coupled to the frame component 503, and the rolling element 507b rolling between the raceway 507a and the raceway 507c throughout the range of motion.

The bearing element 508 includes a raceway 508a coupled to the component 502, a raceway 508c coupled to the frame component 503, and the rolling element 508b rolling between the raceway 508a and the raceway 508c throughout the range of motion.

The bearing element 515 includes a raceway 515a coupled to the component 502, a raceway 515c coupled to the frame component 503, and the rolling element 515b rolling between the raceway 515a and the raceway 515c throughout the range of motion.

The bearing element 516 includes a raceway 516a coupled to the component 502, a raceway 516c coupled to the frame component 503, and the rolling element 516b rolling between the raceway 516a and the raceway 516c throughout the range of motion.

The bearing element 517 includes a raceway 517a coupled to the component 502, a raceway 517c coupled to the frame component 503, and the rolling element 517b rolling between the raceway 517a and the raceway 517c throughout the range of motion.

The bearing element 518 includes a raceway 518a coupled to the component 502, a raceway 518c coupled to the frame component 503, and the rolling element 518b rolling between the raceway 518a and the raceway 518c throughout the range of motion.

Together, bearing elements 505, 506, 507, 508, 515, 516, 517 and 518 interface between the component 503 and the frame component 502.

A raceway 504a runs along the perimeter of the component 501. The raceway 504a forms a closed loop that has a substantially variable curvature.

Two closed-loop raceways 504c and 504d are disposed around the component 501 and coupled to the interior of the component 502. Each of the raceways 504c and 504d are identically shaped with a substantially variable curvature.

A pair of split pins 504b are positioned between the raceway 504a of the component 501 and the raceways 504c and 504d of the component 502. The raceway 504a interfaces with the middle segment of the split pins 504b. The raceways 504c and 504d interface with the segments of the split pins 504b on either side of the middle segment of the split pins 504b. The split pins 504b are shaped similar to the split pin 105 where the cylindrical middle segment has a with smaller diameter than the cylindrical segments on either side of the middle segment.

From the bottom view of the compressor shown in FIG. 37, raceway 514a runs along the perimeter of the component 510. The raceway 514a forms a closed loop that has a substantially variable curvature. The component 510 is coupled to component 501 so that they move together, but the raceway 514a has a different shape than the raceway 504a.

Two closed-loop raceways 514c and 514d are disposed around the component 510 and coupled to the interior of the component 502. Each of the raceways 514c and 514d are identically shaped with a substantially variable curvature.

A pair of split pins 514b are positioned between the raceway 514a of the component 510 and the raceways 514c and 514d of the component 502. The raceway 514a interfaces with the middle segment of the split pins 514b. The raceways 514c and 514d interface with the segments of the split pins 514b on either side of the middle segment of the split pins 514b. The split pins 504b are shaped similar to the split pin 105 where the cylindrical middle segment has a with smaller diameter than the cylindrical segments on either side of the middle segment.

The component 501 and the component 510 drives a shaft 509 forming part of an axel that drives the compressor.

The shape of the raceways 504a, 504c, 504d, 514a, 514b, and 514c are irregular in that they are not even or balanced in shape or arrangement. They are neither circular nor linear. The paths of the rolling elements 504b and 514b are irregular in that they are not even or balanced in shape or arrangement. The rolling element paths and raceway shapes of the bearing elements 504, 505, 506, 507, 508, 515, 516, 517, and 518 are determined by a design process described herein to produce a specified motion of the components to drive the head cylinder motion as shown in cycle 704 of FIG. 34.

The compressor has the height function developed using spline functions. To get the splines to be continuous over the 0 and 360 degrees, the control points were reflected before and after 0 and 360. For instance, if the second control point were at 15 degrees and a height of 0.5 then a control point at 375 and height of 0.5 is included. If the second to last point were 340 degrees and a height of 0.4 then a point at −20 degrees and 0.4 would be added. While only 0 to 360 degrees are used, reflecting the control point forward and back insures the derivative will be continuous over the loop-closure.

Figure 38:
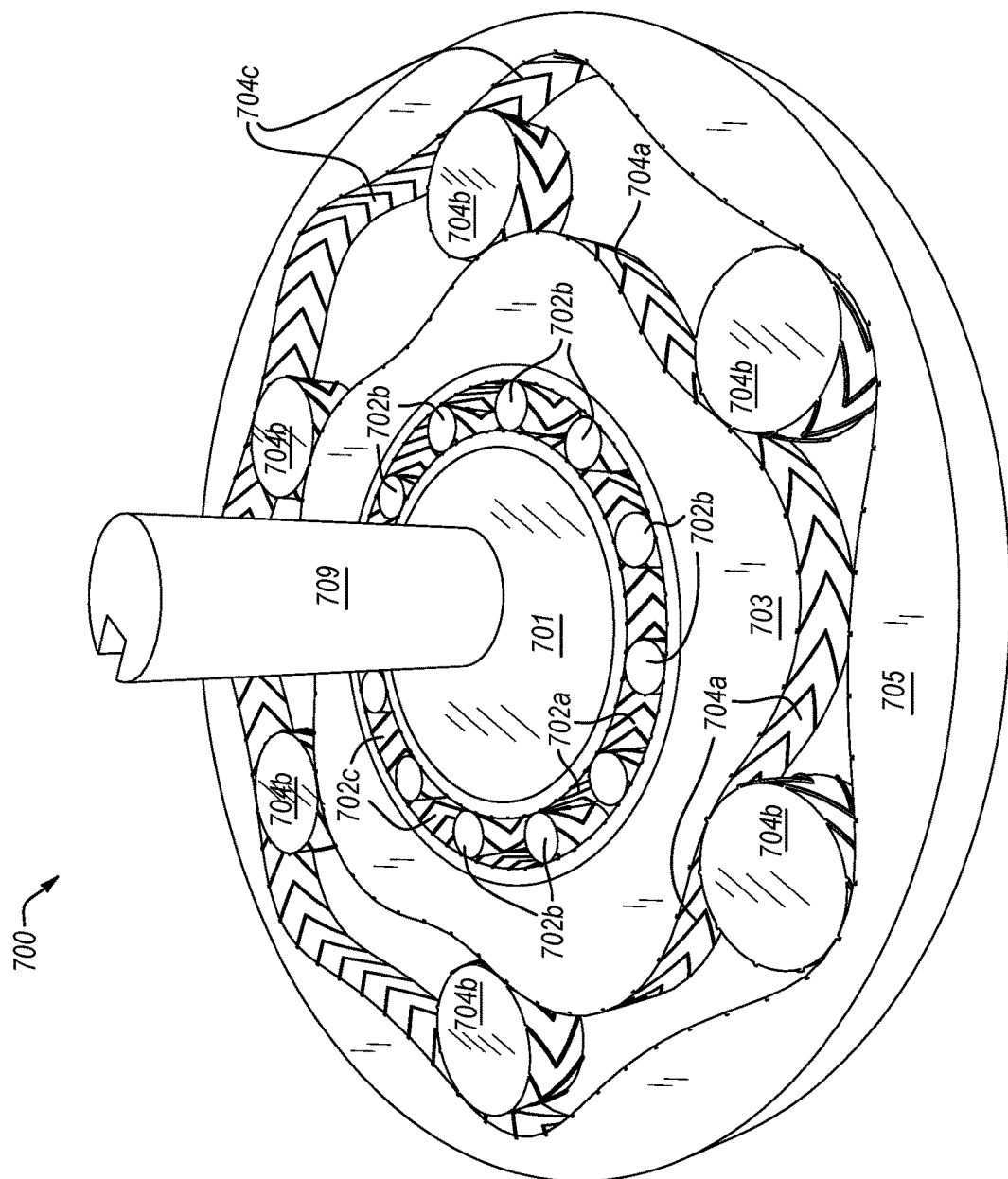
FIG. 38 is a perspective view of one embodiment of a rotary mechanism.
Figure 39:
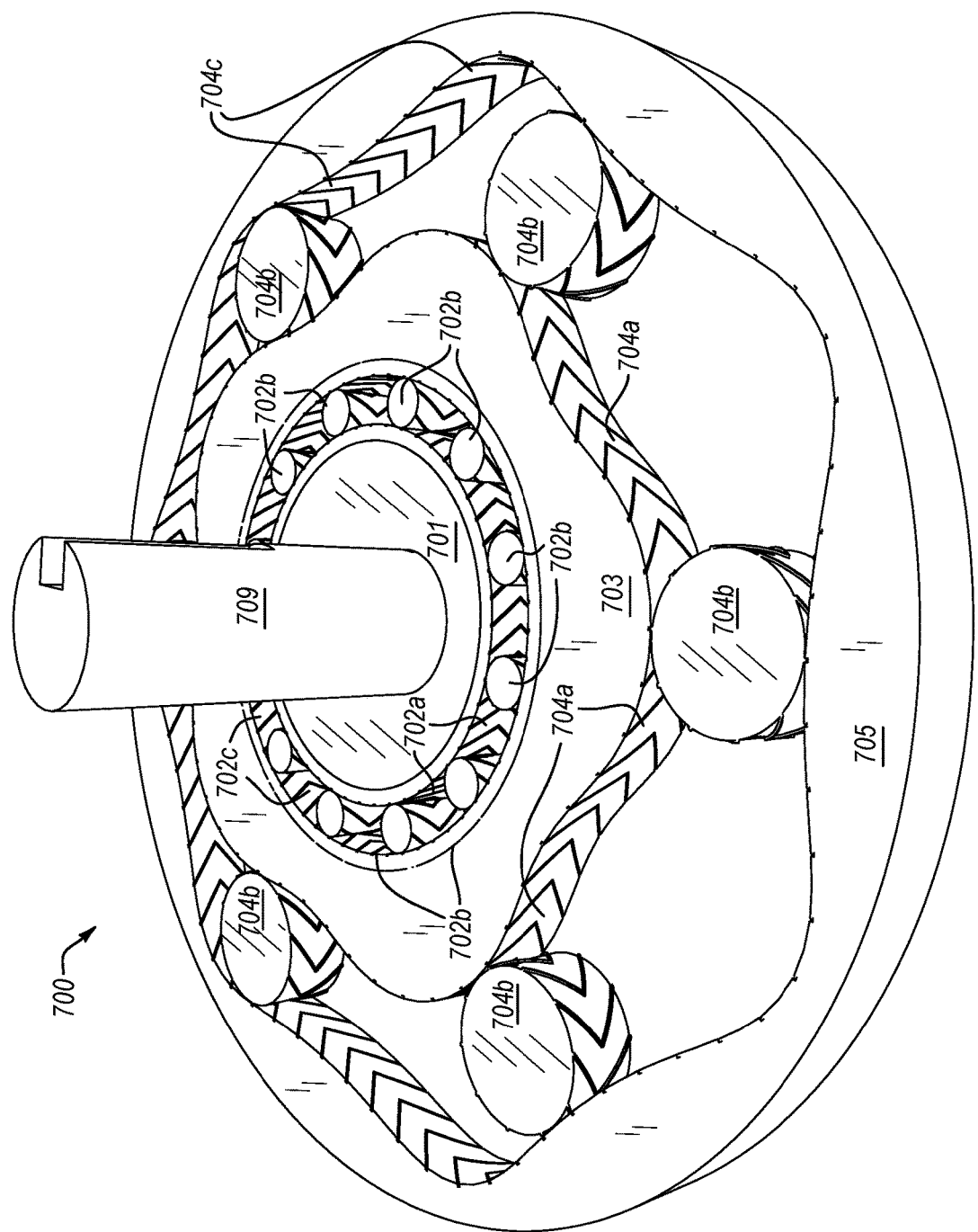
FIG. 39 is a perspective view of one embodiment of a rotary mechanism.
Figure 40:
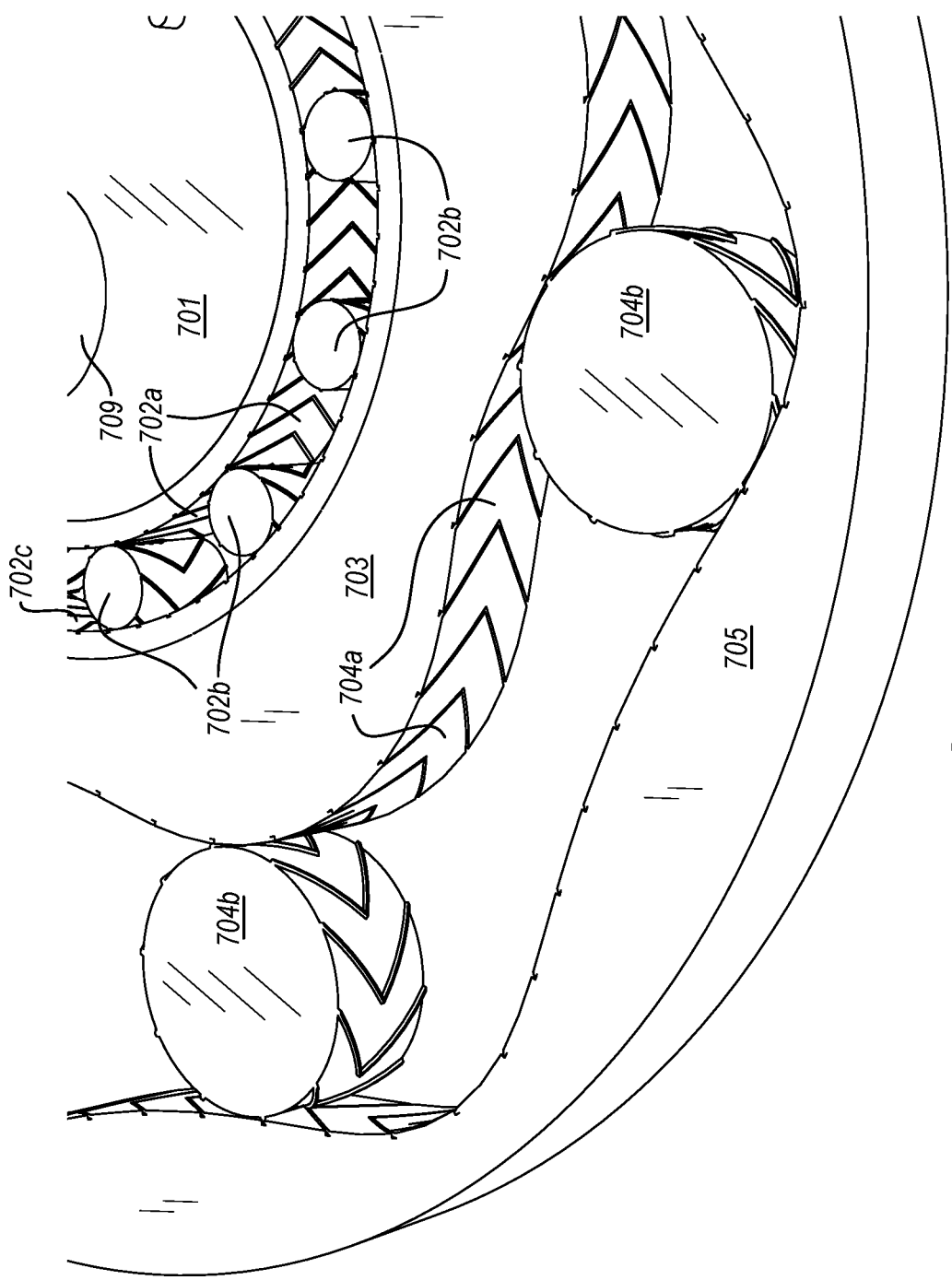
FIG. 40 is a bottom view of one embodiment of a rotary mechanism.
Figure 41:
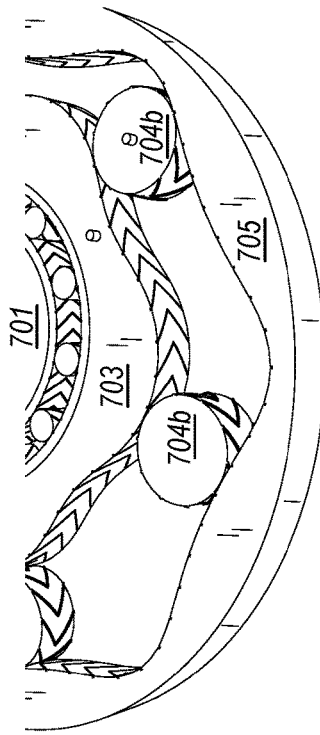
FIG. 41 is a perspective view of one embodiment of a rotary mechanism of FIG. 38 at a first position in the cycle of rotation.
Figure 42:
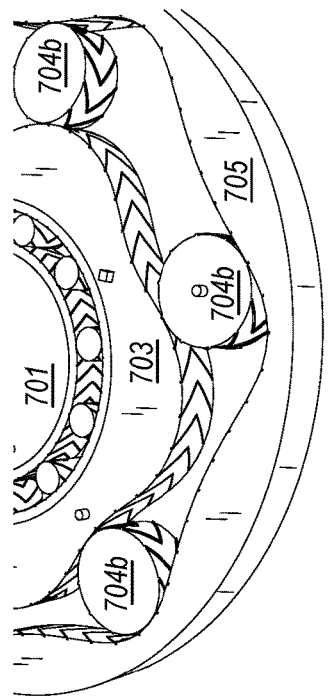
FIG. 42 is a perspective view of one embodiment of a rotary mechanism of FIG. 38 at a second position in the cycle of rotation.
Figure 43:
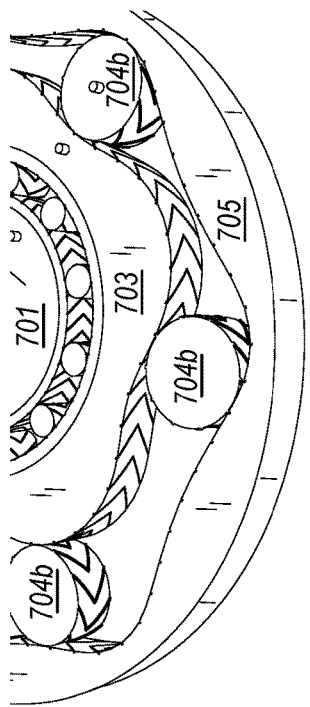
FIG. 43 is a perspective view of one embodiment of a rotary mechanism of FIG. 38 at a third position in the cycle of rotation.
Figure 44:
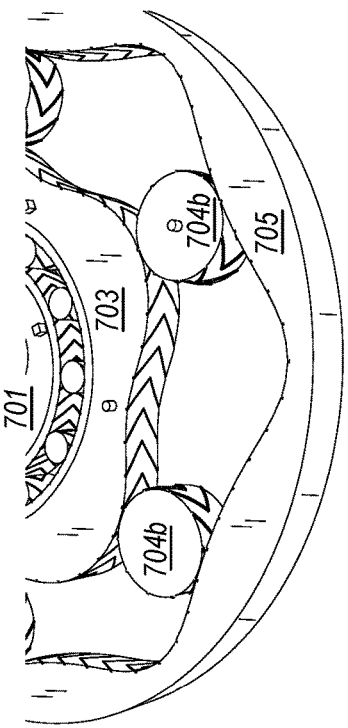
FIG. 44 is a perspective view of one embodiment of a rotary mechanism of FIG. 38 at a fourth position in the cycle of rotation.
Figure 45:
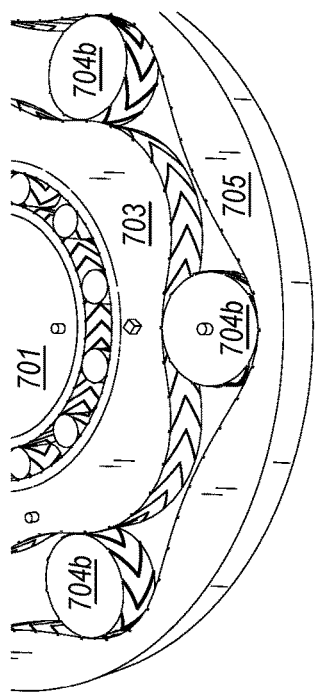
FIG. 45 is a perspective view of one embodiment of a rotary mechanism of FIG. 38 at a fifth position in the cycle of rotation.

FIGS. 38 and 39 shows perspective view of one embodiment of a rotary mechanism at different points in the rotation process. FIG. 40 shows a close-up view of a portion of the rotary mechanism. This mechanism may be used in a pump, for example, where rotor rotates in the opposite direction as the input shaft 709. Two such devices with a differing number of rolling elements can be combined to create a speed reducer by attaching the two rotors and allowing the stator on the second device to spin. The relationship between the number of rolling elements define the speed reduction factor.

The mechanism includes an eccentric 701, a rotor 703 and a stator 705. The rotor 703 turns in a reverse direction as the input shaft 709.

An input shaft 709 is positioned off-center on the eccentric 701. Power received on the input shaft 709 causes the eccentric 701 to rotate. The rotation causes the rolling elements 702b to rotate which in turn causes the rotor 703 to rotate in the reverse direction as the shaft. The rotor 703 is the output of the mechanism that is coupled to drive the pump.

There are twelve rolling elements 702b (one not shown behind input shaft 709) positioned between a closed-loop raceway 702a of the eccentric 701 and the closed-loop raceway 702c of the rotor 703. The raceway 702a, the rolling elements 702b, and the raceway 702c form a bearing element 702.

Six rolling elements 704b are positioned between a closed-loop raceway 704a of the rotor 703 and a raceway 704c of the stator 705. The closed-loop raceway 704a has a substantially variable curvature including five lobes. The closed-loop raceway 704c has a substantially variable curvature including seven lobes. The raceway 704a, the rolling elements 704b, and the raceway 704c form a bearing element 704.

For this type of device, the number of rolling elements 704b can vary with 2 as a minimum. Lobes are the periodic protrusions or trenches in the shape of the raceways. The number of stator lobes, sLobes, will be one greater than the number of rolling elements (in the stator 705 that is seven) and the number of rotor lobes, rLobes, will be one less than the number of rolling elements (in the rotor 703 that is five). The center of the rotor moves with the eccentric 701. The center position is given by: $x=e*\cos(\theta+\theta 0)$ and $y=e*\sin(\theta+\theta 0)$, where $\theta$ is the input shaft rotation, and $\theta 0$ is the initial shaft rotation. The rotation of the rotor, r, will be given by $r=r0-2*(\theta+\theta 0)/rlobes$, where r0 is the initial rotation of the rotor.

To generate the closed-loop raceways, only half of one set of lobes need to be calculated. The second half is an angular reflection of the first half. The rest of the lobes are angular copies. The angle that needs to be simulated is $2*PI/sLobes$. The shaft rotation for that section is $PI*(1.0/(sLobes)+1.0/rLobes)$. For the closed-loop raceways, the rolling element needs to finish at the angular position described above. To enable that to happen, the MVSA need to adjust the radius of the rolling element and the distance of the start position of the rolling element from the system center as well as the second and subsequent positions of the pin.

FIGS. 41, 42, 43, 44, and 45, shows one embodiment of a sequence of movement for a mechanism of FIG. 38.

The mechanism includes an eccentric 701, a rotor 703, and a stator 705.

Figure 46:
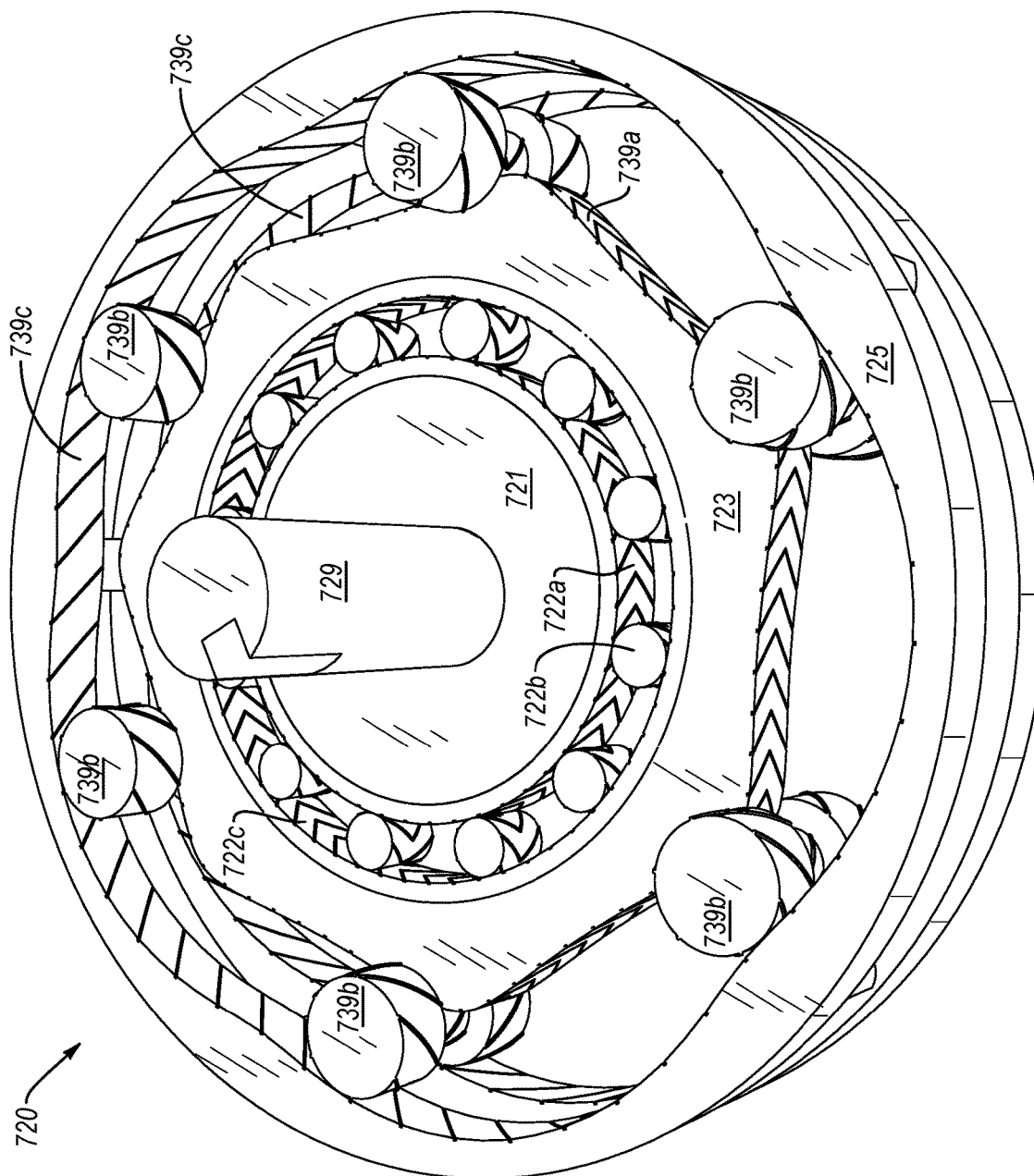
FIG. 46 is a perspective view of one embodiment of a rotary mechanism according to one embodiment of an optimization process at a first position in the cycle of rotation.
Figure 47:
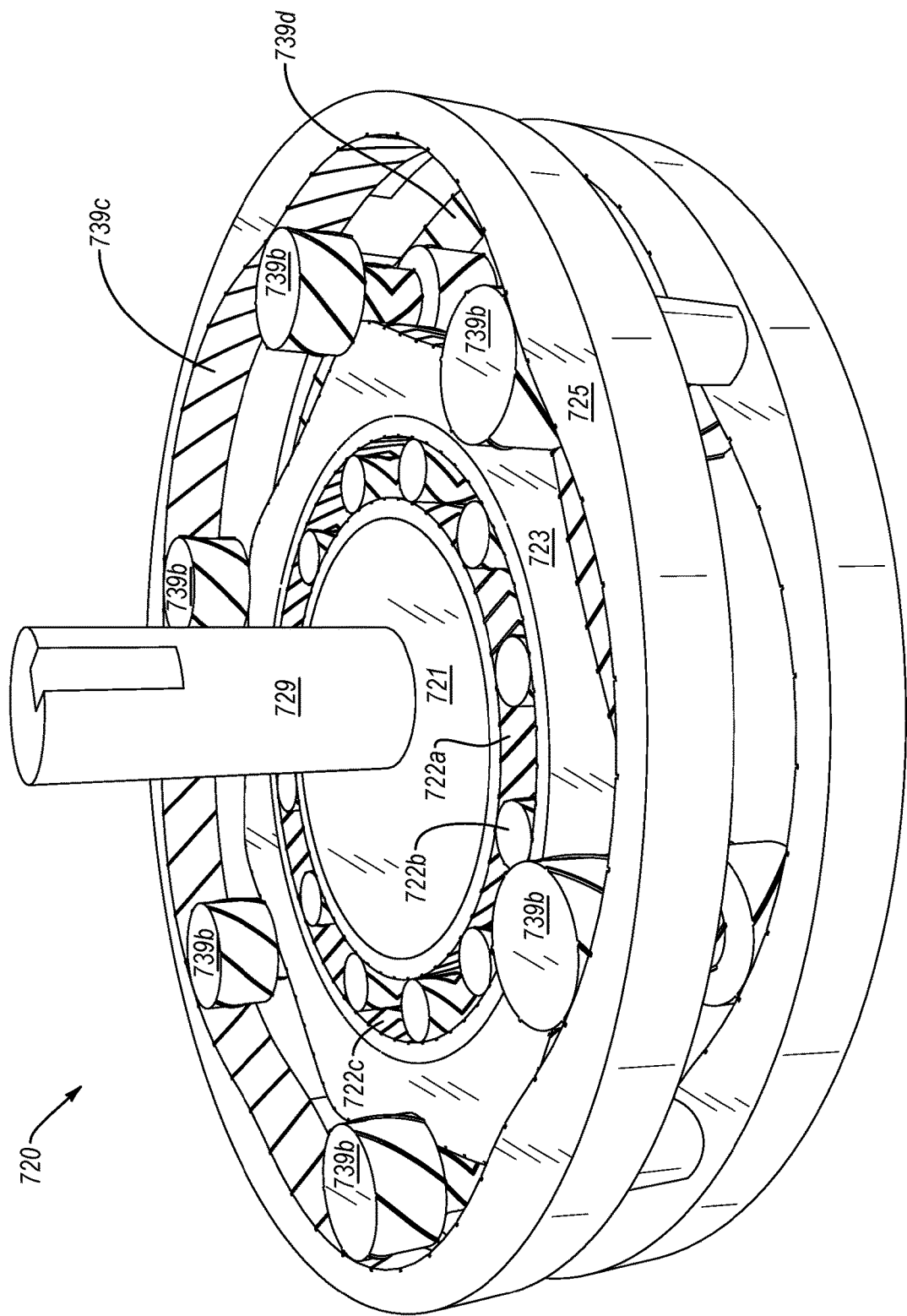
FIG. 47 is a perspective view of one embodiment of a rotary mechanism according to one embodiment of an optimization process at a second position in the cycle of rotation.
Figure 48:
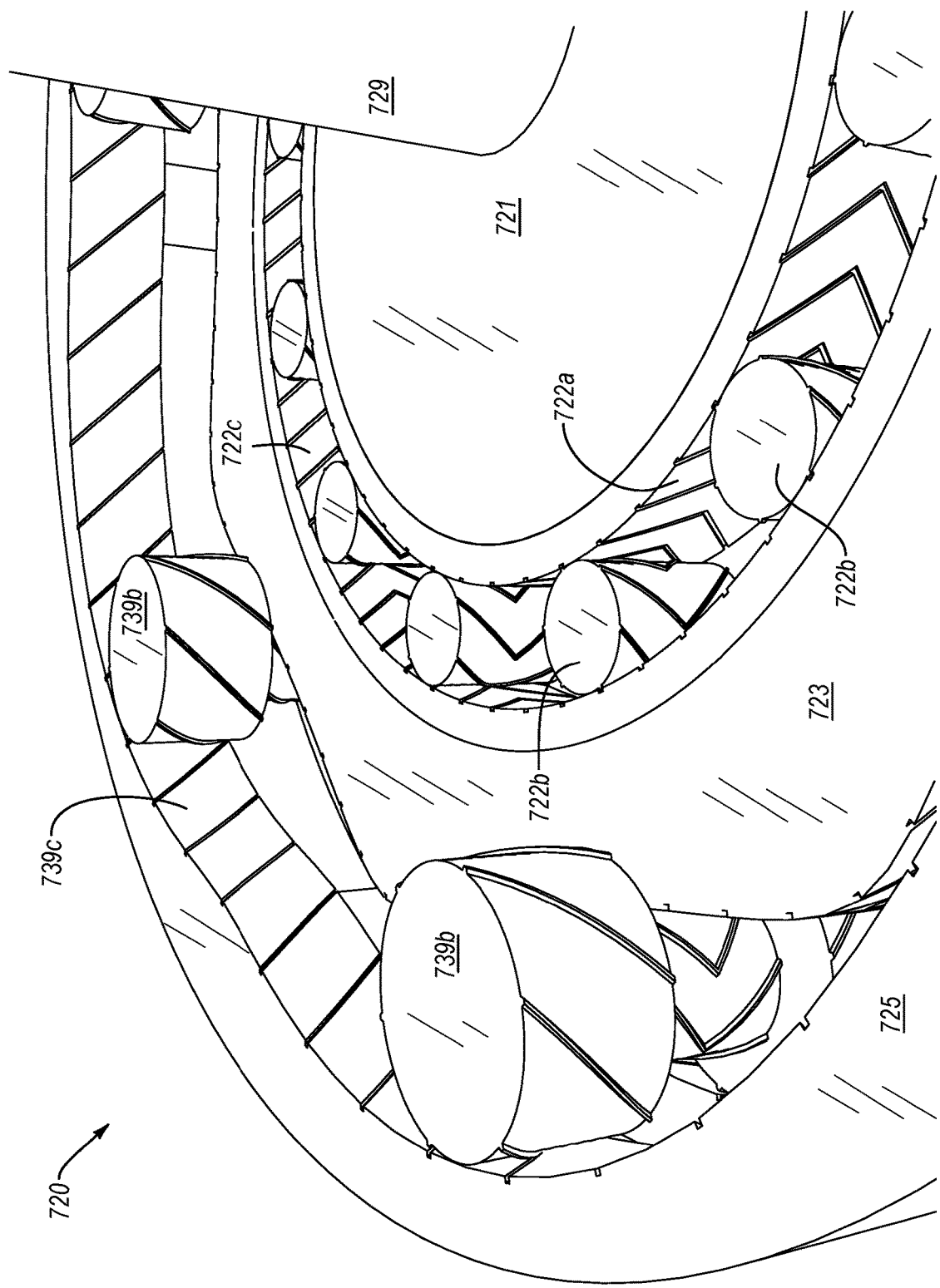
FIG. 48 is a close-up view of one embodiment of a rotary mechanism according to one embodiment of an optimization process.

FIGS. 46 and 47 shows perspective view of one embodiment of a rotary mechanism 720 at different points in the rotation process. FIG. 48 shows a close-up view of a portion of the rotary mechanism. This mechanism may be used in a pump, for example, where rotor turns in the same direction as an input shaft 809.

The mechanism includes an eccentric 801, a rotor 803, and a stator 805.

An input shaft 809 is positioned off-center on the eccentric 801. Power received on the input shaft 809 causes the eccentric 801 to rotate. The rotation causes the rolling elements 802b to rotate which in turn causes the rotor 803 to rotate in the direction of the input shaft 809. The rotor 803 is the output of the mechanism that is coupled to drive the pump.

There are six rolling elements 804b positioned between a closed-loop raceway 804a of the stator 805 and a closed-loop raceway 804c of the rotor 803. The closed-loop raceways 804c and 804d have a substantially variable curvature including five lobes. The closed-loop raceway 804a has a substantially variable curvature including seven lobes.

There are twelve rolling elements 802b (one not shown) positioned between a closed-loop raceway 802c of the rotor 803 and the closed-loop raceway 802a of the eccentric 801.

An input shaft 809 is positioned off-center on the eccentric 801. Powers received on the input shaft causing the eccentric 801 to rotate. The rotation causes the rolling elements 802b to rotate which in turn causes the rotor 803 to rotate. The rotor 803 is the output of the mechanism.

For this type of device, the number of rolling elements 804b can vary, with 2 as a minimum. Lobes are the periodic protrusions or trenches in the shape of the raceways. The number of stator lobes, sLobes, will be one less than the number of rolling elements (in the stator 805 that is five) and the number of rotor lobes, rLobes, will be one greater than the number of rolling elements (in the rotor 803 that is seven). The center of the rotor moves with the eccentric 701. The center position is given by: $x = e \cdot \cos(\theta + \theta 0)$ and $y = e \cdot \sin(\theta + \theta 0)$, where $\theta$ is the input shaft rotation, and $\theta 0$ is the initial shaft rotation. The rotation of the rotor, r, will be given by $r = r0 + 2 \cdot (\theta + \theta 0)/rlobes$, where r0 is the initial rotation of the rotor.

To generate the closed-loop raceways, only half of one set of lobes need to be calculated. The second half is an angular reflection of the first half. The rest of the lobes are angular copies. The angle that needs to be simulated is $2 \cdot PI/sLobes$. The shaft rotation for that section is $PI \cdot (1.0/(sLobes) + 1.0/rLobes)$. For the closed-loop raceways, the rolling element needs to finish at the angular position described above. To enable that to happen, the MVSA need to adjust the radius of the rolling element and the distance of the start position of the rolling element from the system center as well as the second and subsequent positions of the pin.

Figure 49:
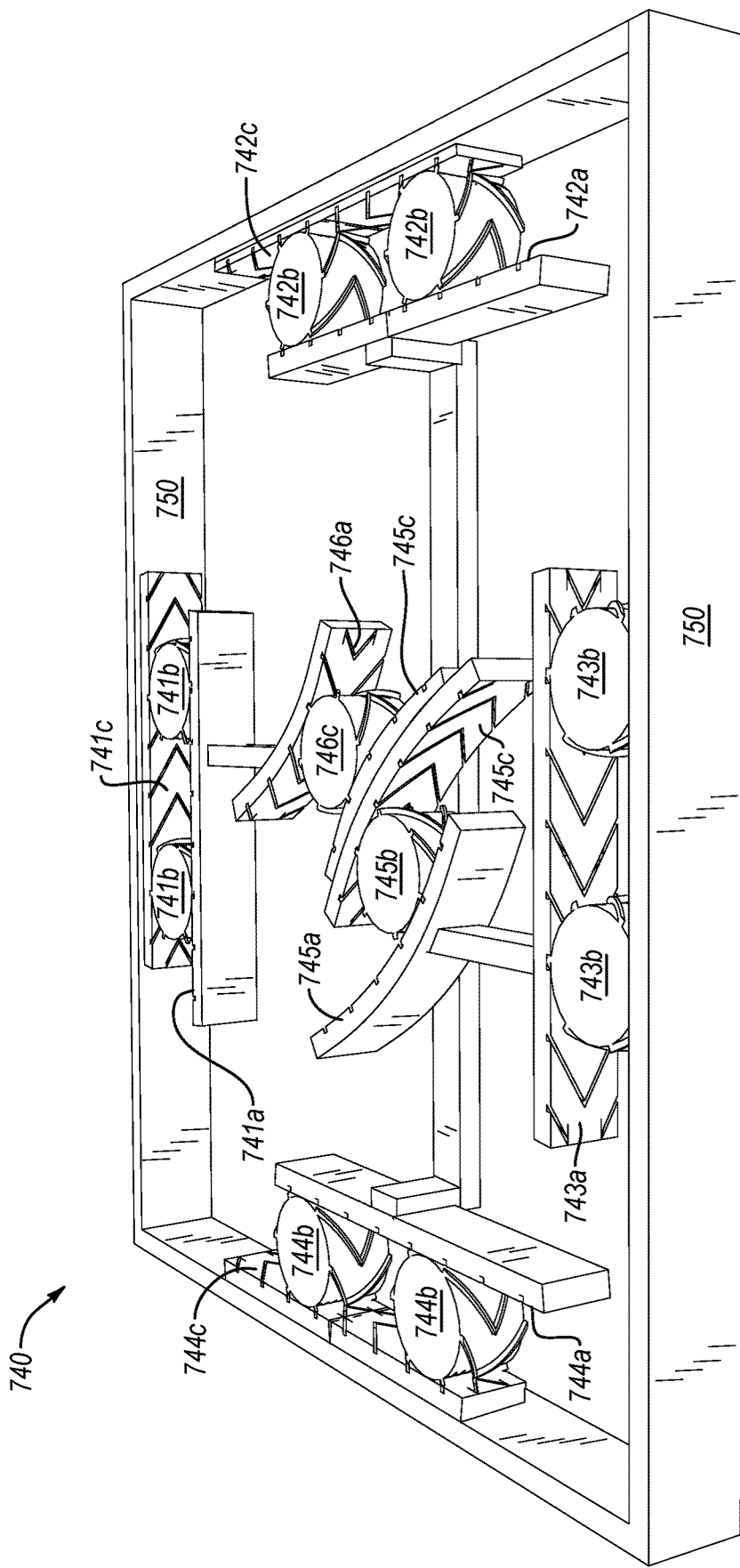
FIG. 49 is a perspective view of one embodiment of a linear-to-linear mechanism according to one embodiment of an optimization process at a first position in the cycle of rotation.
Figure 50:
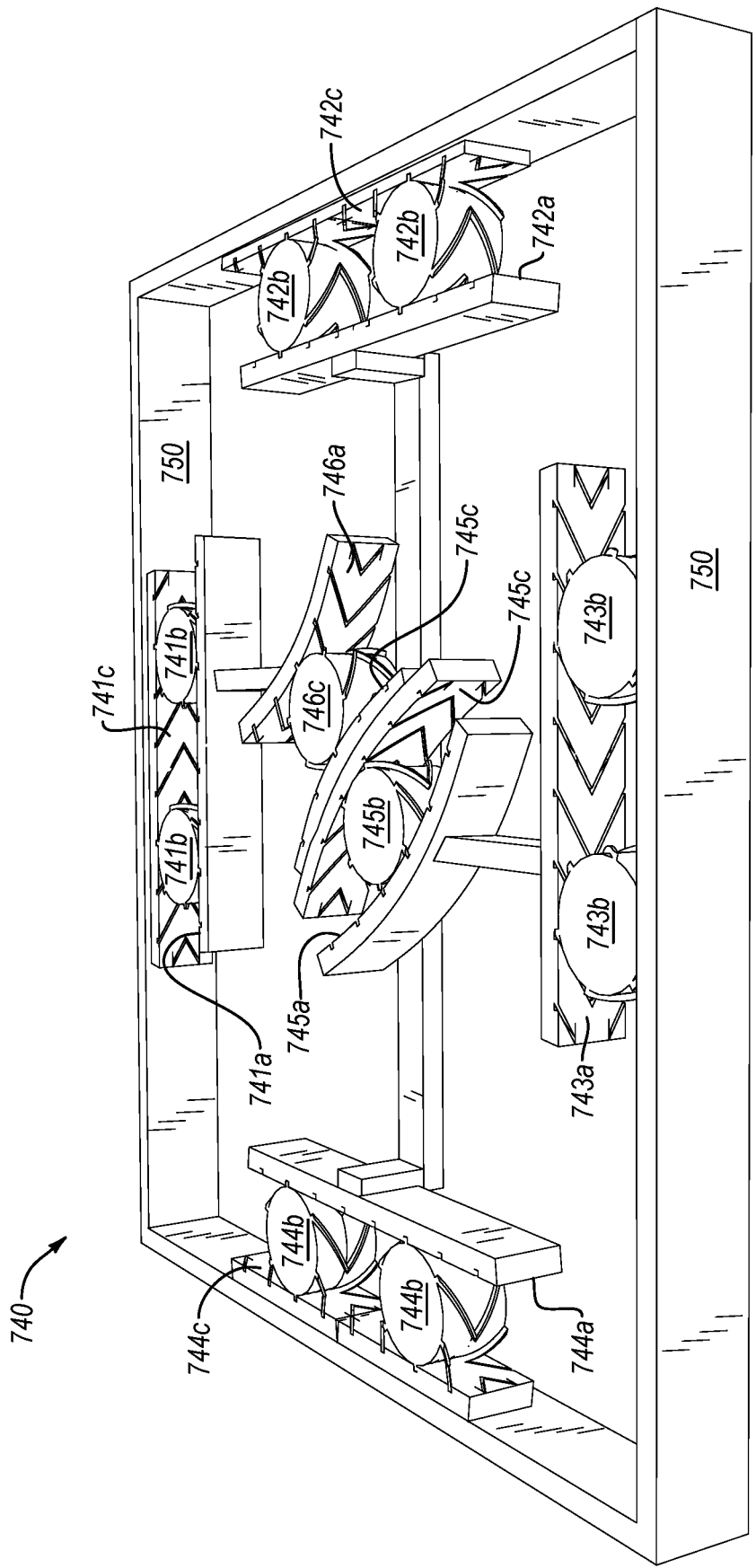
FIG. 50 is a perspective view of one embodiment of a linear-to-linear mechanism according to one embodiment of an optimization process at a second position in the cycle of rotation.
Figure 51:
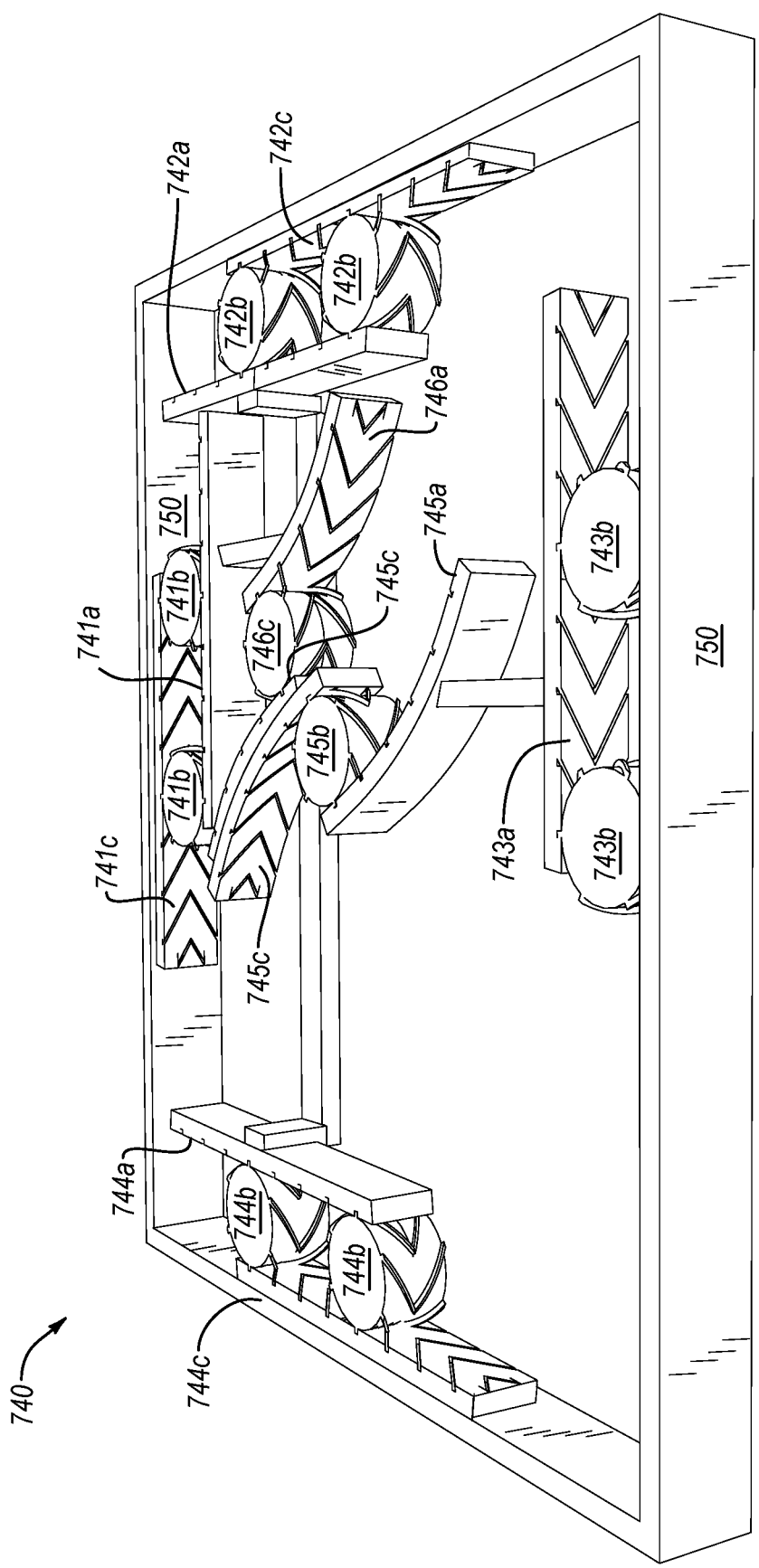
FIG. 51 is a perspective view of one embodiment of a linear-to-linear mechanism according to one embodiment of an optimization process at a third position in the cycle of rotation.

FIGS. 49, 50 and 51 shows perspective view of one embodiment of a linear to linear mechanism at different points in the range of motion. This mechanism may be used in to linearly in a direction as defined by the relative shape of the bearing element 745 and bearing element 746. In one embodiment, the inputs may be the races associated with raceway 745a and raceway 746a as driven by drive components (not shown) and the output may be on a component (not shown) attached to the races associated with raceway 745c and raceway 746c.

In this embodiment, the power ratio is programmed to vary from 0.25 to 4. The power ratio depends on the ratio of movement of bearing elements along either axis in the two-dimensional movement space parallel to the plane of the frame 750.

Figure 52:
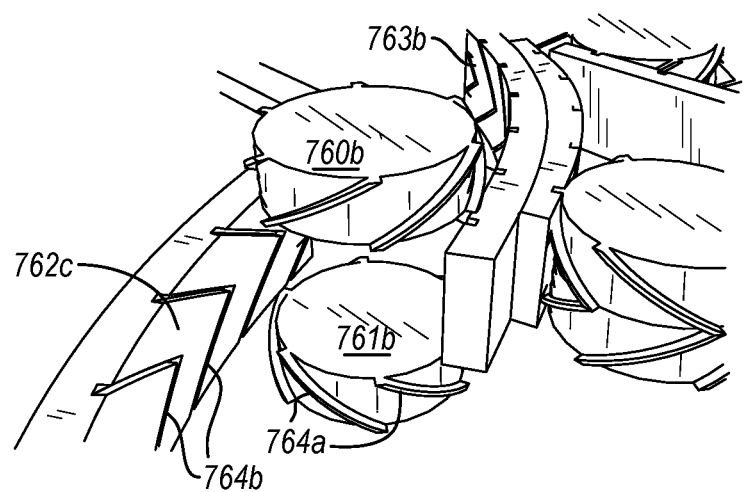
FIG. 52 illustrates one embodiment of the first step of a method for inserting a two-piece rolling element between two raceways.

FIG. 52 a first half of a rolling element 760b and a second half of a rolling element 761b being screwed into opposite sides of a raceway 762c and a raceway 763c.

Figure 53:
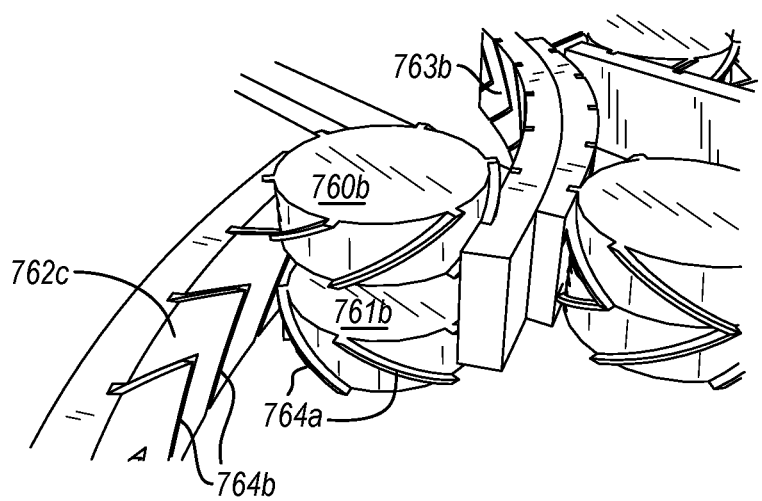
FIG. 53 illustrates one embodiment of the second step of a method for inserting a two-piece rolling element between two raceways.

FIG. 53 shows the first half of a rolling element 760b and a second half of a rolling element 761b partially screwed into opposite sides of a raceway 762c and a raceway 763c.

Figure 54:
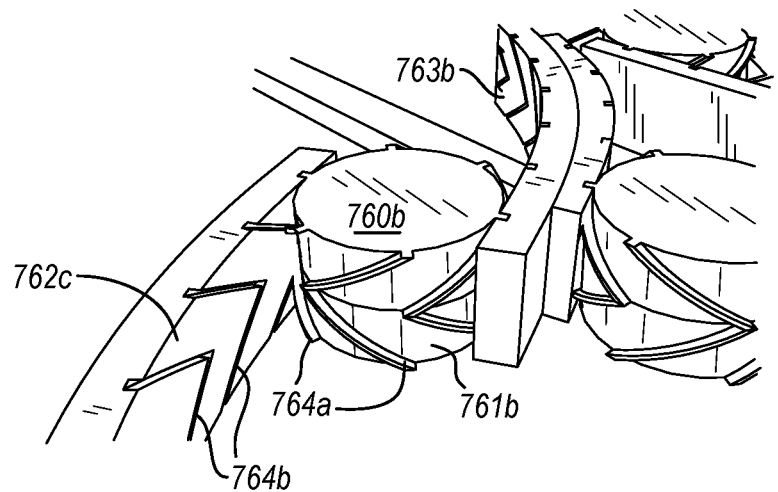
FIG. 54 illustrates one embodiment of the third step of a method for inserting a two-piece rolling element between two raceways.

FIG. 54 shows the first half of a rolling element 760b and a second half of a rolling element 761b fully screwed into opposite sides of a raceway 762c and a raceway 763c to meet in the middle and form a bearing element 860.

FIGS. 55, 56, 57, and 58 illustrate two rotary devices coupled together to form a speed reducer 780.

Figure 55:
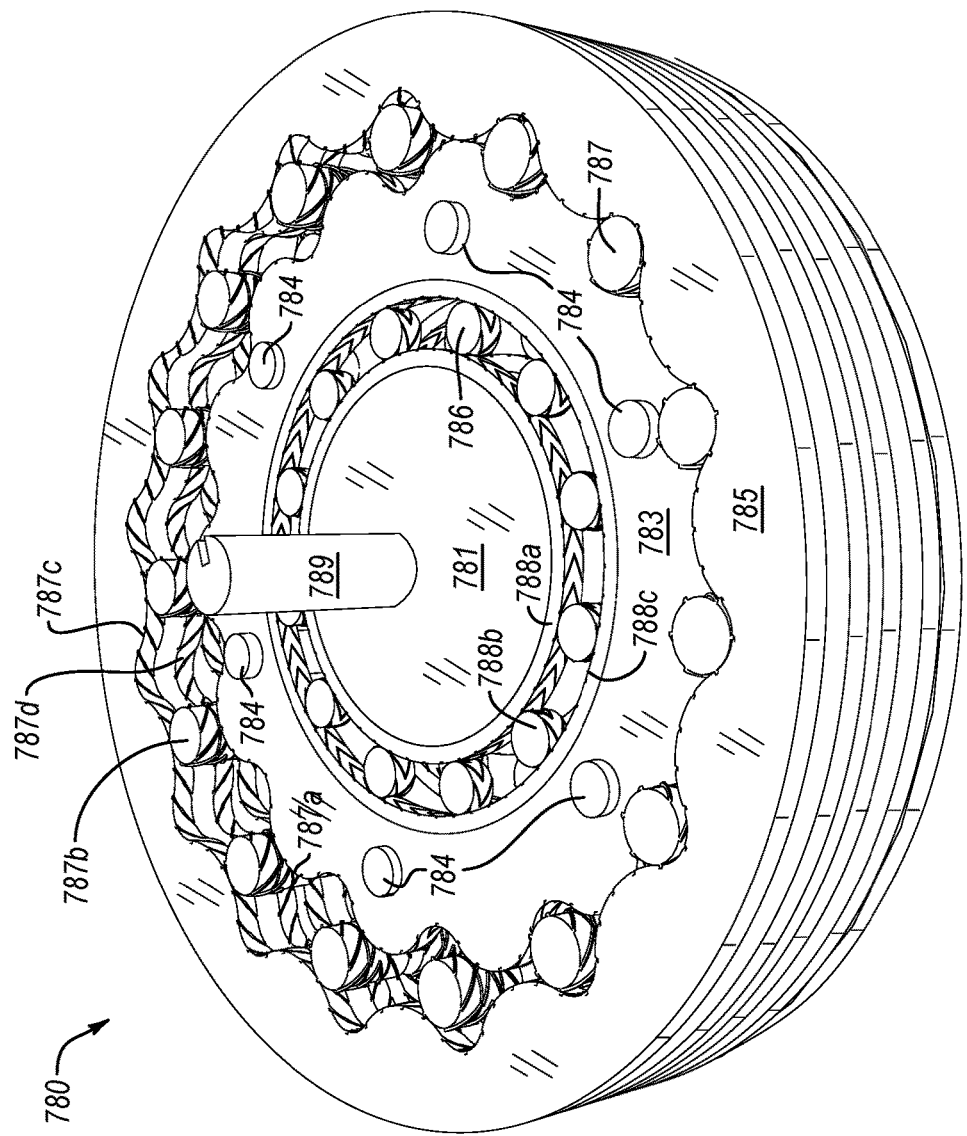
FIG. 55 illustrates a top perspective view of one embodiment of a speed reducer.

FIG. 55 shows the front view of a speed reducer with 15 rolling elements along the stator 785. The shaft shown is the input shaft 789 for the speed reducer 780. The top rotary device 791 use split pins 787b that roll on raceway 787a, raceway 787c, and raceway 787d.

Figure 58:
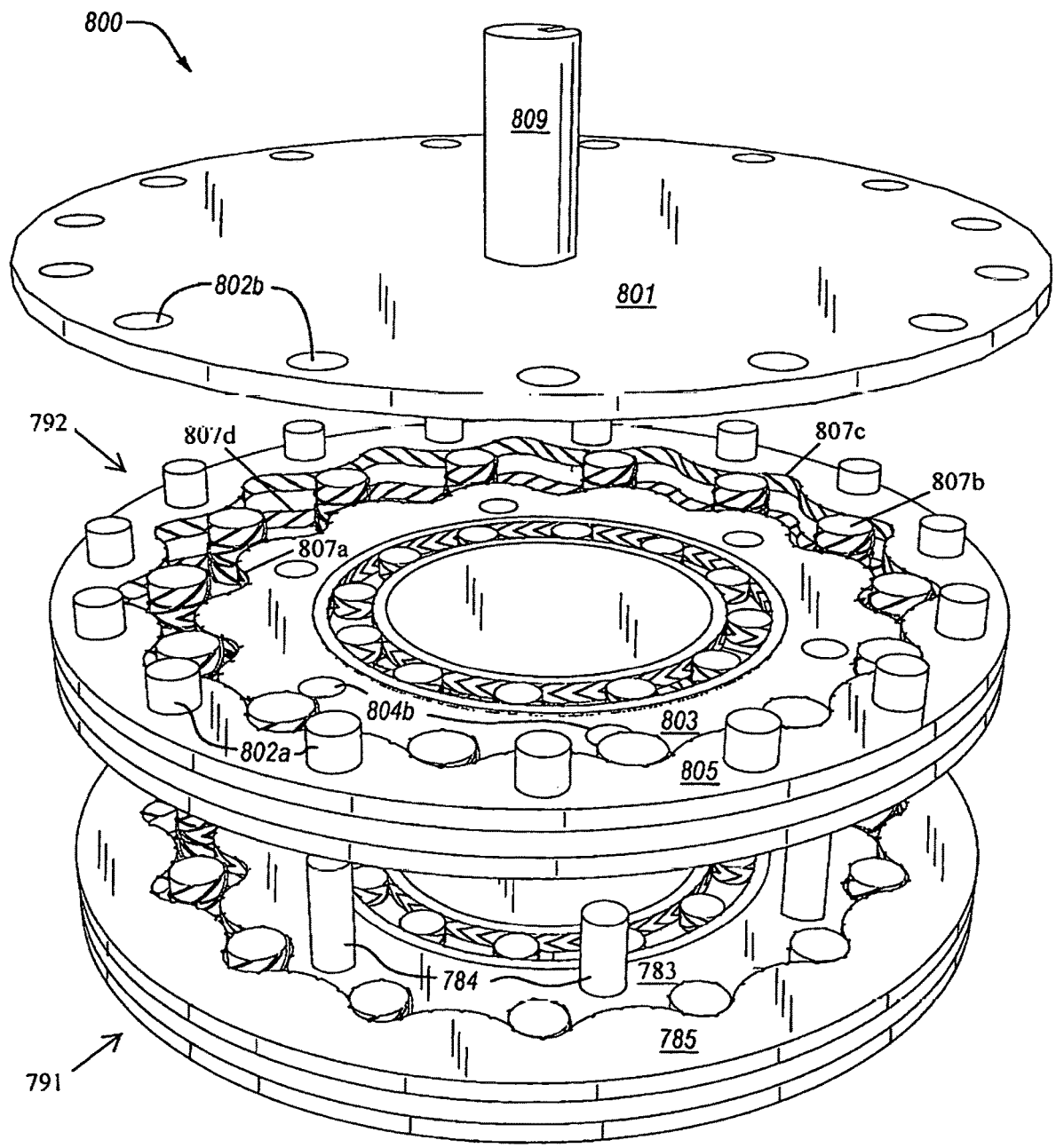
FIG. 58 illustrates a exploded view of the speed reducer of FIG. 55.

FIG. 58 shows an exploded view of the speed reducer. These bottom rotary device 792 use split pins 807b that roll on raceway 807a, raceway 807c, and raceway 807d.

The rotor 783 is coupled to the rotor 803 through the dowels 784 inserted into the dowel openings 804b. This causes the rotor 783 and the rotor 803 to remain fixed to each other.

The input stator 785 has a certain number of rolling elements 807b. The output stator 805 has 15 rolling elements.

Since the rotation of the rotor 803 is dependent upon the number of rolling elements, the rotor 783 would rotate at different speeds if each of the stator 785 and stator 805 were stationary. Instead the rotors are connected through dowels 784, and the back stator 805 rotates.

Figure 56:
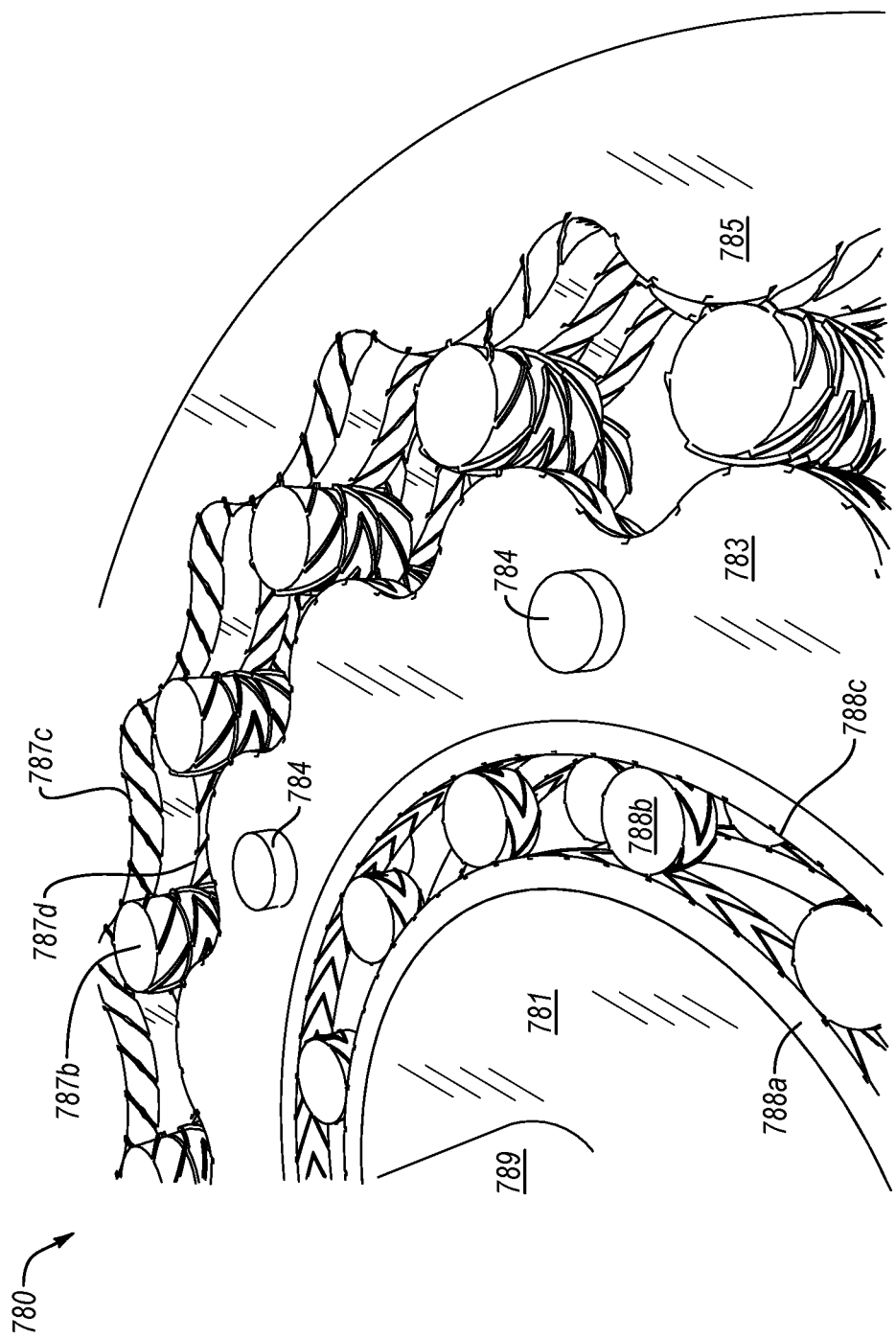
FIG. 56 illustrates an close-up view of the speed reducer of FIG. 55.

FIG. 56 shows a close up view of a portion of the top of the speed reducer. The shaft shown is the input shaft 809 for the speed reducer. Although the bottom rotary mechanism is not shown, it has 14 rolling mechanisms in this embodiment.

Figure 57:
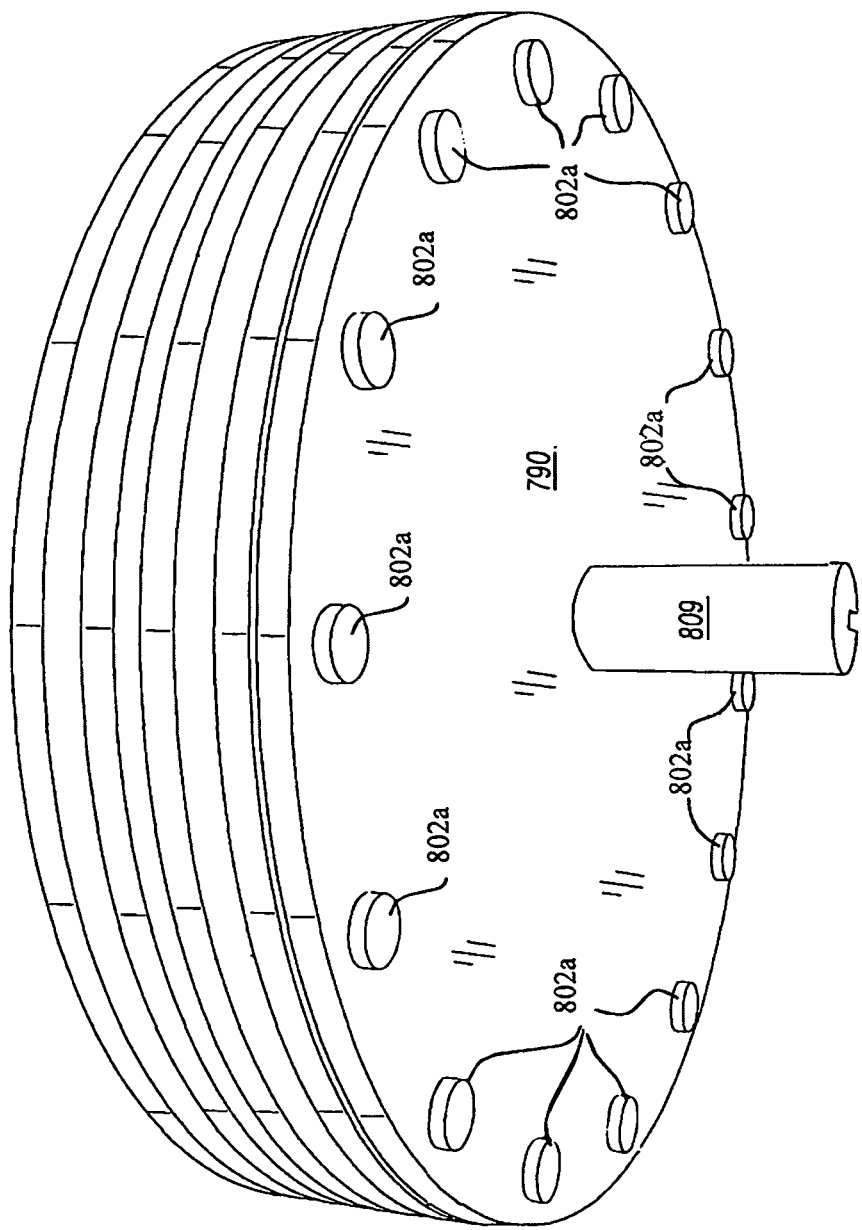
FIG. 57 illustrates a bottom perspective view of the speed reducer of FIG. 55.

FIG. 57 shows the back view of the speed reducer. The shaft 809 is the output shaft for the speed reducer.

The speed ratio of the input shaft to the output shaft is given by:

$$speedRatio = \frac{(backRate - frontRate)}{(1 - frontRate)}$$

Where the backRate is the rotor rate for the back rotary system, and the frontRate is the rotor rate for front system.

For the speed reducer shown the output shaft would rotate at 0.0095 times the speed of the input shaft. The speed reduction is the inverse of the speed ratio is 105.

By adding a spring between the eccentric and the bearing, the speed reducer can be made to be zero-backlash. In FIG. 28, the spring would be creating force to the left, forcing the play out of both the bearing and the pin-raceway system.

The speed reducer can be have multiple speed ratios by stacking multiple front rotor of differing number of pins. All but one of the stator elements would be free to rotate. To change speeds, the new stator would be braked, while the old speed would be freed. This type of shifting would be desirable because the braking and release could take place at the same time and power could continue to be transmitted. Normal shifting requires the following: depower, disengage, engage, and repower.

The speed reducer shown could also be made in a single column. The outer layer would be the output. Next is a row of pin, mating to a common rotor. Then another set of rolling elements connecting to the eccentric.

Figure 59:
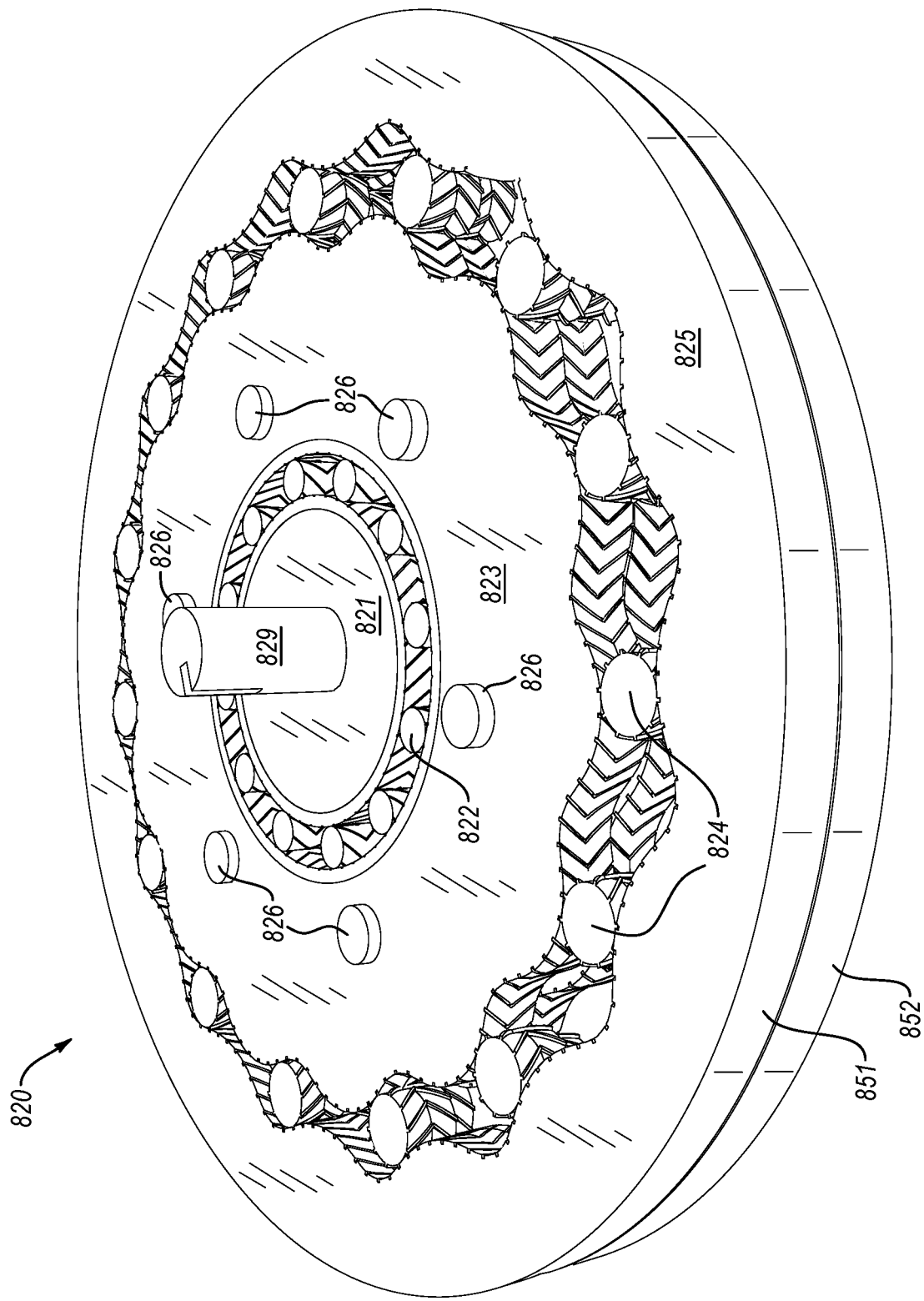
FIG. 59 illustrates a top perspective view of the speed reducer of FIG. 59.

FIG. 59 illustrates a top perspective view of a speed reducer 820 including a top rotary device 851 and a bottom rotary device 852.

The operation of this speed reducer is similar to that of FIGS. 55-58. However, this speed reducer does not use split pins. Although one embodiment of the optimization method suggested the use of split pins, the difference in the diameters for the segments of the split pins was approximately 0.2 percent. For many applications, this is close enough to use a standard pin rather than a split pin.

Figure 60:
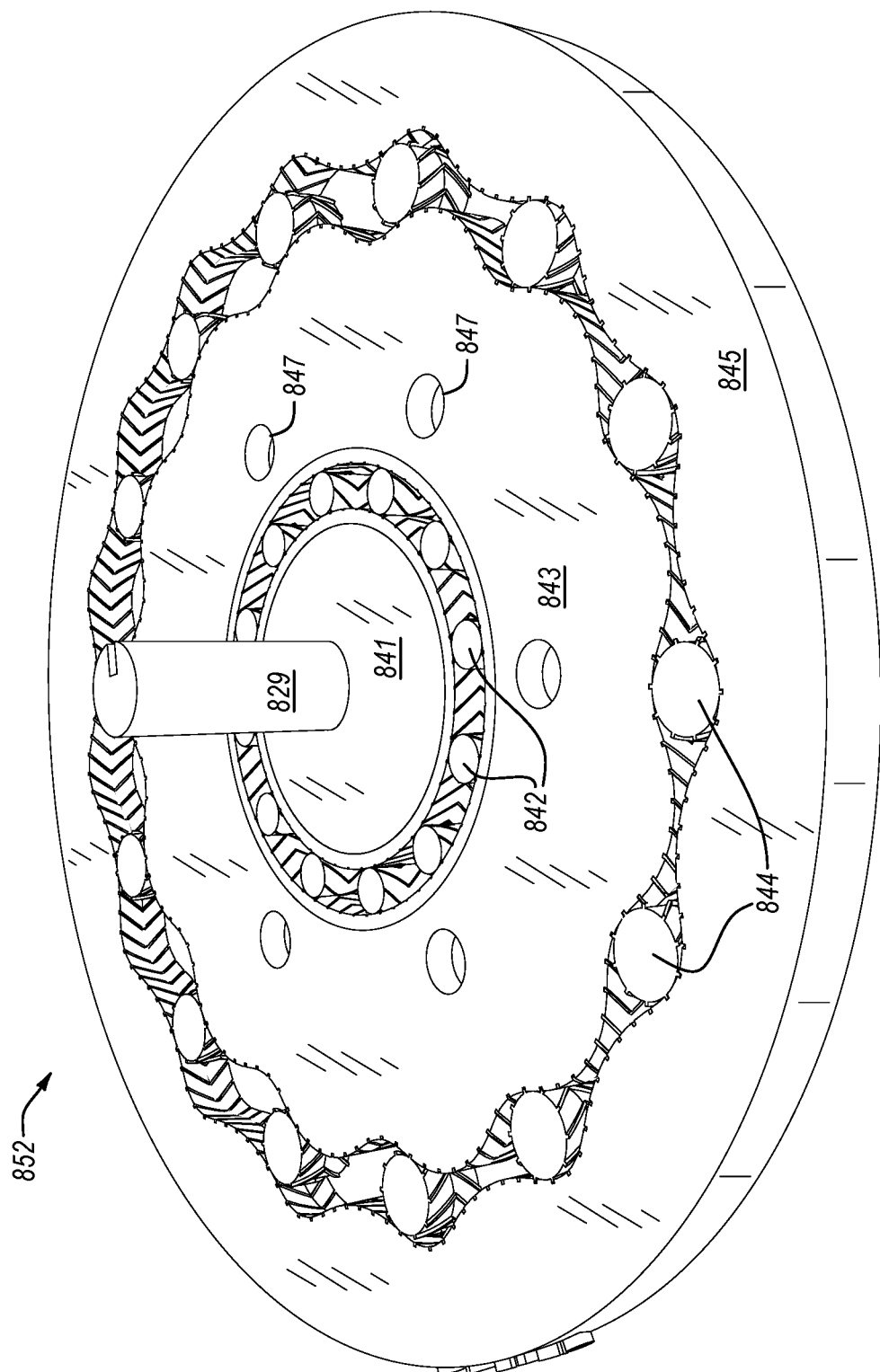
FIG. 60 illustrates a top perspective view of the bottom mechanism of the speed reducer of FIG. 59.

FIG. 60 illustrates a top perspective view of the bottom rotary device 852 of the speed reducer of FIG. 59.

Figure 61:
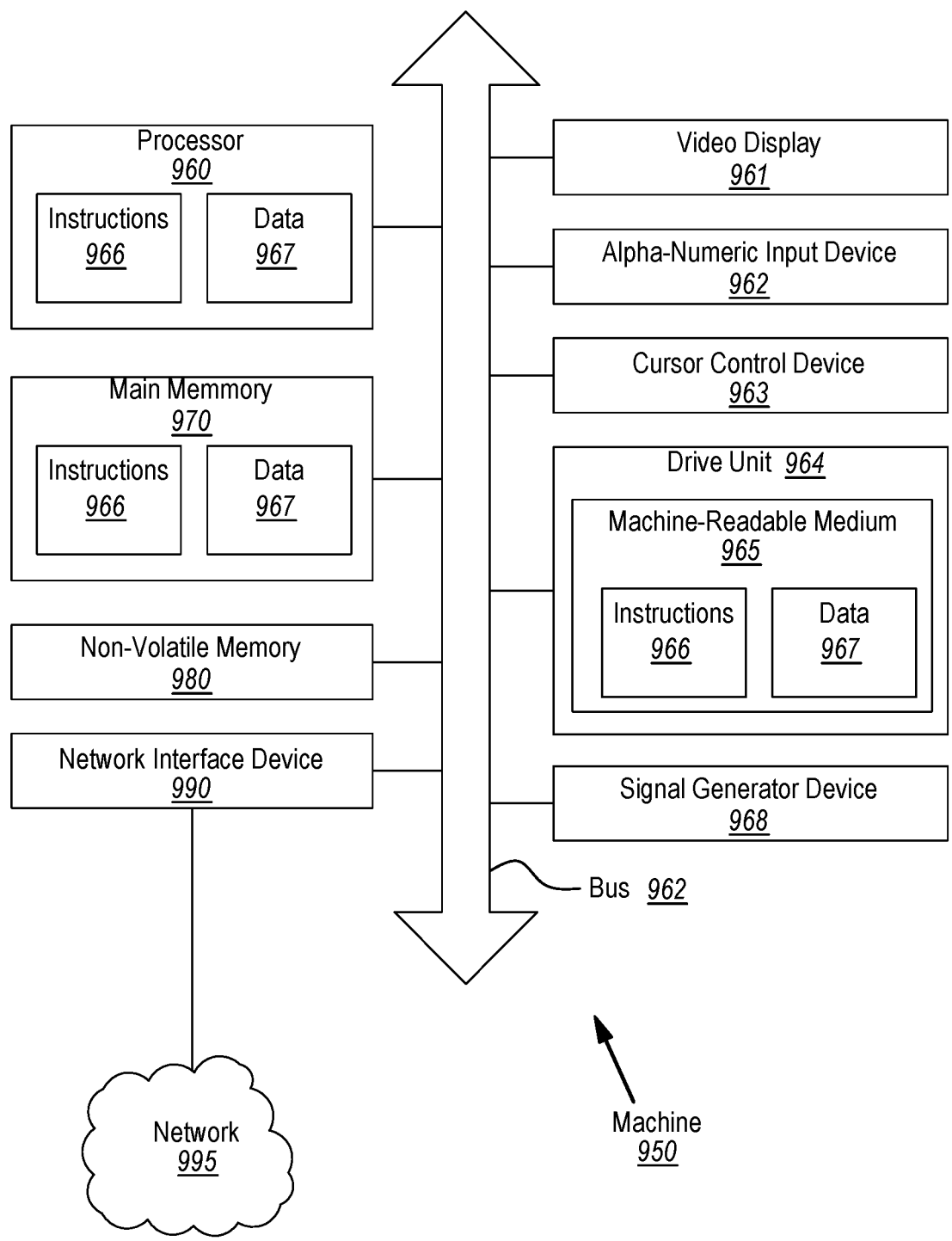
FIG. 61 is a diagrammatic representation of an embodiment of a machine 950

FIG. 61 is a diagrammatic representation of an embodiment of a machine 950, within which a set of instructions for causing the machine to perform one or more of the methods discussed herein. The machine 950 may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with a server to facilitate operations of the server and/or to access the operation of the server. In some embodiments, the machine 950 may act as a server for some functions and a client for other functions.

In some embodiments, the machine 950 is a CAD system for performing any one or more of the methods of the functions of the inventive subject matter or a component of such systems, such as one or more processors that make up the machine 950. In other embodiments, the machine 950 is a general purpose computer adapted to perform the inventive subject matter.

In some embodiments, the system is connected directly or via a network to a 3D Printer, CNC machine or other prototype or manufacturing based tools for prototyping and manufacturing devices according to the inventive subject matter.

The machine 950 includes a processor 960 (e.g., a central processing unit (CPU), a graphics processing unit (GPU) or both), a main memory 970 and a nonvolatile memory 980, which communicate with each other via a bus 969. In some embodiments, the machine 950 may be a cluster of computers or comprise multiple processors or multiple processor cores. In one embodiment, the machine 950 also includes a video display 981, an alphanumeric input device 962 (e.g., a keyboard), a cursor control device 963 (e.g., a mouse), a drive unit 964 (e.g., solid state drive (SSD), hard disk drive, Digital Versatile Disk (DVD) drive, or flash drive), a signal generation device 968 (e.g., speaker) and a network interface device 990.

In some embodiments, the video display 961 includes a touch-sensitive screen for user input. In some embodiments, the touch-sensitive screen is used instead of a keyboard and mouse. The drive unit 964 includes a machine-readable medium 965 on which is stored one or more sets of instructions 966 (e.g. software) embodying any one or more of the methods or functions of the inventive subject matter.

The instructions 966 may also reside, completely or partially, on machine-readable media within the main memory 970 and within machine-readable media within the processor 960 during execution thereof by the machine 950. The instructions 966 may also be transmitted or received over a network 995 via the network interface device 990. In some embodiments, the main memory 970 and the machine-readable medium 965 also includes data 967. In some embodiments, the data 967 includes CAD design information defining components that have machines and mechanisms as described herein. The data 967 also includes data structures that define position and movement information, error vectors and other information used in the design, testing and optimization process described herein.

While the machine-readable medium 965 is shown in an exemplary embodiment to be a single medium, the term "machine-readable medium" should be taken to include a single medium or multiple media (e.g., a centralized or distributed database, and/or associated caches and servers) that store the one or more sets of instructions and/or data. The term "machine readable medium" shall also be taken to include any non-transitory medium that is capable of storing, encoding or carrying a set of instructions for execution by the machine. The instructions may include instructions that cause the machine to perform any one or more of the methods or functions of the inventive subject matter. The term "machine-readable medium" shall accordingly be taken to include, but not be limited to, solid-state memories, optical and magnetic media, and other non-transitory tangible media.

In general, the methods executed to implement the embodiments of the disclosure, may be implemented as part of an operating system or a specific application, component, program, object, module or sequence of instructions referred to as "programs." For example, one or more programs may be used to execute specific processes according to the inventive subject matter. The programs typically comprise one or more instructions set at various times in various memory and storage devices in the machine 950, and that, when read and executed by one or more processors, cause the machine to perform operations to execute methods, functions and other elements of the inventive subject matter.

In some embodiments, the software for performing the inventive subject matter is a stand-alone program delivered on a computer-readable medium, downloaded from a server, or operated by a server that delivers the services as software-as-a-service. In other embodiments, an add-on program, or plug-in, to third-party software, such as CAD software, allow the third-party CAD program to incorporate some or all of the inventive subject matter.

Moreover, while embodiments have been described in the context of machines, those skilled in the art will appreciate that the various embodiments are capable of being distributed as a program product in a variety of forms, and that the disclosure applies equally regardless of the particular type of machine or computer-readable media used to actually effect the distribution. Examples of machine-readable media include, but are not limited to, recordable type media such as volatile and non-volatile memory devices, solid state drives (SSDs), flash memory devices, floppy and other removable disks, hard disk drives, and optical disks such as Compact Disk Read-Only Memory (CD-ROMS) and DVDs, among others.

The foregoing discussion is described with reference to rolling elements and pins. However, in other embodiments, ball bearings are used. Instead of guides, separators or other structures may be used to keep the ball bearings spaced apart.

Initial Rolling Element Path Estimation

Having an automated initial rolling element path estimate is a great convenience to the design process. It saves the designers of the burden and enables rapid design iterations. The method described herein is accurate and nearly resembles the actual optimized rolling element paths.

The premise is that when a rolling element rotates between two straight surface, the rolling element moves at half the difference of the velocities. If it's a split pin then the velocity is given by the following:

$$v_{pin} = \frac{v_o}{\left(1 - \frac{radius_o}{radius_i}\right)} + \frac{radius_o}{radius_i} * \frac{v_i}{\left(1 - \frac{radius_o}{radius_i}\right)}$$

Where:

$v_{pin}$ is the velocity of the pin.

$v_i$ is the velocity of the input component at the point of contact withe the pin.

$v_o$ is the velocity of the output component at the point of contact withe the pin.

$radius_o$ is the radius of the split pin that makes contact with the output component.

$radius_i$ is the radius of the split pin that makes contact with the input component.

The difficulty in solving this equation is that the contact point on each of the components depends upon the velocity of the pin. There are four variables that cannot be solved directly, so it needs to be solved using a MVSA. The error calculation has two rolling element velocities, one that is an input to the error calculation (the x and y values are state variables) and the other is a result that will be used for the error calculation. The state vector will be the angles from the rolling element centers, and the estimated velocity of the pin, $v_{pin-est}$. With $v_{pin-est}$ set, the velocity of the contact points can be found. The contact point velocities are fed into the equation above to yield the second rolling element velocity. The velocity error is the difference between the two velocities and is computed by subtracting $v_{pin}$-$v_{pin-est}$. The error in contact angle is computed using the dot product of the normal vector and the velocity at the contact point. That gives four state variables, velocity x and y, and two rolling element angles and four error variables, the two dot products and the velocity difference x and y value.

Once the rolling element velocity is found, the rolling element path can be numerically integrated to the next interval.

CAD Interface

In some embodiments, the bearing elements are created using a CAD program. In some embodiments, the capability is added to a CAD program using a software plug-in that includes software configured to perform some of the processes described herein. The plug-in enable a designer to design, test, and visualize the motion of raceway-based mechanisms described herein.

The first step would be to establish the number of points and the plane for which the bearing elements will operate. The plane of for which the raceways and rolling elements will operate will also need to be defined. Then the interface would need to enable the creation of motion specifications. There are several easy specifications that could be incorporated into the user interface, like the rotation of a shaft, straight-line motion or still motion (also called ground, or reference) like that of the chassis or frame. More complicated motion descriptions could come from analysis packages like a spreadsheet. Once there are two or more motion specifications, then the User Interface (UI) would enable creating bearing elements. The UI would allow the creation of a rolling element and the raceways would follow. The rolling elements could be icons that could be drag-and-drop offering or through a drop down. For each combination of motions definitions, the UI will need to be an offer of a rolling element to include in the user interface.

The designer would be able to drag a rolling element into the 3D view. The raceways and the rolling element would be shown, either approximated using the initial rolling element path approximation or the complete optimization. The rolling element could be dragged from location to location. As it is dragged, the raceways would move with the pin. A background process could reshape the raceways according to the new location and update the image with the new shapes. The CAD program could perform other functions like checking if the raceways and the components to which they are attached make contact with other components. The designer should also be able to move the rolling element perpendicular to the plane of motion. The designer should also be able to change the interval in the motion description of the components to view how they move. Either by a slider, by typing, through the mouse wheel, or by pushing a play button. By enabling the three-dimensional views of raceways and their motions the designer can review interference problems and force problems.

The other variables that would be an option for the UI are:

The angular orientation of the plane of motion of the Bearing elements.

The rotation designation of the pin, either clockwise or counterclockwise.

The distance of the bearing elements from the plane of motion.

The width of the raceways and the pin.

The number of guides on the pin.

The diameter of the rolling element for a non-split pin and the diameters for a split pin.

The pattern of the rolling element guides.

The height, width and the bevel of the guides.

Whether the raceways are closed-loop or open-loop

For a closed-raceway, the target number of guides.

The raceways are only one surface of the component. The designer would use the CAD program to specify the rest of the component, including all the other surfaces. The additional surfaces also need to be simulated though the range of motion to preview interference problems as well as stresses.

It can be desirable to make a mechanism comprised of one or more bearing elements and a legacy mechanism like linkages, bearing, gears and cams. Many CAD programs have simulation systems for such legacy mechanisms. It would be best if the simulation systems for the raceways were integrated into the simulation systems of the legacy mechanisms.

Many CAD systems also include capabilities to perform force and stress analysis. They can include the ability to compute the forces through a contact load or through a linkage. They can also be used to calculate the stresses within a component as well using techniques like Finite Element Analysis. A well-integrated solution would enable a force and stress analysis throughout the range of motion.

Other Considerations in Using Bearing Elements in Design

First, the desired motions cannot have extreme accelerations. This includes sharp corners. The motion should have continuous first derivatives. Make sure the functions used are sooth and continuous. A spline function can be used to generate the function.

For closed-loop raceways, the function needs to be continuous and smooth over the loop-closure. At 0 and 360 degrees of shaft rotation the component path must be the same point and the slopes must be smooth. The compressor shown had the height function developed using the spline functions. To get the splines to be continuous over the 0 and 360 degrees, the control points were reflected before and after 0 and 360. For instance, if the second control point were at 15 degrees and a height of 0.5 then a control point at 375 and height of 0.5 is included. If the second to last point were 340 degrees and a height of 0.4 then a point at −20 degrees and 0.4 would be added. While only 0 to 360 degrees are used, reflecting the control point forward and back insures the derivative will be continuous over the loop-closure.

Another potential pitfall is invalid geometry due to contact positions reversing. When a rolling element is moving slowly, it is possible for the contact position of a raceway to backup. This is not valid and has to be rejected by either the designer the software can detect the problem. Either the pin-start-position must be modified, or the motion description.

Interference is another problem. The components may make undesired contact that would prevent the device to work properly. The designer should review the motion of the device through the entire range to insure there is sufficient clearance. The most common fix is to modify the rolling element start position.

For closed-loop systems, there can be many valid rolling element start positions. This enables using multiple component raceways that include a pin. The compressors example uses two such raceways and rolling elements. This can be helpful to insure proper support of the system and also relieve stresses.

Detailed Mathematical Description

Once a designer has determined how the components are to move and the rolling element start positions determined along with their rotation designation the Bearing Elements can be found. The objective is to adjust the path of the rolling element so to simultaneously reduce the friction and maximize the opposing angles. The path adjustments are made by adjusting a state vector to minimize an error vector.

The MVSA requires an error function either compiled with or some other means were the function can be computed. The error function takes the state vector, an array of floating point numbers, as an argument, and copies the values to the correct elements to create the raceways. For instance, if the state vector was encoded to have the radius of the rolling element in the first position of the array, then the error function must copy that value to the correct structure that holds the rolling element radius. Then the raceways are created using the state variables supplied by the MVSA. The error values are computed and returned to the MVSA in terms of an array of values.

In this case, state vector is an array of floating point numbers containing the X and Y values of the second and subsequent elements of the rolling element path. The error vector is a combination of the computed friction and a measure for the opposing angles. The state vector is used to calculate the error vector. There are three steps to creating an error vector from a state vector. First, the raceway surface is derived. With the raceway surface, friction can be calculated and then the measure of the opposing angle error is calculated.

Before computing the friction or opposing angles, the surface of the raceway is found. The surface is the two-dimensional sweep surface created by the rolling element as it moves relative to either of the components associated with the raceway. The creation of a 2D sweep surface is a well-documented mathematical process and is included in many computer aided design (CAD) packages. The 2D sweep derives two surfaces, one on either side. Rolling a rolling element along one of the surfaces will result in either a clockwise or counter-clockwise rotation. The surface to use is the one that rotates the same as designated by the input. This becomes the raceway. The raceway is an edge of the component, and is described by arrays of X and Y values.

Each of the X and Y values also designates a contact position between the rolling element and the edge. The i'th X and Y will be in contact with the rolling element when the rolling element and the component are in their i'th location.

The location on the pin's surface where the contact point will take place satisfies the following condition:

$$(\vec{vPin}-\vec{vComponent})*\vec{surfaceNormal}=0$$

Where the $\vec{vPin}$ and $\vec{vComponent}$ are numerically differentiated velocity vectors of the rolling element and component at the contact point and $\vec{surfaceNormal}$ is a surface normal vector at the point of contact. The "*" operation is the vector dot product. If the condition is not satisfied, then the angle of the contact point must be adjusted. The left side of the equation becomes an error measure for a search algorithm. The search algorithm utilizes an initial estimate for the angle. A good initial estimate for the contact angle can be found by computing the direction of the velocity difference at the rolling element center, $\vec{vDiffCenter}$.

$$\vec{vDiffCenter}=(\vec{vPtn}-\vec{vComponent})$$

Then find the angle, angleCenter, of the $\vec{vDiffCenter}$ using an atan2 function used in most computer languages. Where the input X and Y are the X and Y velocities of $\vec{vDiffCenter}$.

$$angleCenter=atan2(Y,X)$$

A good initial estimate, initAngle, is the following:

$$initAngle = \begin{cases} angleCenter + 90 \text{ degrees,} & \text{for clockwise rotation} \\ angleCenter - 90 \text{ degrees,} & \text{for counter} - \text{clockwise} \end{cases}$$

The mathematical creation of the sweep surface utilizes a Single Variable Search Algorithm (SVSA). Examples of SVSAs include _____. The SVSA searches for a contact point where the error value becomes zero, cpi.

Once the contact point has been found, it must be included in the component edge. To do so, the contact point must be transformed and rotated back to the original component location.

The edge will be represented by two arrays of floating point numbers, one for the X values, edgex and one for the Y values, edgey. The following equation generates the location for the ith position. Whereby cx and cy are the X and Y locations for the component at the ith position. And cpx and cpy are the X and Y locations for the ith value of the contact point, cpi. And theta is the ith value for the components rotation.

$$\begin{bmatrix} edgex \\ edgey \end{bmatrix} = \begin{bmatrix} \cos(theta) & -\sin(theta) \\ \sin(theta) & \cos(theta) \end{bmatrix} \left( \begin{bmatrix} cx \\ cy \end{bmatrix} + \begin{bmatrix} cpx \\ cpy \end{bmatrix} \right)$$

Error Vectors

With the sweep surface intact, the error vectors can be created. Two arrays need to be estimated, the friction and the error in opposing angles. For computing friction, the rolling element can rotate along a raceway such that there is no sliding. But there are two raceways. The rotation may not be equal. If a device were made with this discrepancy, then the rolling element would need to partially slide along one of the raceways. A device with no sliding has a rolling element that rotates the same for each raceway.

The difference in rotation is part of the error vector used by the MVSA. To compute the rolling elements rotation as it moves from one position to the next, start by computing the length of each edge segment, li. There are nPoints-1 elements in array.

$$l_i = \sqrt{(x_i - x_{i+1})^2 + (y_i - y_{i+1})^2}$$

The perimeter, P, of the edge from the starting point to the i'th element. Is computed as:

$$P_1 = 0$$
$$P_i = P_{i-1} + l_{i-1}, \text{ for } i = 2 \text{ to } nPoints$$

Next, the location is found for the i'th edge position as the component is rotated and translated. First rotate the point.

$$\begin{bmatrix} xr_i \\ yr_i \end{bmatrix} = \begin{bmatrix} \cos(Rotation_i) & -\sin(Rotation_i) \\ \sin(Rotation_i) & \cos(Rotation_i) \end{bmatrix} \begin{bmatrix} x_i \\ y_i \end{bmatrix}$$

Next, the motion of the component is added. This is the location of the contact point between the rolling element and the edge xci, yci.

$$xc_i = xr_i + x_i$$
$$yc_i = yr_i + y_i$$

The rolling element center at the i'th location is pin's location xi, yi. The distance from the rolling element center to the contact point center is also the rolling element angle in vector form, designated as pixi, piyi:

$$pix_i = xc_i - x_i$$
$$piy_i = yc_i - y_i$$

The contact angle, ci, between the rolling element and the can be computed using a standard arctan 2 function available in many computer languages:

$$c_i = \operatorname{atan2}(piy_i, pix_i)$$

Where xi and yi are the from the rolling element xi and yi. The atan2 function yields discontinuities from one quadrant to the next. The array will have to be processed to insure the contact angles stay continuous. To do this, subtract the subsequent value from the current value to create a the angle difference, angleDiffi.

$$angleDiff_i = c_{i+1} - c_i$$

If the absolute value of angle angleDiff is greater than $\pi$ then and the following to ci+1.

$$c_{i+1} = c_{i+1} + \operatorname{floor}\left(\frac{\operatorname{floor}\left(\frac{angleDiff_i}{\pi}\right) + 1}{2}\right) * 2 * \pi$$

Where "floor" is the standard floor value function available in most computer languages.

If the difference between two array elements is greater or less than 270 degrees, then 360 degrees will have to be subtracted or added respectively to each subsequent element in the array.

The rolling element rotation, pri, from the beginning to the i'th element is:

$$pr_i = P_i - c_i$$

A segment is a section of the raceway between one point in the raceway to the next point on the raceway. The incremental rotation, iiri for the input component, and oiri for the output component.

$iir_i = pr_i - pr_{i+1}$, $f$ or $i=0$ to $n$Points-1 and computed using the input component $pr$ $oir_i = pr_i - pr_{i+1}$, $f$ or $i=0$ to $n$Points-1 and computed using the output component $pr$ The friction, fi, difference in incremental rotation:

$$f_i = iir_i - oir_i$$

Opposing Angle Error

The error is successively estimated from a measure of the error. The measure needs to be zero when the angles appose each other, and be greater with greater error. The simplest measure of error is to use cross product the angle vectors. The variables pixi, piyi are specific to the input and output. ipixi, ipiyi are the pixi, piyi computed for the input component. Correspondingly, opixi, opiyi are the pixi, piyi computed at the output component. The opposing angle error at the i'th position, oaei, are the cross product of the two vectors:

$$oae_i = opix_i * ipiy_i - ipix_i * opiy_i$$

With the friction and the measure for opposing error, the errors can be reduced using an initial estimate of the path and a function that takes a state vector as an argument and returns an error vector as a result. The function is responsible for unpacking the vector into meaningful data for the measurement and packing the error vector.

In this case, the state vector, stateV, ARE filled with second and subsequent X values of the rolling element path followed by the second and subsequent Y values. The initial path supplied by the designer estimate is packed in that order to create the initial state vector, initState.

The error function takes the front half of the array and replaces the X values of the rolling element path, then the Y values from the second half. The error function then calculates the 2D sweep surface, the friction and then opposing error. Next it encodes the error vector, errorV.

Both errorV and stateV have the same number of elements. There are 2*nPoints-2 elements in stateV. Friction, f, has npoints-1 elements and opposing aoe has nPoints giving a total of 2*nPoints-1. To resolve the discrepancy, the last value of the opposing angle error is not used, which is why an additional point was needed from the designer. The number of array elements for the state and error vectors, n, are 2*nPoints-2.

The error function is called with the designer supplied initial path estimate, to establish the initial error, initError;

initError=errorFun(initState)

Successive calls are made to the error function to approximate the Transposed Jacobian Matrix, $J^T$.

$$J^T = \begin{bmatrix} \frac{\partial e_1}{\partial s_1} & \frac{\partial e_2}{\partial s_1} & \cdots & \frac{\partial e_n}{\partial s_1} \\ \frac{\partial e_1}{\partial s_2} & \frac{\partial e_2}{\partial s_2} & \cdots & \frac{\partial e_n}{\partial s_2} \\ \vdots & \vdots & \ddots & \vdots \\ \frac{\partial e_1}{\partial s_n} & \frac{\partial e_2}{\partial s_n} & \cdots & \frac{\partial e_n}{\partial s_n} \end{bmatrix}$$

Each row of the matrix, rowi, is approximated with three steps. First by coping initState to a new array stateVi, then adding a small value, delta, to the state variable with the same row index.

$$stateV_{i_j}=stateV_{i_j}+delta$$

Second, the error function is then run for the perturbed state vector resulting in errori.

$$error_i=errFun(stateV_i)$$

The row is calculated subtracting each individual element of initError from the corresponding element of errori, then dividing by delta.

$$irow_{i_j} = \frac{(error_{i_j} - initError_{i_j})}{delta}$$

It's best to create and manipulate a matrix using a specialized matrix package such as Boost for C++. Each of the rows are then inserted into the matrix. The matrix J, is create by calling a matrix transform on the matrix $J^T$. The object now is to manipulate the following expression to solve for the step in state values, stepV.

$$J^*stepV=errorV$$

The step V is found by calling a LU factorization routine on J then call a LU substitution routine on J and errorV to result in stepV. A new state vector, newState, is the result of adding the step value.

$$newState=initState+stepV$$

By calling the error function with newState, the raceways are created, and the new error is calculated.

$$newError=errorFun(newState)$$

The newError vector should be inspected for the application. If the the application requires lower errors, the process can be run again with newState as the initState.

What is claimed is:

1. A rotary speed reducer comprising:
a first pair of races comprising a first pair of raceways forming a closed loop; and
a plurality of rolling elements operable to roll over a plurality of contact points on each of the
first pair of raceways, wherein at least one of the first pair of raceways has a substantially variable curvature along the plurality of contact points
wherein the cross product for the normal vectors for each pair of contact points is substantially zero.

2. The rotary speed reducer of claim 1 wherein each of the plurality of rolling elements does not slide as it rolls through the closed loop.

3. The rotary speed reducer of claim 1 wherein the first pair of raceways have a repeating pattern along the first path of the first rolling element.

4. The rotary speed reducer of claim 3 wherein the repeating pattern comprises a plurality of regularly-spaced lobes.

5. The rotary speed reducer of claim 1 wherein each of the plurality of rolling elements are ball bearings.

6. The rotary speed reducer of claim 1 wherein each of the first plurality of rolling elements are roller bearings.

7. The mechanism of claim 1 wherein one of the first pair of races is coupled to one end of a linkage bar.

8. A rotary speed reducer of claim 1 wherein the each of the plurality of rolling elements has a first rolling portion having a cross-section perpendicular to an axis of rotation defining a first shape, and a second rolling portion and third rolling portion laterally on either side of the first rolling portion, each having a cross-section perpendicular to the axis of rotation defining a second shape, the first shape being different from the second shape, the mechanism further comprising a third race having a third raceway, the first one of the first pair of raceways and the third raceway being operable to interface with the second and third portion of each of the plurality of rolling elements, the second one of the first pair of raceways being operable to interface with the first portion of each of the plurality of rolling elements.

9. The rotary speed reducer of claim 8 wherein the first shape and the second shape differ in at least a distance of the surface of a portion of the rolling element to the axis of rotation for at least a portion of the rotation of each of the plurality of rolling elements.

10. The rotary speed reducer of claim 1 wherein the first pair of raceways comprise a first plurality of guide structures and the first plurality of rolling elements comprise a second plurality of guide structures, the first plurality of guide structures being positioned to interface with the second plurality of guide structures as each of the plurality of rolling elements roll through the closed loop.

11. The rotary speed reducer of claim 1 further comprising:
a second pair of races each comprising one of a second pair of raceways; and
a second rolling element operable to roll between the second pair of raceways, wherein at least one of the second pair of raceways has a substantially
variable curvature at the contact points with the second rolling element along a second path.

12. The rotary speed reducer of claim 11 wherein one of the first pair of races is coupled to one of the second pair of races so that they move in concert.

13. The rotary speed reducer of claim 11 wherein the first rolling element operable to roll between a first rotor and a first stator and the second rolling element operable to roll between a second rotor and a second stator, the first rotor being coupled to the second rotor.

14. The rotary speed reducer of claim 1 wherein the mechanism is a speed reducer.

15. A rotary speed reducer comprising:
a first pair of races comprising a first pair of raceways forming a closed loop; and
a plurality of rolling elements operable to roll over a plurality of contact points on each of the first pair of raceways, wherein at least one of the first pair of raceways has a substantially variable curvature at the plurality of contact points, the path length for any corresponding interval along the contact points for each of the pair of raceways being substantially the same.

16. A rotary speed reducer comprising:
a first pair of races comprising a first pair of raceways forming a closed loop; and
a plurality of rolling elements operable to roll over a plurality of contact points on each of the first pair of raceways, wherein at least one of the first pair of raceways has a substantially variable curvature along the plurality of contact points, wherein the plurality of rolling elements do not slide as they roll through the closed loop.

17. A rotary speed reducer comprising:
a first race comprising a first raceway around a first closed loop;

a pair of races comprising a pair of raceways around a pair of closed loops; and a plurality of rolling elements having a first rolling portion with a radius R1 and a pair of rolling portions with a radius R2, the first rolling portion being operable to roll over a first plurality of contact points on the first raceway, the pair of rolling portion each being operable to roll over a corresponding plurality of contact points on each of the pair of raceways, wherein at least one of the first raceway or the pair of raceways has a substantially variable curvature at the corresponding plurality of contact points, the path length along the first raceway being R1/R2 times the path length along the second raceway, wherein R1 does not equal R2.

* * * * *